(12) United States Patent
Fujiwara

(10) Patent No.: US 8,079,111 B2
(45) Date of Patent: Dec. 20, 2011

(54) OPTICAL CONNECTOR CLEANING TOOL AND OPTICAL COMPONENT CLEANING TOOL

(75) Inventor: Kunihiko Fujiwara, Sakura (JP)

(73) Assignee: Fujikura Ltd., Tokyo (JP)

( * ) Notice: Subject to any disclaimer, the term of this patent is extended or adjusted under 35 U.S.C. 154(b) by 933 days.

(21) Appl. No.: 11/836,501

(22) Filed: Aug. 9, 2007

(65) Prior Publication Data

US 2008/0034519 A1 Feb. 14, 2008

(30) Foreign Application Priority Data

Aug. 11, 2006 (JP) .................. 2006-219696
Mar. 28, 2007 (JP) .................. 2007-083383

(51) Int. Cl.
*B08B 11/00* (2006.01)
*A47L 25/00* (2006.01)

(52) U.S. Cl. .................. 15/210.1; 15/104.001

(58) Field of Classification Search ............. 15/104.001, 15/210.1

See application file for complete search history.

(56) References Cited

U.S. PATENT DOCUMENTS

| 6,209,163 B1 * | 4/2001 | Clairadin et al. | 15/97.1 |
| 6,854,152 B2 * | 2/2005 | Loder et al. | 15/210.1 |
| 2006/0191091 A1 * | 8/2006 | Kida | 15/210.1 |

FOREIGN PATENT DOCUMENTS

| JP | 9-197182 A | 7/1997 |
| JP | 9-285766 A | 11/1997 |
| JP | 2000-503780 A | 3/2000 |
| JP | 2000-284147 A | 10/2000 |
| JP | 2004-219602 A | 8/2004 |
| JP | 2004-271765 A | 9/2004 |
| JP | 2004-347792 A | 12/2004 |
| JP | 2005-099451 A | 4/2005 |
| JP | 2005-215045 A | 8/2005 |
| JP | 2006-175354 A | 7/2006 |

OTHER PUBLICATIONS

"MPO Cleaners" [online] (Ltd.) Fujikura [Jun. 7, 2006 INET retrieval] <URL:http://www.fujikura.co.jp/cnc/pdf_files/future_a/mpo_clk_aj.pdf>.
Notice of Allowance dated; Nov. 8, 2011, from the Japanese Patent Office in counterpart Japanese Application No. 2007-083383.

* cited by examiner

*Primary Examiner* — Randall Chin
(74) *Attorney, Agent, or Firm* — Sughrue Mion, PLLC

(57) ABSTRACT

A cleaning tool is provided wherein a head unit (4) that is equipped with a supporting portion main body (44), a circular arc-shaped tilt spring (41) that protrudes from this supporting portion main body (44), and a head component (23) that is supported on a protruding distal end (411) of the tilt spring (41) is incorporated into a distal end portion of a protruding portion that protrudes from a tool main body, and wherein the head component (23) is tilted such that the side thereof that protrudes from the protruding distal end (411) of the tilt spring (41) towards the curve apex portion (412) of the tilt spring (41) protrudes towards the rear side, and the head component (23) protrudes towards the front side as it moves towards the opposite side from the protruding distal end (411).

23 Claims, 37 Drawing Sheets

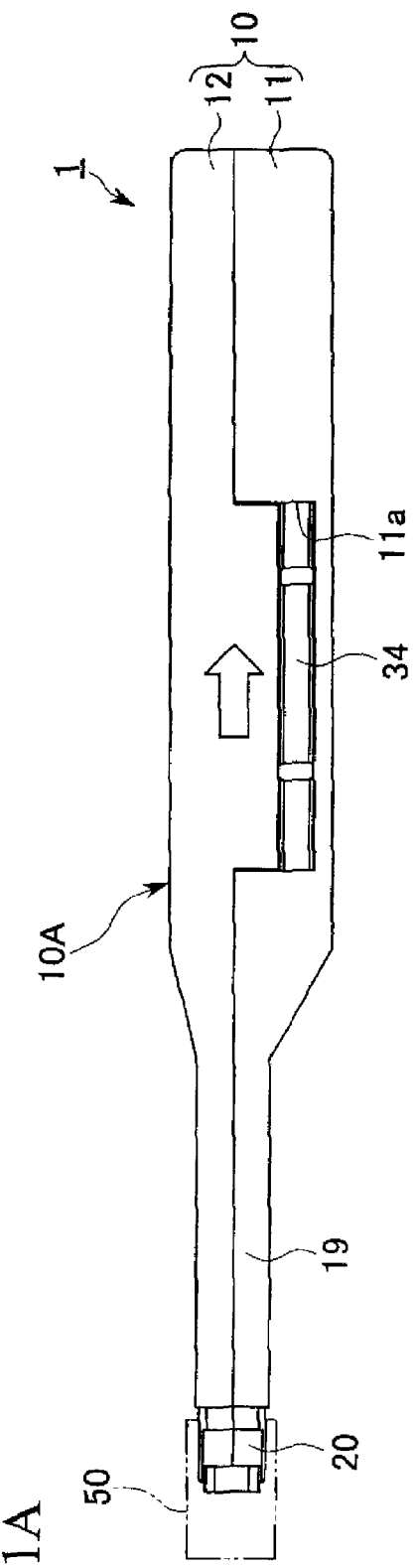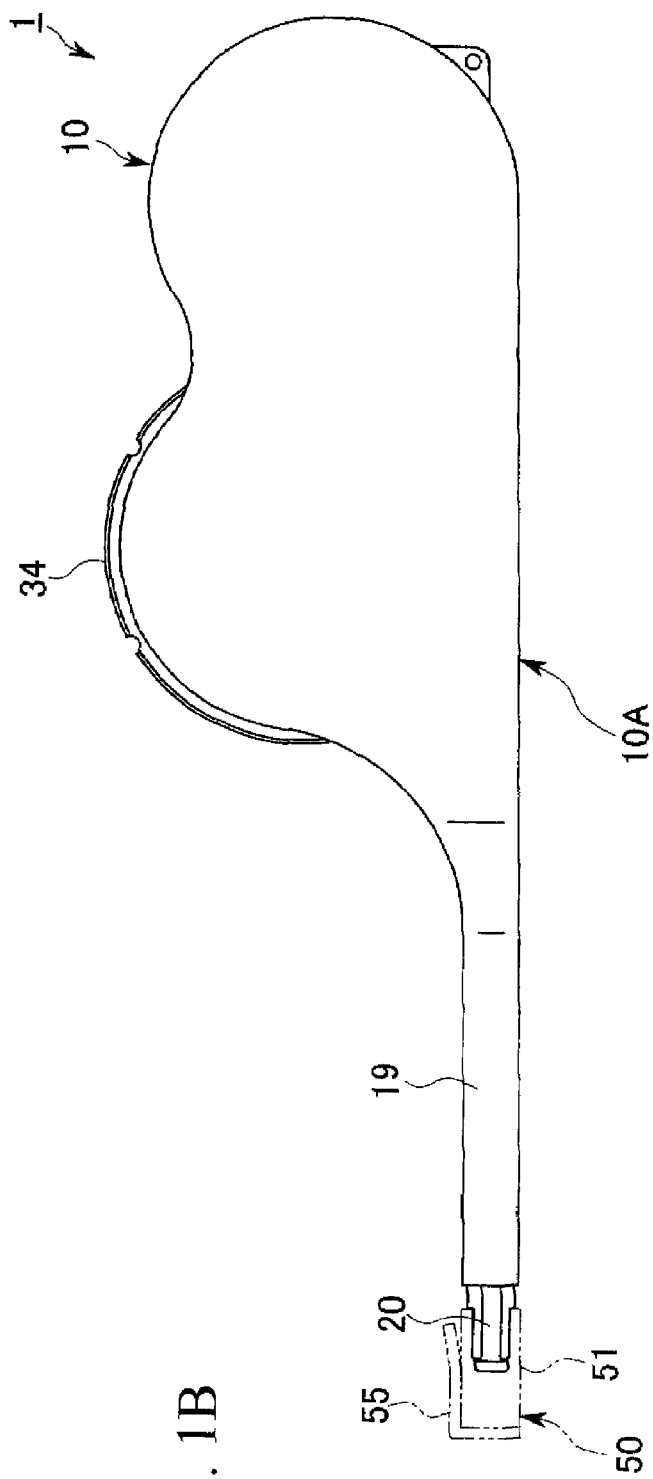

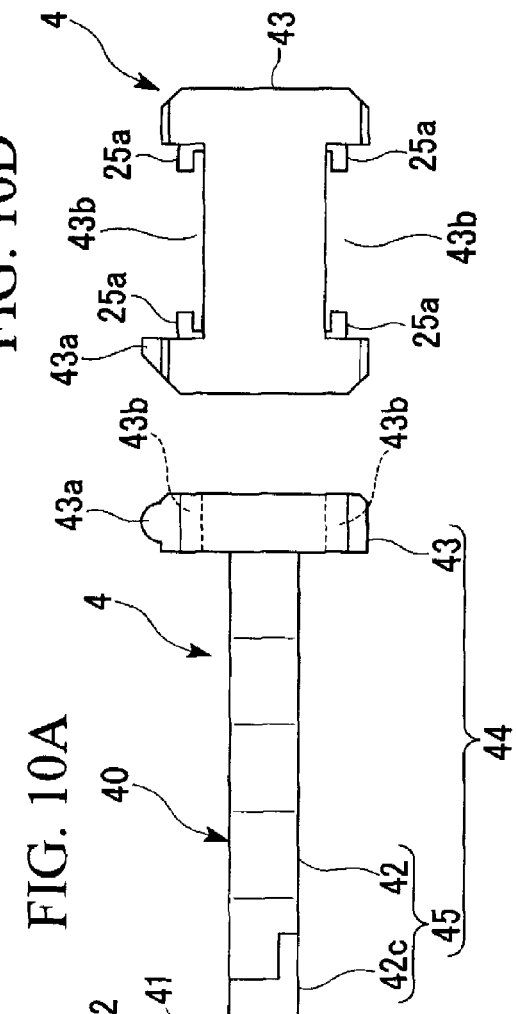
FIG. 10D
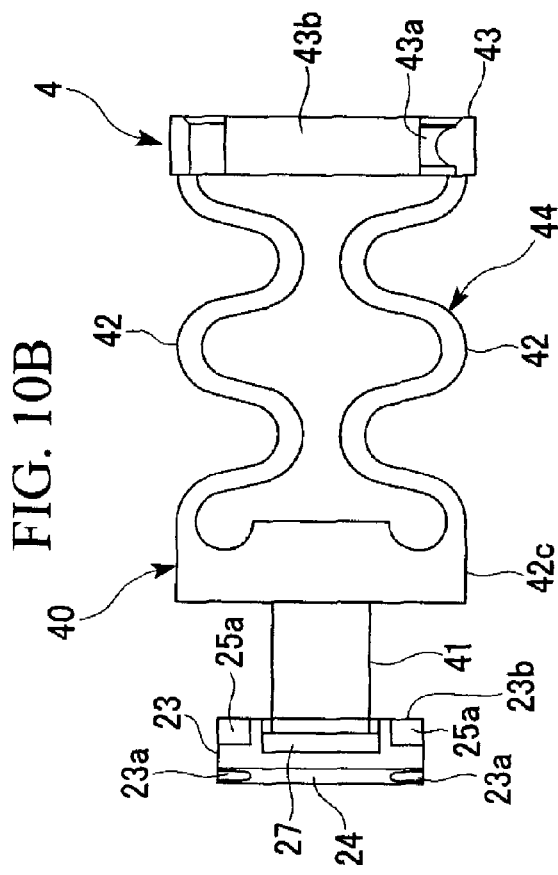
FIG. 10B
FIG. 10A
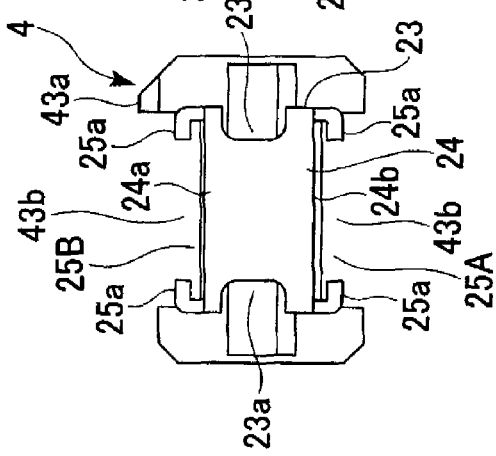
FIG. 10C

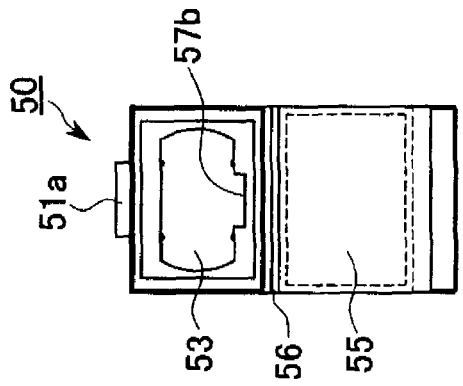
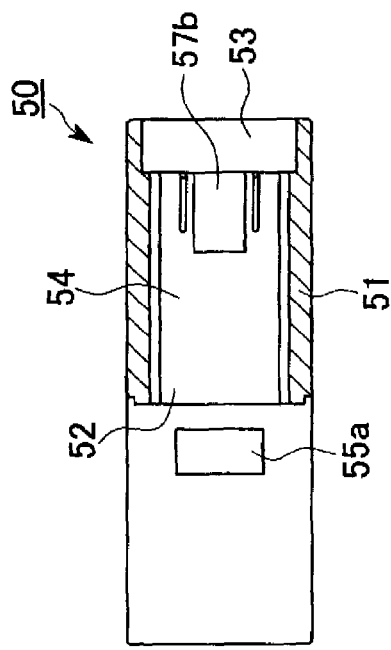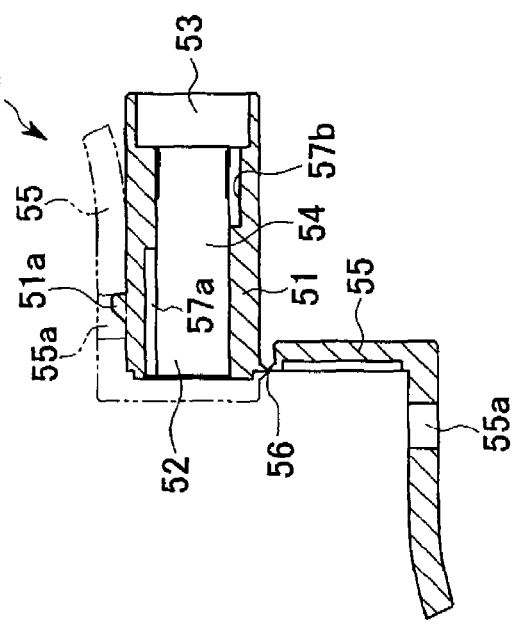
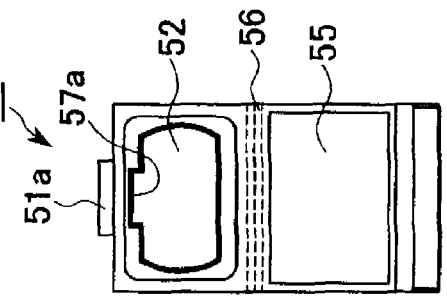

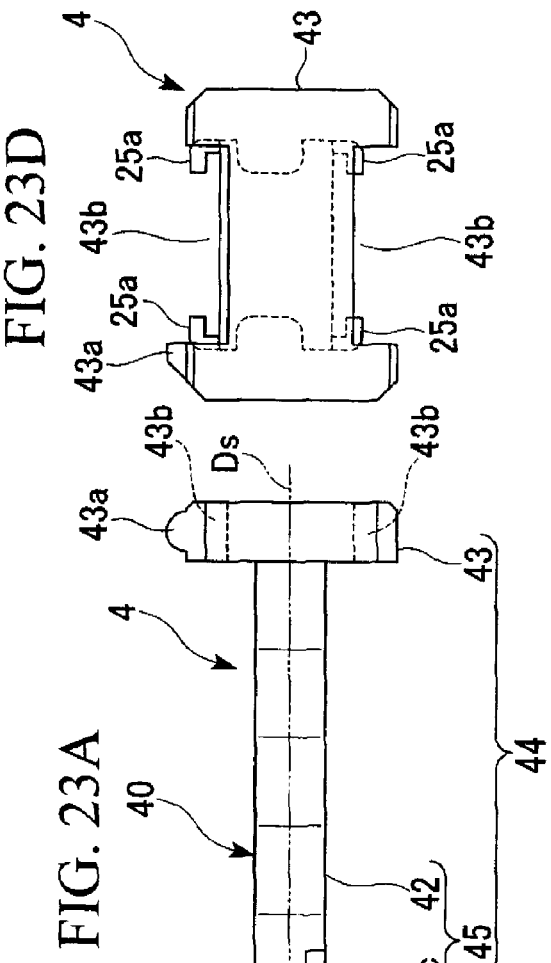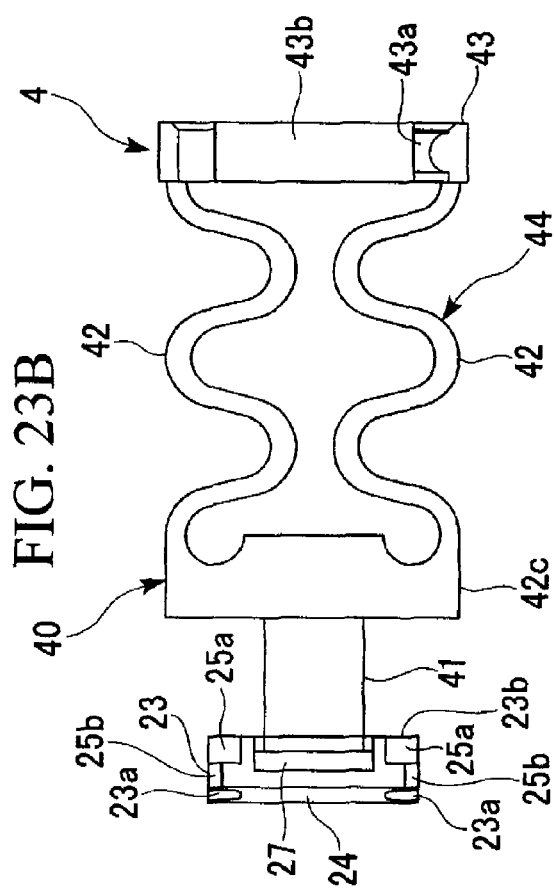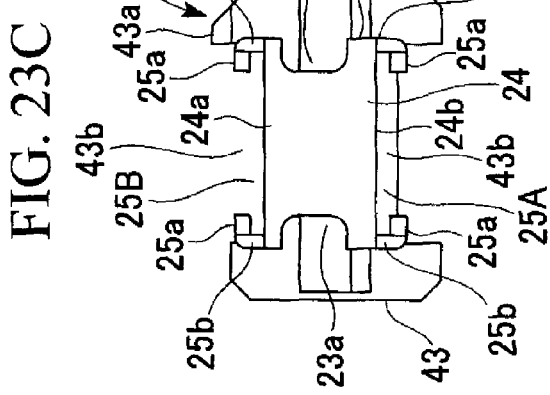

OPTICAL CONNECTOR CLEANING TOOL AND OPTICAL COMPONENT CLEANING TOOL

BACKGROUND OF THE INVENTION

1. Field of the Invention

The present invention relates to an optical connector cleaning tool that cleans a joining end surface of an optical connector within a connector positioning housing the feed movement of cleaning medium, and to an optical component cleaning tool that cleans an end surface of an optical component.

Priority is claimed on Japanese Patent Application No. 2006-219696, filed Aug. 11, 2006, and Japanese Patent Application No. 2007-083383, filed Mar. 28, 2007, the contents of which are incorporated herein by reference.

2. Description of the Related Art

As is commonly known, the connecting together of optical connectors within a positioning housing for connectors (may be referred to below simply as a positioning housing) such as an adapter or a receptacle is achieved by aligning together and joining end surfaces of optical fibers that face joining end surfaces of the each optical connector.

When an optical connector is inserted into a connector positioning housing and is aligned and connected, if any contamination such as dirt, dust, or oil is adhering to the joining end surfaces of the optical connectors, this causes damage during connection and disconnection and also causes an increase in transmission loss. Because of this, it is necessary to clean the joining end surfaces prior to the alignment and connection.

A type of cleaner that cleans by placing cleaning tape medium in contact with the joining end surfaces of the optical connector has been widely proposed as a cleaner for use in this type of application (see, for example, Japanese Patent Application Laid-Open (JP-A) No. 2000-284147 (referred to below as Patent document 1), JP-A No. 9-197182 (referred to below as Patent document 2), JP-A No. 9-285766 (referred to below as Patent document 3), and Japanese National Publication No. 2000-503780 (referred to below as Patent document 4)).

Moreover, another type of cleaner has been widely proposed as this type of cleaner (see, for example, Patent document 1, as well as "MPO Cleaners" [online] (Ltd.) Fujikura [Jun. 7, 2006 INET retrieval]<URL:http://www.fujikura.co.jp/cnc/pdf_files/future_a/mpo_clk_aj.pdf> (referred to below as Non-patent document 1). This cleaner has a structure in which an elongated protruding portion whose distal end is equipped with a tape dispenser head around which cleaning tape has been wound is inserted into a positioning housing such as an optical connector adaptor or the like, and the cleaning tape is placed in contact with a joining end surface of an optical connector (for example, an optical connector (i.e., an optical connector plug) that is connected to the optical connector adaptor from the opposite side from the protruding portion of the cleaner that is inserted into the optical connector adaptor, or a ferrule that is incorporated within an optical connector receptacle) within this positioning housing.

In a cleaner of this type in which the cleaning tape that is wound around the tape dispenser head at the distal end of the protruding portion cleans by being placed in contact with the joining end surface of the optical connector, as in the technology described, for example, in the aforementioned Patent document 1 and in JP-A No. 2004-347792 (referred to below as Patent document 5), technology is proposed in which the head is able to be tilted so that the pressing of cleaning tape onto the joining surface of an optical connector that has been diagonally polished is possible.

For example, as is shown in FIG. 36, the cleaner disclosed in Patent document 1 is provided with a protruding portion 110 whose distal end has an open portion 116 where cleaning tape 102 (i.e., a cleaning tape) is exposed. As a result of this protruding portion 110 being inserted into a space inside an optical connector adapter 170 (i.e., an optical adapter), the tape 102 is placed in a position facing a joining end surface 161$a$ of a ferrule 161 of an optical connector plug 160 (i.e., an optical plug) that is housed in the optical connector adapter 170, and is then pressed against this joining end surface. Accordingly, the tape 102 wipes clean the joining end surface 161$a$ of the optical plug 160 as a result of the forward movement of the tape 102. In this cleaner 101, the tape 102 that wipes clean the joining end surface 161$a$ of the optical plug 160 is provided so as to pass above a distal end surface 112$a$ of a head portion 112 that is pivotably fixed onto a pivot 111, and the orientation of the head portion 112 can be changed by a pivoting rotation around the pivot 111. As a result the joining end surface 161$a$ of the ferrule 161 can be received at a variety of angles.

In the cleaner 101 in the aforementioned Patent document 1, when the head portion 112 that has been pressed against the joining end surface of the optical connector that has been diagonally polished is rotated around a pivot, there is a change not only in the orientation of the distal end surface 112$a$ of the head portion 112, but also in the position of the distal end surface 112$a$ due to the pivot rotation of the head portion 112. As a result, there is a shift in the center position (i.e., contact is made by one side) between the joining end surface 161$a$ of the optical plug 160 and the distal end surface 112$a$ of the head portion 112, resulting in the tape 102 not making satisfactory contact with the joining end surface 161$a$, or in the pressing force with which the tape 102 is pressed against the joining end surface 161$a$ becoming uneven and the like. This results in the cleaning not been performed reliably, and the problem arises that contamination remains in portions of the joining end surface 161$a$.

In contrast to this, in the optical connector cleaning tool in the aforementioned Patent document 5, while the fact that the head portion that is used to press the tape against the optical connector is able to be tilted is the same as in the cleaner described in Patent document 1, the head portion is supported such that it is able to be tilted by a plate spring-shaped spring portion that is molded in a curve, and this head portion is tilted by the elastic deformation of the spring portion when the head portion is pressed against the joining end surface of the optical connector that has been diagonally polished. Even when the head portion is tilted, there is almost no shift (or else no shift whatsoever) in the center position between the joining end surface of the optical connector and the distal end surface of the head portion, and the problem of only one side of the head portion and the joining end surface of the optical connector making contact does not arise. Moreover, compared with the technology described in Patent document 1, it is possible to reduce any uneven distribution in the pressing force of the tape pressing surface of the head portion which is pressing the cleaning tape against the joining end surface of the optical connector, and achieve an overall evenness thereof.

It should be noted that, as in Patent document 5, in an optical connector cleaning tool in which the head portion is tiltably supported by an elastically deformable spring portion, the structure is generally one in which the head portion is supported by the spring portion when the orientation of the tape pressing surface that presses the cleaning tape towards the joining end surface of the optical connector is perpendicular to the direction in which the tape is pressed against the joining end surface of the optical connector, or more specifically, is perpendicular to a center axis of a connector hole of the connector positioning housing into which the head portion is inserted that is used to house the optical connector (i.e. an optical connector plug).

However, it has recently been determined that when this type of cleaning tool is used for a joining end surface of an optical connector that has been diagonally polished, then depending on the direction of the tilt of the joining end surface of the optical connector, there are cases in which it is difficult to eradicate any unevenness in the distribution of the pressing force with which the tape pressing surface of the head portion presses the cleaning tape against the joining end surface of the optical connector.

This point will now be described with reference made to FIG. 37A through FIG. 37D.

FIG. 37A shows an example of an insertion portion 130 that protrudes from the above described optical connector cleaning tool.

In FIG. 37A, the insertion portion 130 is equipped with a head component 121 that is assembled in a protruding portion 131 that protrudes from the optical connector cleaning tool. Cleaning tape 122 is wound around a head plate 125 (i.e., a head portion) at the distal end of this head component 121.

Note that in FIG. 37A through FIG. 37D, for the insertion portion 130, the left side is described as being the front, the right side is described as being the rear, the top side is described as being the top, and the bottom side is described as being the bottom.

The head component 121 is formed by a head supporting portion 123 that is assembled in the protruding portion 131 of the optical connector cleaning tool, an elastically deformable circular plate-shaped spring portion 124 that protrudes from the distal end of the head supporting portion 123, and a head plate 125 that is supported on a protruding distal end 124a (i.e., a front end) that protrudes from the head supporting portion 123 of this spring portion 124.

The head plate 125 is supported on the head supporting portion 123 such that an end surface thereof (i.e., the front end surface—referred to below as a tape pressing surface 126) which is located on the side facing the optical connector (i.e., a ferrule 140—see FIG. 37B through FIG. 37D) that is to be cleaned is oriented so as to be perpendicular to the forward-rearward direction of the insertion portion 130.

The cleaning tape 122 is wound around the head plate 125 so as to be in contact with the tape pressing surface 126 of the head plate 125.

The spring portion 124 supports a central portion in the up and down direction of the head plate 125 at the protruding distal end 124a that protrudes from the head supporting portion 123.

In the head plate 125, the side above the protruding distal end 124a of the spring portion 124 where a curve apex portion 124b of the spring portion 124 is located (i.e., the portion above the protruding distal end 124a in FIGS. 37A to 37D) is described below as a 'spring apex portion side', while the opposite side therefrom (i.e., the portion below the protruding distal end 124a in FIGS. 37A to 37D) is described below as a 'spring rear side'.

FIGS. 37B through 37D are views showing states in which the cleaning 122 is pushed by the head component 121 against the joining end surface of the distal end of the ferrule 140 using the insertion portion of the above described cleaning tool.

However, in FIGS. 37B to 37D, the protruding portion 131 is not shown.

FIGS. 37B and 37C show a case in which the ferrule 140 is equipped with the diagonally polished joining end surface 141a (the symbol 141 is used below for this ferrule), while FIG. 37D shows a case in which the ferrule 140 is equipped with a flatly polished joining end surface (i.e., a joining end surface that is polished perpendicularly to the optical axis of an optical fiber 140a that is incorporated in the ferrule 140) 142a (the symbol 142 is used below for this ferrule).

The joining end surface 141a of the ferrule 141 shown in FIG. 37B and FIG. 37C are inclined surfaces that are inclined 8° compared to the joining end surface 142a of the ferrule 142 shown in FIG. 37D. However, the directions of the tilt of the joining end surface 141a are the opposite in FIG. 37B and FIG. 37C.

According to investigations made by the present inventors and others, in the case of FIG. 37C and FIG. 37D from among FIG. 37B to FIG. 37D, it is possible to achieve satisfactory uniformity in the pressing force with which the head plate 125 presses the cleaning tape 122 against the joining end surfaces 141a and 142a of the ferrules 141 and 142, however, in the case of FIG. 37B, compared with FIG. 37C and FIG. 37D, it was ascertained that there were instances in which there was considerable unevenness in the distribution of the pressing force.

Although the cause of this is unclear and needs to be investigated, it is thought to derive from the structure of the head component 121.

In the case of FIG. 37C and FIG. 37D, due to the pressing force with which the head plate 125 presses the cleaning tape 122 against the joining end surfaces 141a and 142a of the ferrules 141 and 142, the entire spring portion 124 is deformed, resulting in a uniform pressing force being achieved.

In the case of FIG. 37C, the head plate 125 (the orientation of this head plate 125 may also be referred to below as being 'flat' relative to the tilt of the joining end surface of the ferrules) which is perpendicular to the optical axis of the optical fiber 140a that is built into the ferrule 141 is pressed against the joining end surface 141a which is tilted relative to the optical axis, however, as a result of the deformation of the entire spring portion 124, the orientation of the head plate 125 changes so as to follow the tilt of the joining end surface 141a, and a uniform pressing force against the joining end surface 141a is achieved from the tape pressing surface 126.

In contrast to this, in the case of FIG. 37B, there is a tendency for the pressing force from the head plate 125 against the ferrule 141 to act more strongly, compared with other portions, on that portion where the amount of protrusion onto the insertion portion 130 side is greatest by the distal end of the ferrule 141 in which is formed the joining end surface 141a which is tilted relative to the optical axis of the optical fiber 140a.

In this case, due to the pressing of the head plate 125 against the protruding distal end of the ferrule 141, the spring apex portion side of the head plate 125 is pressed towards the rear in the pressing direction, so that the spring portion 124 is deformed and the orientation of the head plate 125 keeps changing as if it were rotating around a central portion between the end portion on the spring apex portion side of the head plate 125 and the end portion on the spring rear side. The orientation of the head plate 125 thus progresses from a state of being perpendicular relative to the optical axis of the optical fiber 140a that is incorporated in the ferrule 141 to a state of tilting to match the joining end surface 141a of the ferrule 141.

The spring rear side portion of the head plate 125 moves towards the front in the pressing direction while tilting in conjunction with the change in the orientation of the head plate 125.

In FIG. 37C, the change (i.e., the tilting), which is caused by the pressing of the head plate 125 against the ferrule 141, in the orientation of the head plate 125 from a state of being perpendicular relative to the optical axis of the optical fiber 140a that is incorporated in the ferrule 141 is caused by the spring portion 124, which is formed in an arch shape so as to bridge the gap between the head plate 125 and the head supporting portion 123, deforming such that the curvature radius thereof becomes smaller (i.e., the distance between the front and rear ends of the spring portion 124 becomes shorter).

Because the spring rear side portion of the head plate 125 is a portion that extends within the head plate 125 towards the rear side from the protruding distal end 124a of the arch-shaped spring portion 124 as if to lengthen the spring portion 124, if the spring rear side portion of the head plate 125 is pushed by the protruding distal end of the ferrule 141 towards the rear side relative to the spring apex portion side portion, then the spring portion 124 is deformed as if to shrink its curvature radius.

In addition, the elastic restorative force of the spring portion 124 acts as a pressing force of the head plate 125 against the joining end surface 141a.

In contrast to this, in the case shown in FIG. 37B, the orientation of the portion adjacent to the protruding distal end 124a of the spring portion 124 changes in correspondence with the change in the orientation of the head plate 125, and this latter change accompanies the pressing in of the spring apex portion side portion of the head plate 125 towards the rear side in the pressing direction relative to the spring rear side portion which is caused by the pressing of the head plate 125 against the ferrule 141. As a result of this, a deformation is applied to the portion on the protruding distal end 124a side from the curve apex portion 124b of the spring portion 124 such that, compared with the state before the head plate 125 was pressing against the ferrule 141, the protruding distal end 124a is pushed outwards towards the front relative to the curve apex portion 124b and there is an expansion in the curvature radius.

However, if the above described type of deformation in which the curvature radius is expanded occurs in the portion on the protruding distal end 124a side from the curve apex portion 124b of the spring portion 124, then due to the elastic restorative force of the spring portion 124 against the deformation, on the spring rear side of the head plate 125, the pressing force acts in the opposite direction from the pressing force of the head plate 125 against the ferrule 141.

Because of this, in the case of FIG. 37B, it is thought that the pressing force from the rear side of the head plate 125 against the ferrule 141 shows a tendency to become smaller compared with the spring apex portion side due to the elastic restorative force of the spring portion 124.

In the case of FIG. 37B, there is only a small amount of uneven distribution in the pressing force from the head plate 125 against the joining end surface 141a of the ferrule 141, and the effect on the cleaning ability does not pose any problems provided that the insertion portion is held in a predetermined orientation inside the positioning housing.

However, there is a possibility that, due to an operator over-tilting the cleaning tool during a manual operation or the like, there may be an increase in the unevenness of the distribution of the pressing force from the head plate 125 against the joining end surface 141a of the ferrule 141, or alternatively, due to the effects of vibration and the like, there is a possibility that the spring rear side portion of the head plate 125 may lift up slightly from the joining end surface of the ferrule.

Because of this, the development of a technology is demanded that makes it possible to achieve a satisfactory uniform pressing force from a cleaning tape against a joining end surface during a manual operation of a cleaning tool by an operator or to counteract an external force such as vibration or the like.

Note that, in the case of FIG. 37C, because there is no occurrence of the phenomenon in which bending deformation that pushes the protruding distal end 124a side forward relative to the curve apex portion 124b is not imparted to the portion on the protruding distal end 124a side of the curve apex portion 124b of the spring portion 124, the overall deformation of the spring portion 124 proceeds smoothly, and a sufficient capability to follow the joining end surface is ensured.

Of the above described types of cleaner which have an insertion portion in which a tape pressing head around which a cleaning tape has been wound is incorporated in the distal end of a protruding portion that protrudes from the tool main body, those having a structure in which the tape pressing head is positioned against the joining end surface of an optical connector inside the positioning housing when the distal end of the insertion portion that is inserted into the positioning housing is positioned within the positioning housing, namely, having a structure in which the insertion portion is plug compatible are widely employed.

For example, as in the above described Non-patent document 1, cleaners that are used to clean the joining end surface of a ferrule of an MPO (Multi-fiber Push-On) type optical connector (i.e., F13 type optical connectors which are regulated by JIS C 5982) are already being produced. In the case of these cleaners, in the same way as in an MPO type of optical connector (i.e., an optical connector plug—occasionally referred to below as an MPO plug), a plug compatible insertion portion is positioned by being inserted into an adaptor or receptacle positioning housing.

However, as is widely known, in an MPO plug, there is a correct orientation and an incorrect orientation in the orientation of the insertion into the positioning housing which is created a key that is formed in the MPO plug, and a key groove that is formed in a internal wall of a positioning housing such as an adaptor or receptacle, and, in the same way as in an MPO plug, the direction of the insertion into the positioning housing is also fixed for the insertion portion of a plug compatible cleaner. Namely, there is a correct direction and an incorrect direction in the insertion direction (i.e., the insertion orientation) of the protruding portion of the cleaner.

Because of this, an operator has to check the directions of the key and key groove at each insertion, however, when it is difficult to check the direction of the key groove due to the location where the positioning housing is installed and the orientation thereof, the problem arises that there is a deterioration in workability.

Moreover, when it is difficult to check the direction of the key groove due to the location where the positioning housing is installed and the orientation thereof, then when the insertion portion of a cleaning tool is inserted into the positioning housing and a cleaning operation is performed, it is easy for an operator to end up tilting the cleaning tool during the operation. Accordingly, the problem arises that a sufficient cleaning performance is not obtained from the cleaning tool.

Even if a cleaning tool is developed that has an insertion portion in which the problem of the insertion orientation being correct or incorrect is eliminated by structuring the positioning housing such that it has a correct direction in which the optical connector plug is to be inserted using a key groove or the like, then if an excellent cleaning performance is to be obtained, it is necessary to improve the ability of the head plate to follow the joining end surface of the optical connector (optical plug), and develop technology that makes it possible to secure an excellent cleaning performance irrespective of the correctness or otherwise of the orientation of the insertion portion when it is inserted into the positioning housing.

As in the case of Patent document 5, in an optical connector cleaning tool in which is provided a protruding portion (also referred to below as an insertion portion) in whose distal end is incorporated a tape pressing head whose head portion is tiltably supported by a plate spring-shaped spring portion that has been molded in a curve, typically, the insertion portion is structured such that the tape pressing head is positioned relative to the joining end surface of the optical connector within the positioning housing, namely, the insertion portion is plug compatible.

In a positioning housing, the two optical connectors are butted together and connected on an optical axis (i.e., a connection optical axis—includes cases in which the optical axis matches the center axis of the connector housing hole) that is parallel with the center axis of the connector housing hole (i.e., the hole in which the optical connector (the optical connector plug) is inserted). In an optical connector adaptor, the two optical connectors (optical connector plugs) that are inserted from both sides into the connector housing hole that penetrates this optical connector adaptor are butted together and connected in the connector housing hole on a connection optical axis that is parallel with the center axis of the connector housing hole. In an optical connector receptacle, the optical connector (ferrule) that is incorporated within this optical connector receptacle and the optical connector (optical connector plug) that is inserted into the connector housing hole are butted together and connected on a connection optical axis that is parallel with the center axis of the connector housing hole.

When the plug compatible insertion portion has been inserted into the positioning housing, then in a state in which a central portion of the tape pressing surface of the head portion of the tape pressing head has been positioned above the center axis (i.e., an axis that passes through the center of the joining end surface and is parallel with the center axis of the connector housing hole of the positioning housing) of the optical connector within the positioning housing by the inner surface of the connector housing hole, the head portion presses the cleaning tape against the joining end surface of the optical connector within the positioning housing.

It should be noted that positioning housings such as optical connector adaptors and optical connectors are currently produced by a number of makers, however, there is a lack of uniformity in the accuracy of the positioning of the optical connector within the connector housing hole that is a result of the accuracy with which the positioning housing and optical connector are assembled, or a result of specification differences and the like.

Moreover, there are also cases in which there is a sizeable error in the positioning of the optical connector within the connector housing hole of the positioning housing that is the result of shock received from a colliding object or is due to extended usage or the like.

Because of this, when the plug compatible insertion portion of an optical connector cleaning tool is inserted into a positioning housing, there are irregularities in the accuracy of the positioning of the head portion of the insertion portion relative to the optical connector that is being cleaned within the positioning housing which are caused by errors in the positioning of the insertion portion within the positioning housing. In consideration of this, in a conventional optical connector cleaning tool that has a plug compatible insertion portion, as is shown FIG. 6 and FIG. 7 in Patent document 5, for example, it is typical for a head portion having a somewhat larger tape pressing surface compared to the optical connector joining end surface to be employed (for example, FIG. 6 and FIG. 7, and the like in Patent document 5).

As in FIG. 6 and FIG. 7 of Patent document 5, in a structure in which a head portion having a somewhat larger tape pressing surface compared to the optical connector joining end surface is employed, in addition to errors in the positioning of the head portion relative to the joining end surface of the optical connector being cleaned, in order, for example, to be able to also deal with cases in which an operator over tilts the cleaning tool during a manual operation, and make it possible for a cleaning tape to be pressed by the tape pressing surface of the head portion against the entire joining end surface of a connector, dimensions are maintained in the tape pressing surface of the head portion that allow a certain amount of leeway to be anticipated. Because of this, as is shown in FIG. 38A through FIG. 38D, when a cleaning tape 311 is pressed by a head portion 301 against a joining end surface 321a of an optical connector 321 (here, an end surface of a distal end portion that protrudes from a housing 321a of a ferrule 322 that is incorporated in the housing distal end of the optical connector 321 (optical connector plug)—this may be referred to below on occasion as the joining end surface 321a of the ferrule 322), the joining end surface 321a of a ferrule 322 is pressed at a portion thereof that is located between an upstream side end portion 302a and a downstream side end portion 302b in the tape feeding direction of a tape pressing surface 302 of the head portion 301. Namely, it is normal for the upstream side end surface 302a and the downstream side end surface 302b in the tape feeding direction of the tape pressing surface 302 to be placed on the outer side of the joining end surface 321a of the ferrule 322.

FIG. 38A through FIG. 38D show a case in which an insertion portion 300 of an optical connector cleaning tool is inserted into a positioning housing in the form of an optical connector adapter 330, and a cleaning tape 311 that is wound around a head portion 301 of a tape pressing head 303 that is incorporated in the insertion portion 300 is pressed by the head portion 301 against the joining end surface 321a of the ferrule 322 of the optical connector 321 that is connected to the optical connector adapter 330, thereby cleaning the joining end surface 321a. In the optical connector adapter 330, the insertion portion 300 is inserted into the optical connector adapter 330 from the opposite side to the optical connector 321 that is connected to one side of the optical connector adapter 330.

In the structure shown in FIG. 38A through FIG. 38D, even when the accuracy of the positioning of the insertion portion 300 using the positioning housing 330 is poor, and there is a comparatively large error (i.e., an amount Δ of a shift shown in FIG. 38A between a center axis L2 of the portion of the connector housing hole in the optical connector adaptor 330 that houses the insertion portion 300 and a center axis L1 of the optical connector 321) in the positioning of the insertion portion 300 which has been inserted in the positioning housing 330 relative to the optical connector 321 (specifically, the joining end surface 321a of the ferrule 322) within the positioning housing 330, the ability of the head portion 301 to follow the joining end surface 321a of the ferrule 322 is secured by the elasticity of the spring portion 304 of the tape pressing head 303 which is incorporated in the insertion portion.

However, when an operator over-tilts the cleaning tool during a manual operation, there is considerable unevenness in the distribution of the pressing force with which the tape pressing surface 302 of the head portion 301 presses the cleaning tape 311 against the joining end surface 321a of the optical connector, and it has been found that the possibility of the tape pressing surface 302 of the head portion 301 lifting up slightly from the joining end surface 321a of the ferrule 322 is somewhat increased.

In the structure shown in FIG. 38B through FIG. 38D, as a result of the cleaning tape 311 that is pressed against the joining end surface 321a being fed from the upstream side end portion 302a towards the downstream side end portion 302b in the tape feeding direction of the tape pressing surface 302, a displacement force acts in a direction so as to follow the cleaning tape 311 in the ferrule 322 of the optical connector 321. This displacement force has a tendency to act most strongly on that portion of the outer peripheral angle portion of the joining end surface 321a of the ferrule 322 that is closest to the upstream side end portion 302a in the tape feeding direction of the tape pressing surface 302. Because of this, when a state is reached in which the pressing force on the cleaning tape 311 from the head portion 301 is concentrated, due to over-tilting of the cleaning tool or vibration or the like, on the angle portion of the outer periphery of the joining end surface 321a of the ferrule 322 that is closest to the upstream side end portion 302a in the tape feeding direction of the tape pressing surface 302, then the displacement force that is generated by the feeding motion of the cleaning tape 311 acts most strongly on the ferrule. As a result, there is a possibility that a displacement of the ferrule 322 that follows the feeding motion of the cleaning tape 311 will occur. If the ferrule is displaced, there is a strong possibility that the pressing force will become unevenly distributed, and that the tape pressing surface will lift up from the joining end surface of the ferrule. Moreover, if the ferrule 322 is displaced, then, in conjunction with this, the spring portion 304 of the tape pressing head 303 is forcibly elastically deformed, and the head portion 301 is also displaced.

Note that, when cleaning the joining end surface of a ferrule of an optical connector (an optical connector plug) such as an MPO type optical connector in which there is incorporated a spring for generating force to cause the two ferrules to butt together when the connectors are connected, even if a displacement that follows the feeding motion of the cleaning tape 311 is temporarily generated in the ferrule 322, then the ferrule 322 is restored to its original position by the elasticity of the spring.

The most important area to clean when the joining end surface 321a of the ferrule 322 is being cleaned is the area in the central portion of the joining end surface 321a where the end surface of the optical fiber 323 is exposed (also referred to below as the 'fiber exposure area'—see the fiber exposure area 66a shown in FIG. 31 as an example thereof).

For example, if a narrow cleaning tape is used whose width dimension has been limited within a range that makes it possible to clean the entire fiber exposure area, then it is possible to some extent to reduce contact resistance between the ferrule 322 of the optical connector 321 that is being cleaned and the cleaning tape. However, there is a limit as to how far the width dimension of the cleaning tape can be reduced, and the reduction effect in the contact resistance obtained as a result of the pressing force of the cleaning being concentrated in angle portions on the outer periphery of the joining end surface 321a of the ferrule 322 is small.

Currently, there is no suitable technology that makes it possible to suppress following displacement in an optical connector (more specifically, a ferrule in the above example) which accompanies the feeding movement of the cleaning tape and the development thereof is sought.

SUMMARY OF THE INVENTION

In view of the above described problems, it is an object of the present invention to provide an optical connector cleaning tool and an optical component cleaning tool that make it possible to secure an excellent cleaning performance irrespective of the insertion orientation of an insertion portion in a housing that houses an optical connector or other optical components.

In view of the above described problems, it is an object of the present invention to provide an optical connector cleaning tool that are able to suppress following displacement in an optical connector which accompanies the feeding movement of a cleaning medium, and, as a result, to improve the consistency of the cleaning performance.

According to a first aspect of the present invention, there is provided an optical connector cleaning tool that wipes clean a joining end surface of an optical connector using a feeding movement of a cleaning medium, wherein the optical connector cleaning tool is equipped with a tool main body in which is incorporated a cleaning medium feeding mechanism that feeds out or takes up the cleaning medium, and with an insertion portion that protrudes from the tool main body and is inserted into a connector positioning housing that is used to house and connect the optical connector. A cleaning medium pressing mechanism onto which a portion of the cleaning medium that has been pulled out from the tool main body is wound is provided in the insertion portion, and the cleaning medium pressing mechanism has a head component in which is formed a cleaning medium pressing surface that secures a contact surface area for the cleaning medium to be in contact with the joining end surface of the optical connector, and has a head supporting portion that supports the head component on a tilt relative to the direction in which the cleaning medium pressing surface is pressing the optical connector. The head supporting portion is equipped with a supporting portion main body that is mounted on a protruding portion that protrudes from the tool main body, and with a circular arc-shaped or waveform tilt spring that protrudes from a front end in the direction of the pressing against the optical connector of the supporting portion main body, and the head component is supported at a protruding distal end that protrudes from the supporting portion main body of the tilt spring such that it can be tilted by an elastic deformation of the tilt spring. The head component extends so as to project outwards from the protruding distal end that protrudes from the supporting portion main body of the tilt spring to a spring apex portion side, which is the side of a curve apex portion that is closest to the head component of the tilt spring, and to a spring rear side, which is the opposite side therefrom, and the cleaning medium pressing surface tilts gradually forwards in the direction of the pressing against the optical connector as it moves from an end portion on the spring apex portion side of the head component towards an end portion on the spring rear side thereof.

A second aspect of the present invention is characterized in that, in the first aspect, the tilt spring has a circular arc shape or a waveform shape.

A third aspect of the present invention is characterized in that, in the first aspect, a tilt angle ($\theta 1$) of the cleaning medium pressing surface is the same as or greater than a tilt angle ($\theta 2$) of a diagonally polished joining end surface of the optical connector.

A fourth aspect of the present invention is characterized in that, in the first aspect, the supporting portion main body includes: a mounting portion that is fixed to the protruding portion; and compression springs that are compressed by a pressing force that presses the head component which is provided between the mounting portion and the tilt spring against the joining end surface of the optical connector.

A fifth aspect of the present invention is characterized in that, in the first aspect, the cleaning medium pressing mechanism is a molded product made from synthetic resin in which the head component and the head supporting portion are formed as a single unit.

A sixth aspect of the present invention is characterized in that, in the fourth aspect, the compression springs are formed in a waveform shape, and an elastic bridging portion is constructed between the mounting portion and the tilt spring by the compression springs that are arranged in two parallel rows.

A seventh aspect of the present invention is characterized in that, in the first aspect, the cleaning medium is wound onto the head component such that the spring rear side of the head component is on the upstream side in the flow direction of the cleaning medium compared to the spring apex portion side.

A eighth aspect of the present invention is characterized in that, in the seventh aspect, guide grooves that prevent any shift in the transverse direction of the cleaning medium are formed in an end portion of the head component on a spring apex portion side and a spring rear side thereof via the cleaning medium pressing surface, and portions of the cleaning medium on the upstream side and downstream side in the flow direction thereof via the cleaning medium pressing surface are housed in the guide grooves.

A ninth aspect of the present invention is characterized in that, in the first aspect, the positioning housing is equipped with a connector housing hole that houses an optical connector, and a key groove that is formed in an inner surface of the connector housing hole in a groove shape that extends in the direction of the center axis of the connector housing hole and into which is inserted a key that protrudes from a side portion of the optical connector, and the cleaning medium pressing mechanism is incorporated in a distal end of the protruding portion of the tool main body, and the insertion portion, which is constructed such that it can be inserted into the positioning housing, is able to be inserted only into the connector housing hole from among the connector housing hole and the key groove of the positioning housing, and also the insertion portion has a front-rear symmetrical cross-sectional outer configuration that, through front-rear inversion, enables it to be inserted in both a normal and a reverse insertion direction into the connector housing hole in which the key groove side and the opposite side from the key groove side have symmetrical cross-sectional configurations.

According to a tenth aspect of the present invention, there is provided an optical component cleaning tool that wipes clean an end surface of an optical component using a feeding movement of a cleaning medium, wherein the optical connector cleaning tool is equipped with a tool main body in which is incorporated a cleaning medium feeding mechanism that feeds out or takes up the cleaning medium, and with an insertion portion that protrudes from the tool main body and is inserted into a housing that houses the optical component. A cleaning medium pressing mechanism onto which a portion of the cleaning medium that has been pulled out from the tool main body is wound is provided in the insertion portion, and the cleaning medium pressing mechanism has a head component in which is formed a cleaning medium pressing surface that secures a contact surface area for the cleaning medium to be in contact with the end surface of the optical component, and has a head supporting portion that supports the head component on a tilt relative to the direction in which the cleaning medium pressing surface is pressing the optical component. The head supporting portion is equipped with a supporting portion main body that is mounted on a protruding portion that protrudes from the tool main body, and with a circular arc-shaped or waveform tilt spring that protrudes from a front end in the direction of the pressing against the optical component of the supporting portion main body, and the head component is supported at a protruding distal end that protrudes from the supporting portion main body of the tilt spring such that it can be tilted by an elastic deformation of the tilt spring, and the head component extends so as to project outwards from the protruding distal end that protrudes from the supporting portion main body of the tilt spring to a spring apex portion side, which is the side of a curve apex portion that is closest to the head component of the tilt spring, and to a spring rear side, which is the opposite side therefrom, and the cleaning medium pressing surface tilts gradually forwards in the direction of the pressing against the optical component as it moves from an end portion on the spring apex portion side of the head component towards an end portion on the spring rear side thereof.

According to an eleventh aspect of the present invention, there is provided an optical connector cleaning tool that wipes clean an end surface of an optical component using a feeding movement of a cleaning medium, wherein the optical connector cleaning tool is equipped with a tool main body in which is incorporated a cleaning medium feeding mechanism that feeds out or takes up the cleaning medium, and with a cleaning medium pressing mechanism that is incorporated in the protruding portion that protrudes from the tool main body and that presses a portion of the cleaning medium that has been pulled out from the tool main body against the end surface of the optical component. The cleaning medium pressing mechanism has a head component in which is formed a cleaning medium pressing surface that secures a contact surface area for the cleaning medium to be in contact with the end surface of the optical component, and has a head supporting portion that supports the head component on a tilt relative to the direction in which the cleaning medium pressing surface is pressing the optical component, and the head supporting portion is equipped with a supporting portion main body that is mounted on the protruding portion that protrudes from the tool main body, and with a circular arc-shaped or waveform tilt spring that protrudes from a front end in the direction of the pressing against the optical component of the supporting portion main body. The head component is supported at a protruding distal end that protrudes from the supporting portion main body of the tilt spring such that it can be tilted by an elastic deformation of the tilt spring, and the head component extends so as to project outwards from the protruding distal end that protrudes from the supporting portion main body of the tilt spring to a spring apex portion side, which is the side of a curve apex portion that is closest to the head component of the tilt spring, and to a spring rear side, which is the opposite side therefrom, and the cleaning medium pressing surface tilts gradually forwards in the direction of the pressing against the optical component as it moves from an end portion on the spring apex portion side of the head component towards an end portion on the spring rear side thereof.

Note that the connector according to the first through ninth aspects of the present invention may be regarded as an example of the optical component according to the tenth and eleventh aspects of the present invention.

Furthermore, the structure of the second through ninth aspects of the present invention can also be applied in the tenth and eleventh aspects of the present invention by replacing the term 'optical connector' with the term 'optical component', the term 'joining end surface' with the term 'end surface', and the term 'connector positioning housing' with the term 'housing'.

According to a twelfth aspect of the present invention, there is provided an optical connector cleaning tool that wipes clean joining end surfaces of optical connectors using a feeding movement of a cleaning medium, wherein the optical connector cleaning tool is equipped with a tool main body in which is incorporated a cleaning medium feeding mechanism that feeds out or takes up the cleaning medium, and with an insertion portion that protrudes from the tool main body and, as a result of being inserted into the connector housing hole of a connector positioning housing, which is an optical connector adaptor or an optical connector receptacle, presses the cleaning medium that has been wound onto the head component against the joining end surfaces of the optical connectors using the head component on which has been formed the cleaning medium pressing surface that presses the cleaning medium against the joining end surfaces of the optical connectors. The head component is provided at the distal end of the insertion portion and is supported such that it can be tilted by the spring portion, and the position of the head component in the insertion portion is set such that, when the insertion portion is inserted into the connector housing hole of the positioning housing, a portion of the cleaning medium pressing surface that includes an upstream side end portion in the flow direction of the cleaning medium presses the cleaning medium against the joining end surface of the optical connector within the positioning housing.

A thirteenth aspect of the present invention is characterized in that, in the twelfth first aspect, the insertion portion is equipped with the cleaning medium pressing mechanism that has the head component and has the head supporting portion that is mounted on the protruding portion which protrudes from the tool main body and that supports the head component, and the head supporting portion of the cleaning medium pressing mechanism is equipped with a supporting portion main body that is mounted on the protruding portion that protrudes from the tool main body, and with a circular arc-shaped or waveform tilt spring that protrudes from a front end in the direction of the pressing against the optical connectors of the supporting portion main body and that functions as the spring portion, and the head component is supported at a protruding distal end that protrudes from the supporting portion main body of the tilt spring such that it can be tilted by an elastic deformation of the tilt spring.

A fourteenth aspect of the present invention is characterized in that, in the thirteenth aspect, the head component extends so as to project outwards from the protruding distal end that protrudes from the supporting portion main body of the tilt spring to a spring apex portion side, which is the side of a curve apex portion that is closest to the head component of the tilt spring, and to a spring rear side, which is the opposite side therefrom, and the cleaning medium pressing surface tilts gradually forwards in the direction of the pressing against the optical components as it moves from an end portion on the spring apex portion side of the head component towards an end portion on the spring rear side thereof.

A fifteenth aspect of the present invention is characterized in that, in the fourteenth aspect, the tilt angle ($\theta 1$) of the cleaning medium pressing surface is the same as or greater than the tilt angle ($\theta 2$) of a diagonally polished joining end surface of the optical connector.

A sixteenth aspect of the present invention is characterized in that, in the fourteenth aspect, the cleaning medium is wound onto the head component such that the spring rear side of the head component is on the upstream side in the flow direction of the cleaning medium compared to the spring apex portion side.

A seventeenth aspect of the present invention is characterized in that, in the sixteenth aspect, guide grooves that prevent any shift in the transverse direction of the cleaning medium are formed in an end portion of the head component on a spring apex portion side and a spring rear side thereof via the cleaning medium pressing surface, and portions of the cleaning medium on the upstream side and downstream side in the flow direction thereof via the cleaning medium pressing surface are housed in the guide grooves.

A eighteenth aspect of the present invention is characterized in that, in the thirteenth aspect, the supporting portion main body is equipped with a mounting portion that is fixed to the protruding portion, and compression springs that are compressed by a pressing force that presses the head component which is provided between the mounting portion and the tilt spring against the joining end surface of an optical connector.

A nineteenth aspect of the present invention is characterized in that, in the eighteenth aspect, the compression springs are formed in a waveform shape, and an elastic bridging portion is constructed between the mounting portion and the tilt spring by the compression springs that are arranged in two parallel rows.

A twentieth aspect of the present invention is characterized in that, in the thirteenth aspect, the cleaning medium pressing mechanism is a molded product made from synthetic resin in which the head component and the head supporting portion are formed as a single unit.

A twenty-first aspect of the present invention is characterized in that, in the thirteenth aspect, the tilt spring has a circular arc shape or a waveform shape.

A twenty-second aspect of the present invention is characterized in that, in the twelfth aspect, the connector positioning housing includes a connector housing hole into which the optical connector can be removably inserted, and a key groove that is formed in an inner surface of the connector housing hole in a groove shape that extends in the direction of the center axis of the connector housing hole and into which is inserted a key that protrudes from a side portion of the optical connector.

A twenty-third aspect of the present invention is characterized in that, in the twenty-second aspect, the insertion portion is constructed such that it can be inserted only into the connector housing hole from among the connector housing hole and the key groove of the positioning housing, and also the insertion portion has a front-rear symmetrical cross-sectional outer configuration that, through front-rear inversion, enables it to be inserted in both a normal and a reverse insertion direction into the connector housing hole in which the key groove side and the opposite side from the key groove side have symmetrical cross-sectional configurations.

According to a twenty-fourth aspect of the present invention, there is provided an optical connector cleaning tool that wipes clean joining end surfaces of optical connectors using a feeding movement of a cleaning medium, wherein the optical connector cleaning tool is equipped with a tool main body in which is incorporated a cleaning medium feeding mechanism that feeds out or takes up the cleaning medium, and with an insertion portion that protrudes from the tool main body and, as a result of being inserted into the connector housing hole of a connector positioning housing, which is an optical connector adaptor or an optical connector receptacle, presses the cleaning medium that has been wound onto the head component against the joining end surfaces of the optical connectors using the head component in which has been formed the cleaning medium pressing surface that presses the cleaning medium against the joining end surfaces of the optical connectors. The head component is provided at the distal end of the insertion portion and is supported such that it can be tilted by the spring portion, and when the insertion portion is inserted into the connector housing hole of the positioning housings, the upstream side end portion and the downstream side end portion of the cleaning medium pressing surface of the head component in the flow direction of the cleaning medium are separated on two sides of a center axis of a portion of the connector housing hole of the positioning housings where the insertion portion is housed, and the center position of the cleaning medium pressing surface of the head component is offset from the center axis of the connector housing hole such that the distance that the upstream side end portion is separated from the center axis is smaller compared to the downstream side end portion.

According to the present invention, a head component, which is used for pressing a cleaning medium, is supported at the distal end of the tilt spring of a cleaning medium pressing mechanism, which is incorporated in a protruding portion which protrudes from a tool main body, at an attitude in which a cleaning medium pressing surface that is formed in the head component is tilted gradually forwards in the direction of the pressing against an optical connector or optical component as it moves from an end portion on the spring apex portion side, which is the side of a curve apex portion of the tilt spring which is the closest portion thereof to the head component, towards an end portion on the spring rear side thereof, which is the opposite side from the spring apex portion side.

An optical connector cleaning tool will now be described. When cleaning the joining end surface of an optical connector that is equipped with a tilting joining end surface (i.e., a joining end surface which tilts relative to the optical axis when a connector is connected), which has been diagonally polished, a portion that has a cleaning medium pressing mechanism incorporated into a protruding portion thereof which protrudes from the tool main body, and that is inserted into a positioning housing (referred to below as an insertion portion) is inserted into the positioning housing such that a tilted cleaning medium pressing surface of the head component of this insertion portion is oriented with the tilted joining end surface of the optical connector, or, conversely, such that the tilt of the cleaning medium pressing surface is oriented opposite to the tilt of the joining end surface of the optical connector.

Irrespective of which way the insertion portion has been inserted into the connector positioning housing, when a pressing force is applied from the head component against the joining end surface of an optical connector, then it is possible for the cleaning medium pressing surface of the head component to follow the tilted joining end surface extremely closely as a result of the elastic deformation of the tilt spring. Because of this, a uniform pressing force of the cleaning medium against the joining end surface of the optical connec-
tor (or optical connector plug) can be satisfactorily achieved, and an excellent cleaning performance can be reliably maintained.

In the case of an optical component cleaning tool as well, when the insertion portion of a cleaning tool is inserted into the optical component housing hole of a housing that houses an optical component, and the surface of the optical component which is tilted relative to the center axis of the optical component housing hole is cleaned, in the same way as for the above described optical connector cleaning tool, an excellent cleaning performance can be reliably maintained. In this case, the tilted cleaning medium pressing surface of the head component is oriented with the tilt of the end surface of the optical component, or, conversely, has the opposite orientation.

According to the optical connector cleaning tool, when an insertion portion that is provided with a cleaning medium pressing mechanism that is equipped with a head component for pressing a cleaning medium is inserted into the connector housing hole of a connector positioning housing, and the cleaning medium is pressed by the cleaning medium pressing surface of the head component against the joining end surface of the optical connector being cleaned which has been placed within the connector positioning housing, the end portion of the cleaning medium pressing surface of the head component which is on the upstream side in the flow direction of the cleaning medium is placed at a position facing the joining end surface of the optical connector being cleaned which has been placed inside the connector positioning housing, and presses the cleaning medium against this joining end surface. Namely, because a structure is employed in which it is possible to avoid a situation in which the cleaning medium is pressed against a corner portion of the joining end surface of the optical connector, it is possible to avoid a phenomenon in which the pressing force of the cleaning medium becomes concentrated on the corner portion of the outer edge of the joining end surface of an optical connector (more specifically, a ferrule), which causes the contact resistance between the optical connector and the cleaning medium to increase, as was illustrated in FIGS. 38B to 38D. Accordingly, compared with the case shown in FIGS. 38B to 38D, it is possible to reduce the contact resistance between the optical connector and the cleaning medium. As a result, it is possible to effectively prevent following displacement of the optical connector which is generated by the feeding movement of the cleaning medium. This results in it being possible to improve the consistency of the cleaning performance.

BRIEF DESCRIPTION OF THE DRAWINGS

The above and still further objects, features and advantages of the present invention will become apparent upon consideration of the following detailed description of the specific embodiments thereof, particularly when taken in conjunction with the accompanying drawings wherein like reference numerals in the various figures are utilized to designate like components.

FIGS. 1A and 1B are views showing the exterior of an optical connector cleaning tool according to a first embodiment of the present invention, with FIG. 1A being a plan view and FIG. 1B being a front view.

FIGS. 10A, 10B, 10C and 10D are respectively a front view, a plan view, a left side view, and a right side view of a head unit of the present cleaning tool.

FIGS. 12A, 12B, 12C and 12D are respectively a front view, a plan view, a left side view, and a right side view of a guide cap of the present cleaning tool.

FIGS. 23A to 23D are respectively a front view, a plan view, a left side view, and a right side view of a head unit of the present cleaning tool.

DETAILED DESCRIPTION OF THE INVENTION

An optical connector cleaning tool (i.e., an optical component cleaning tool) in which the present invention has been applied will now be described with reference made to the drawings.

FIGS. 1 to 22 are views showing a first embodiment of the optical connector cleaning tool (referred to below simply as 'cleaning tool') of the present invention.

Figure 19:
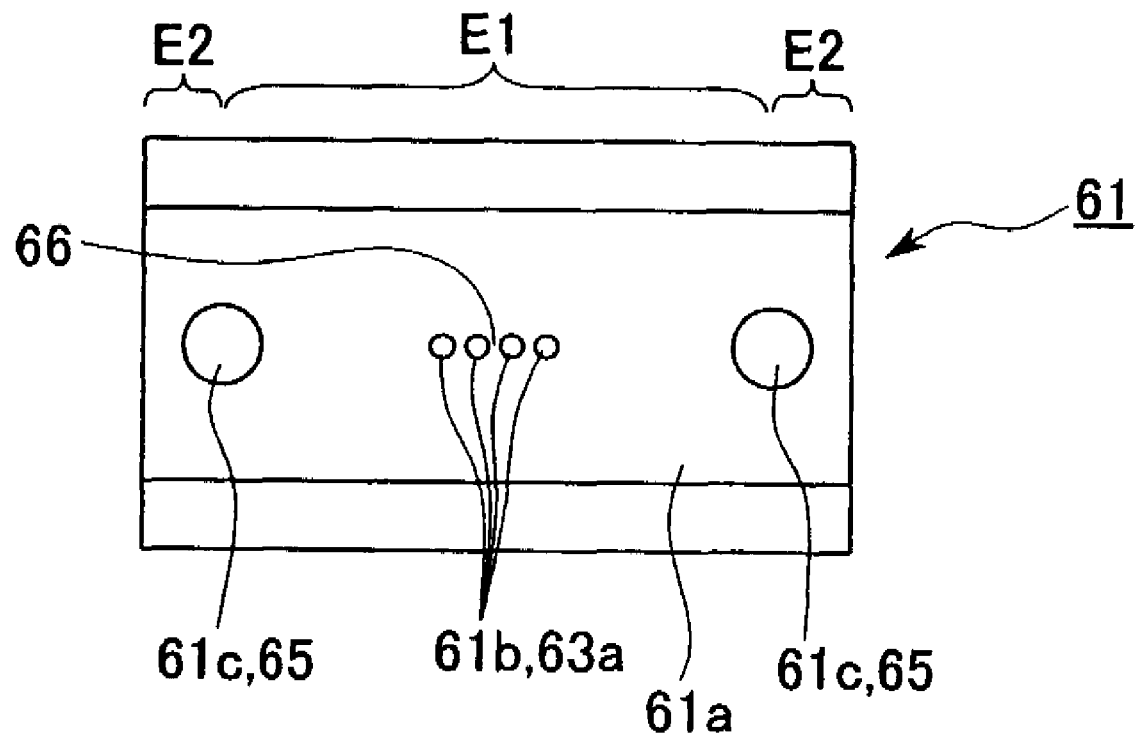
FIG. 19 is a front view showing an example of a ferrule of an optical connector plug.
Figure 21:
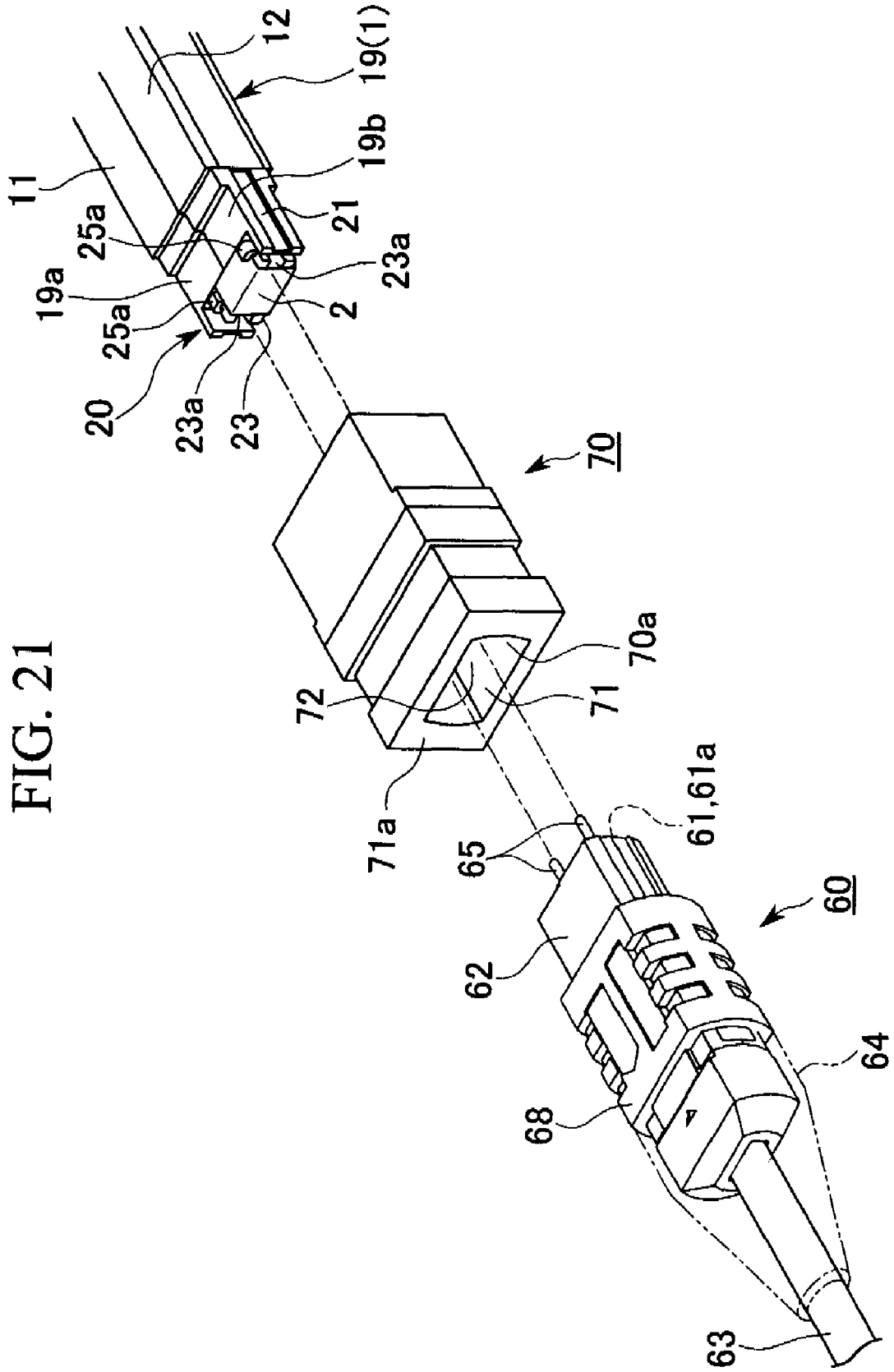
FIG. 21 is an exploded perspective view showing as state in which an optical connector plug and the insertion portion of the present cleaning tool are inserted into an optical connector adapter.

As is shown in FIG. 19 and FIG. 21, an optical connector plug 60 (an optical connector—also referred to below simply as an optical plug) and an optical connector adaptor 70 (connector positioning housing—referred to below on occasion simply as an optical adaptor) in which a cleaning tool 1 of the present embodiment is applied here are MPO-type (MPO: multifiber push on) optical connectors which are regulated by JIS C 5982 and the like.

The optical plug 60 is an optical connector plug having a structure in which an MT-type optical connector ferrule 61 (MT: mechanically transferable—referred to below simply as a 'ferrule') which is regulated by JIS C 5981 and the like is housed in a distal end portion of a sleeve-shaped housing 62 which is made from plastic, and the overall optical connector plug 60 is formed having a flat cross-section configuration when the exterior thereof is viewed.

In the description given below, a direction (i.e., an up and down direction in FIG. 19) corresponding to the short side of the flat shape of the ferrule 61 of the optical plug 60 is referred to on occasion as the thickness direction, while a direction (i.e., a left-right direction in FIG. 19) corresponding to the long side thereof is referred to on occasion as the transverse direction. Moreover, in correspondence with the thickness direction and the transverse direction of the ferrule 61, in the same way, these directions are also referred to as the thickness direction and the transverse direction in the optical plug 60 in whose housing 62 the ferrule 61 is housed, and in an insertion portion 20 (described below) of the cleaning tool 1 in which the optical adaptor 70 is inserted.

Note that the optical plug 60 and the ferrule 61 also function as optical components to which the optical component cleaning tool according to the present invention is to be applied.

Moreover, the optical adapter 70 also functions as an optical component housing into which is inserted an insertion portion which is formed by incorporating a cleaning medium pressing mechanism in a protruding portion that protrudes from a tool main body of the optical component cleaning tool according to the present invention.

As is shown in FIG. 19, a predetermined number of (here, four) optical fiber holes 61b (i.e., micro holes) are formed in a pattern in the vicinity of a center position 66 of a joining end surface 61a of the ferrule 61. An optical fiber 63 here has four optical fiber tape cores. As a result of optical fibers 63a (i.e., bare optical fibers) which are obtained by removing the resin coating from the distal end portion of the optical fiber 63 being inserted into the optical fiber holes 61b of the ferrule 61, a termination is formed at the end of the optical fiber 63 that allows it to be butted against and connected to another optical connector. In addition, the optical fiber 63 is passed through the interior of the optical plug 60 and pulled out from the rear end of the optical plug 60. By then housing the optical fiber 63 that has been pulled out from the rear end of the optical plug 60 in a boot 64 that is provided at the rear end side in the connecting direction (i.e., on the bottom left side in FIG. 21) of the housing 62, any sharp bending or the like in the vicinity of the rear end of the optical plug 60 is prevented.

Note that the optical fiber is 63 is not particularly restricted provided that it is suitable for being terminated using the relevant optical plug and, for example, an optical fiber cord that has single core or multi core optical fiber cores, and has these optical fiber core wires housed in a tube can be used.

Guide pin holes 61c are provided on both outer sides in the transverse direction of the optical fiber holes 61b in the joining end surface 61a of the ferrule 61. Ferrules 61 are positioned with a high degree of accuracy relative to each other via protruding components 65 (i.e., guide pins) that are provided so as to protrude from the joining end surface 61a and be inserted into the guide pin holes 61c using a known guide pin engagement type of positioning mechanism, so that end surface of the optical fibers 63a are butted against each other and can be connected together. In addition, as a result of this, the optical fibers 63 that are terminated in the respective ferrules 61 are optically connected together.

Figure 17:
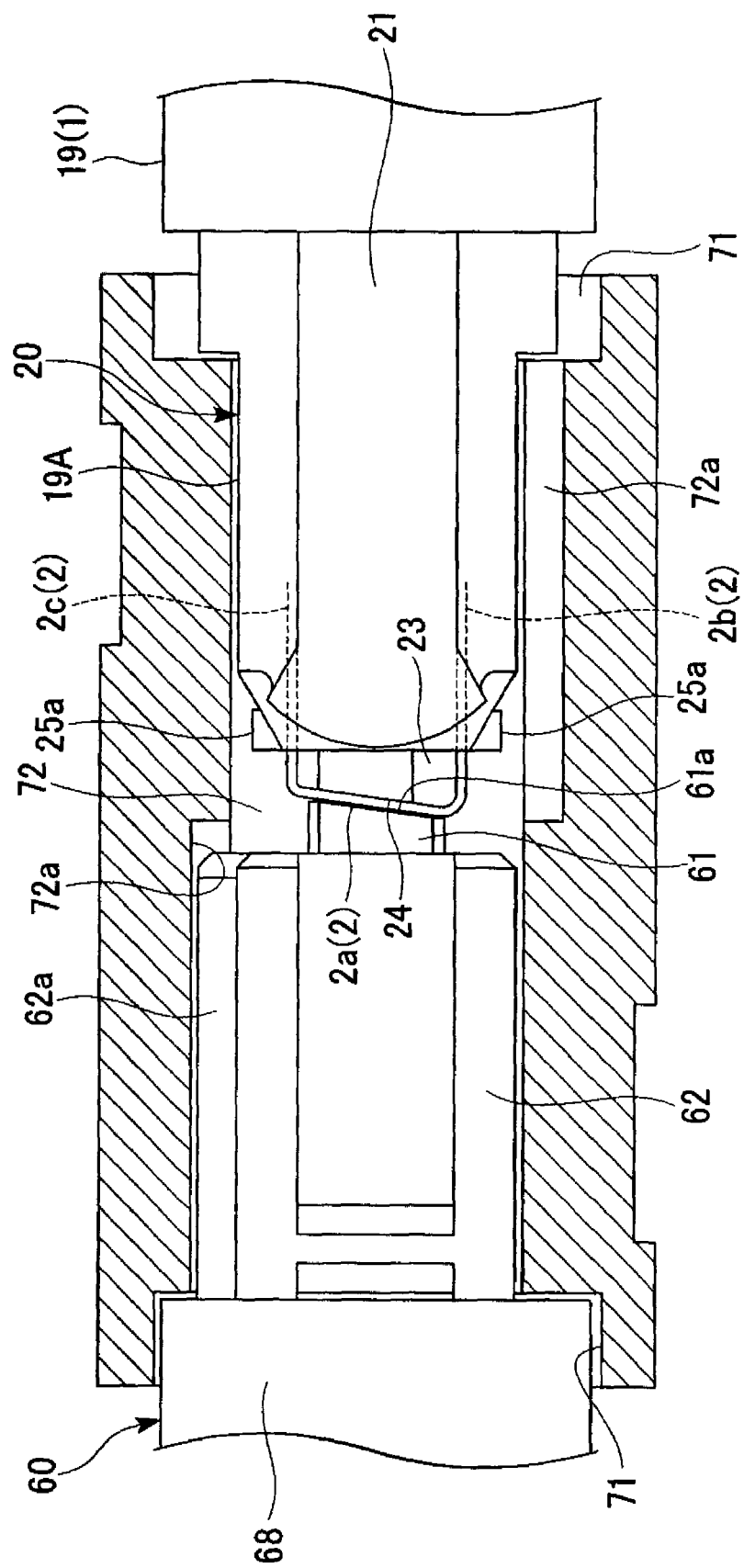
FIG. 17 is a schematic view showing a state in which the diagonally polished joining end surface of an optical connector plug is butted against the distal end surface of the head component.

As is shown in FIGS. 21 and 17, the optical adaptor 70 is formed in a sleeve shape in which two sides of a connector housing hole 72 (i.e., an optical component housing hole) form connector insertion apertures 71. The optical plug 60 can be housed within the connector housing hole 72 by being inserted through the connector insertion aperture 71.

Note that the optical adaptor 70 referred to in the present invention is a relay instrument that positions the optical connectors 60 on both sides thereof and connects them together in a fixed manner. Accordingly, it is not necessary for the optical connectors 60 on both sides that are connected to the optical adaptor 70 to have the same configuration as each other. An optical adaptor is also able to connect together optical plugs having different configurations.

When an optical plug 60 is inserted through the connector insertion aperture 71 of the optical adaptor 70, the optical plug 60 is housed in the connector housing hole 72 while any displacement thereof in a direction offset from the insertion direction is prevented. When two optical plugs 60 are inserted into the optical adaptor 70, the ferrules 61 are butted together inside the optical adaptor 70, which results in the optical fibers 63 that terminate in the respective ferrules 61 being optically connected together.

In this type of optical connector 60, when the ferrules 61 are fitted inside the optical adaptor 70, they are urged by springs (not shown) that are built into the housing 62 so that pressing force acts on each ferrule 61.

In the optical adaptor 70, in the same way as in a commonly known MPO-type optical connector, a key groove 72a that is able to be engaged with a key 62a that is formed in the housing 62 of the optical plug 60 is provided in an inner wall 70*a* that forms an inner surface facing the connector housing hole 72 of the optical adaptor 70. The key 62*a* and the key groove 72*a* are only formed on one side surface of the two sides in the thickness direction respectively of the housing 62 of an optical plug 60 and a connector insertion aperture 71 of the optical adaptor 70, and if the orientations of the key 62*a* and the key groove 72*a* do not match, then the optical plug 60 cannot be inserted into the connector insertion aperture 71 of the optical adaptor 70. As a result, it is possible to prevent errors such as the optical plug 60 being inserted into the optical adaptor 70 with the orientation in the thickness direction of the optical plug 60 being reversed (i.e., a reverse insertion).

Furthermore, although there is no special drawing thereof, as is commonly known, elastic engaging pieces that have engaging claws on a distal end thereof are provided on the optical adaptor 70 so as to extend along the inner wall 70*a* of the optical adaptor 70 towards the connector insertion apertures 71. In addition, engaging recessed locations that are capable of engaging with the engaging claws of the elastic engaging pieces are provided on side surfaces on both sides in the transverse direction of the housing 62 of the optical plug 60.

A coupling 68 is fitted onto the outer circumference of the housing 62 of the optical plug 60 so as to form a commonly known slide lock mechanism. When the engaging claws are engaged in the engaging recessed locations, the coupling 68 presses the elastic engaging pieces from the outer side and prevents the engagement between the engaging claws and the engaging recessed locations from being released.

When an optical plug 60 is inserted through the connector insertion aperture 71 into the optical adaptor 70, then due to the engagement between the engaging recessed locations and the engaging claws, the optical plug 60 is housed in the connector housing hole 72 while any displacement thereof in a direction away from the insertion direction is prevented.

When two optical plugs 60 are inserted into the optical adaptor 70, the joining end surfaces of the optical fibers 63*a* that are held fixed in the ferrules 61 inside the optical adaptor 70 are butted together, which results in the optical fibers 63 that terminate in the respective ferrules 61 being optically connected together.

As is shown in FIGS. 1A to 5, and FIG. 17 and the like, the cleaning tool 1 that can be used to clean the joining end surface 61*a* of the optical plug 60 is equipped with a tool main body 10 in the interior of which is housed a cleaning medium 2, a cleaning medium feeding mechanism 3 that is incorporated in this tool main body 10, and a head unit 4 that is incorporated in a distal end portion 19A of a protruding portion 19 that protrudes from the tool main body 10.

The head unit 4 is equipped with a head component 23 that presses the cleaning medium 2 against the joining end surface 61*a*. The cleaning medium 2 is wound onto this head component 23.

The protruding portion 19 that protrudes from the tool body 10 and the head unit 4 that is incorporated in the distal end portion 19A of the protruding portion 19 constitute an insertion portion 20 that is formed such that it is able to be inserted in the connector housing hole 72 of the optical adapter 70.

The tool main body 10 is equipped with a case-shaped feeding mechanism incorporating portion 10A in which the cleaning medium feeding mechanism 3 is incorporated, and the elongated cylindrical protruding portion 19 that protrudes towards the outer side from this feeding mechanism incorporating portion 10A. The tool main body 10 has a tapered configuration which gradually narrows from the feeding mechanism incorporating portion 10A moving towards the protruding portion 19. The head unit 4 is provided in a distal end (i.e., a distal end portion 19A—the end on the left side in FIG. 1A) of the elongated cylindrical protruding portion 19 at the distal end portion of the tool main body 10.

As is shown in FIG. 1A, here, the tool main body 10 has a two-piece structure made up of a first and second case half body 11 and 12 that are formed from a plastic such as polystyrene (PS), polyoxymethylene (POM, polyacetal), or the like.

As is shown in FIGS. 2A and 2B and FIGS. 3A and 3B, the case half bodies 11 and 12 have a structure that enables them to be joined together, for example, by the engaging together of engaging pins 13*a* through 13*d* and engaging holes 14*a* through 14*d* that are formed facing each other on the inner sides of the first case half body 11 and the second case half body 12.

As is shown in FIGS. 2A and 2B, FIGS. 3A and 3B, and FIG. 21, the protruding portion 19 which is a part of the tool main body 10 also has a two-piece structure made up of protruding portion half bodies 19*a* and 19*b* which are protruding pieces protruding respectively from the case half bodies 11 and 12, and the protruding portion 19 is opened or closed by the opening or closing of the case half bodies 11 and 12.

Note that this structure of the tool main body 10 is nothing more than an example thereof and is not intended to particularly limit the present invention.

Figure 4:
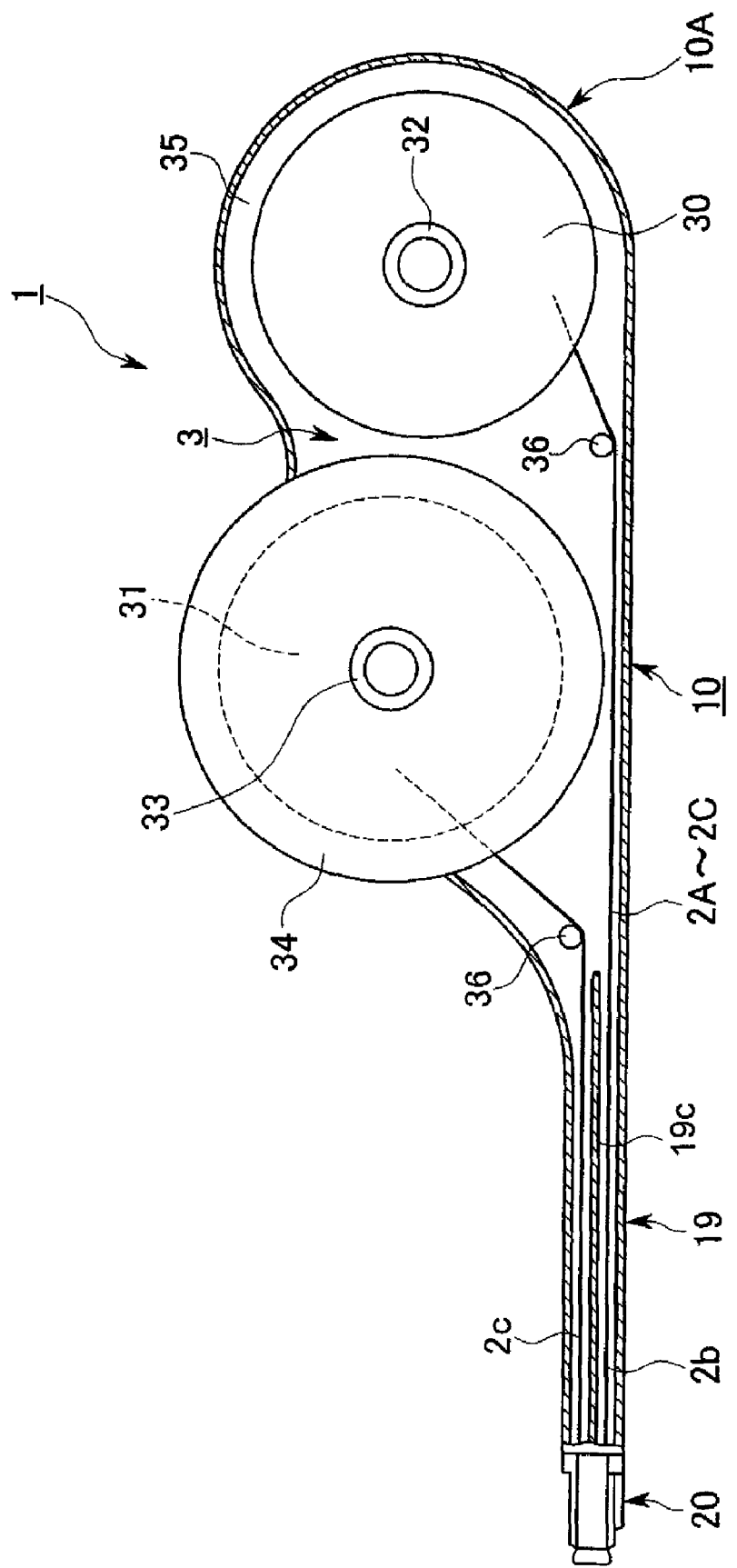
FIG. 4 is a cross-sectional view showing inner portions of the cleaning tool shown in FIG. 1A and FIG. 1B.
Figure 5:
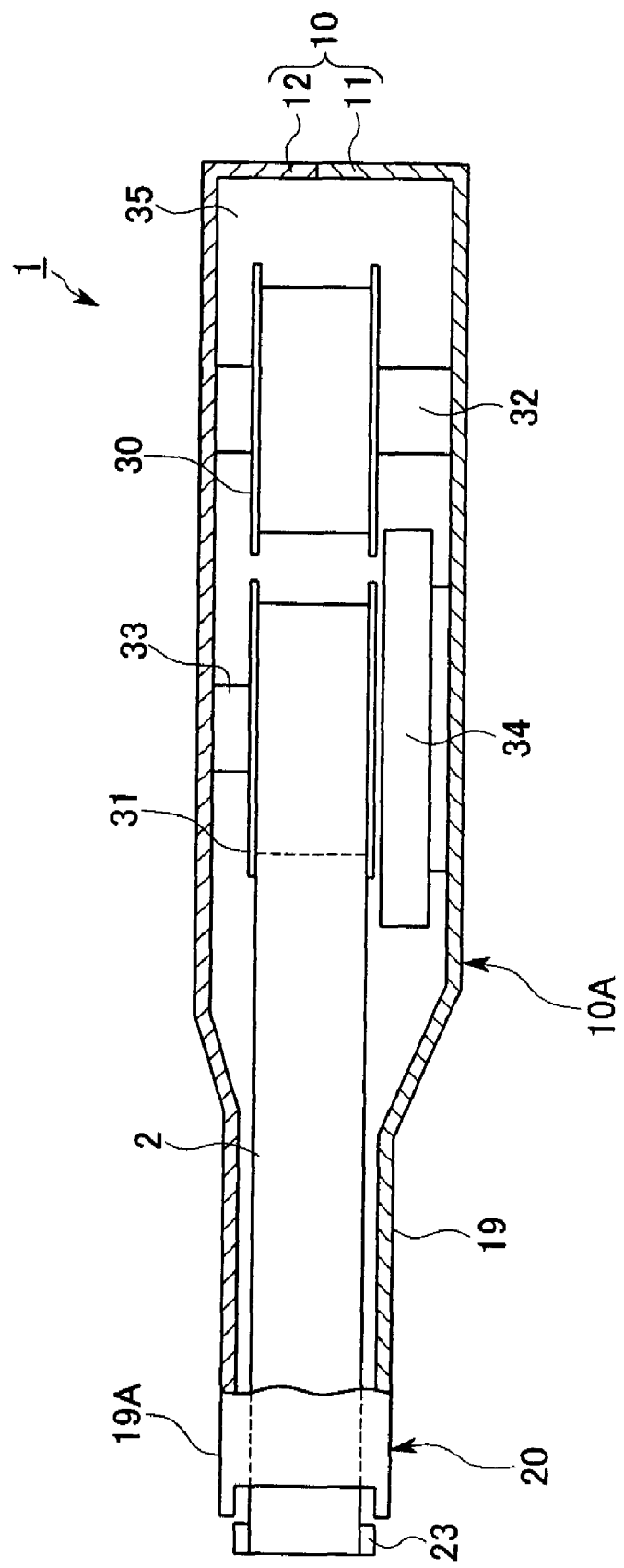
FIG. 5 is a cross-sectional view showing inner portions of the cleaning tool shown in FIG. 1A and FIG. 1B.

As is shown in FIG. 4 and FIG. 5, the cleaning medium feeding mechanism 3 that feeds the cleaning medium 2 forward is provided in a housing space 35 inside the tool main body 10.

This cleaning medium feeding mechanism 3 is provided with a supply reel 30 onto which the cleaning medium 2 has been wound, a take-up reel 31 onto which used cleaning medium 2 is wound and thereby recovered, and an operating dial 34 that operates the feeding movement of the cleaning medium 2. By performing an operation to rotate the operating dial 34 which has a portion thereof exposed to the outer side of the tool main body 10, the take-up reel 31 can be rotated so as to take up the cleaning medium 2, which results in cleaning medium 2 being unwound from the supply reel 30.

Note that the structure of the cleaning medium feeding mechanism 3 of the cleaning tool 1 shown in the drawings is described below in detail.

As is shown in FIG. 17, the head unit 4 whose front end is equipped with the head component 23 that is used to press the cleaning medium 2 against the joining end surface 61*a* of the optical plug 60 is incorporated in the distal end portion 19A of the protruding portion 19.

Cleaning medium 2 that has been drawn out between the supply reel 30 and the take-up reel 31 is wound around the head component 23 of the head unit 4. The cleaning medium 2 is wound around the head component 23 such that it is drawn over a cleaning medium pressing surface 24, which is the front end surface of the head component 23.

The cleaning medium 2 is pulled through the interior of the cylindrical protruding portion 19 so as to pass over the cleaning medium pressing surface 24 of the head component 23 of the head unit 4 between the supply reel 30 and the take-up reel 31.

The head unit 4 over which the cleaning medium 2 is wound and the distal end portion 19A of the protruding portion 19 in which this head portion 4 is incorporated make up the insertion portion 20 that is able to be inserted into the optical adapter 70.

The head component 23 at the front end of the head unit 4 is provided in a state of protruding forwards slightly beyond an aperture portion 26 formed in the distal end of the treating portion 19.

When the insertion portion 20 is inserted in the connector housing hole 72 of the optical adapter 70, a portion of the cleaning medium 2 that is located on the cleaning medium pressing surface 24 of the head component 23 can be pressed into contact against the joining end surface 61a of the optical plug 60.

The outer configuration of the insertion portion 20 (in particular, here, the distal end portion 19A of the protruding portion 19) is shaped so as to allow it to be inserted in and positioned in the connector housing hole 72, so that, in this regard, the insertion portion 20 is plug compatible with the optical adapter 70.

However, this insertion portion 20 has an outer configuration that enables it to be inserted only into the connector housing hole 72 of the optical adaptor 70, and there is no protruding portion that is inserted into the key groove 72a that is formed in the inner side of the optical adaptor 70. Namely, any projection corresponding to the key 62a that protrudes upwards from the side surface 62a of the housing 62 of an MPO-type optical connector plug has been omitted.

Recessed grooves 21 (see FIG. 21) that enable interference with the engaging claws (described above) of the elastic engaging pieces of the optical adaptor 70 to be avoided when the protruding portion 19 is inserted into the optical adaptor 70 are formed on both sides in the transverse direction of the outer surface of the protruding portion distal end portion 19A. Note that the recessed grooves 21 are not absolutely essential.

The connector housing hole 72 of the optical adaptor 70 has a narrow, elongated cross-sectional configuration that corresponds to the cross-sectional configuration of a portion of the plug frame of the MPO-type optical connector plug excluding the key 62a. In addition, the insertion portion 20, which is positioned by being inserted into the connector housing hole 72, also has a cross-sectionally narrow, elongated outer configuration so as to correspond to the cross-sectional configuration of the connector housing hole 72 with the dimension in the transverse direction of the insertion portion 20 being slightly larger than the dimension thereof in the thickness direction.

Because of this, due to the possibility of a front-rear inversion (both sides in the thickness direction), there is a correct insertion direction and an incorrect insertion direction when the insertion portion 20 is inserted into the connector housing hole 72.

However, because the cross-sectional configuration of the connector housing hole 72 is symmetrical between the key groove 72a side and the opposite side therefrom, and the two sides in the thickness direction of the cross-sectional outer configuration of the insertion portion 20 are also symmetrical, the insertion portion 20 can be inserted in either a forward orientation or reverse orientation into the connector housing hole 72.

The cleaning medium 72 (referred to below on occasion simply as "tape") is not particularly restricted, and it is possible to employ a known suitable cleaning cloth (unwoven or woven) that has been processed into tape form. Examples thereof include extra fine fibers such as polyester and nylon.

The structure thereof is also a typical one in which the width is substantially uniform.

Figure 2A:
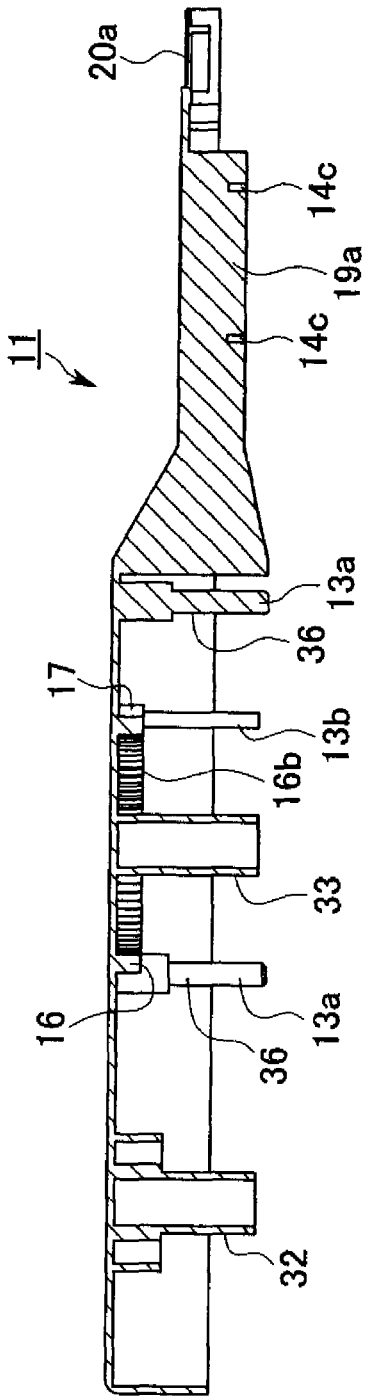
FIGS. 2A and 2B are views showing a second case half body according to the cleaning tool shown in FIG. 1, with FIG. 2A being a cross-sectional view taken along a line II-II in FIG. 2B, and FIG. 2B being a front view.
Figure 2B:
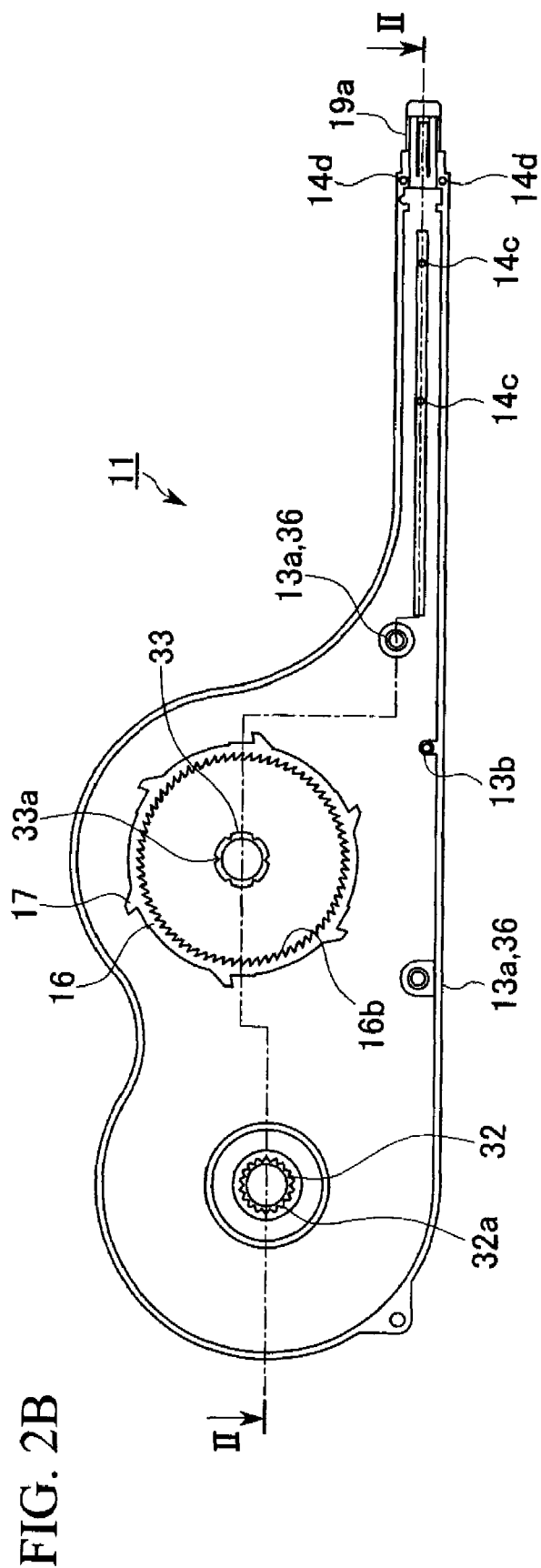
Figure 3A:
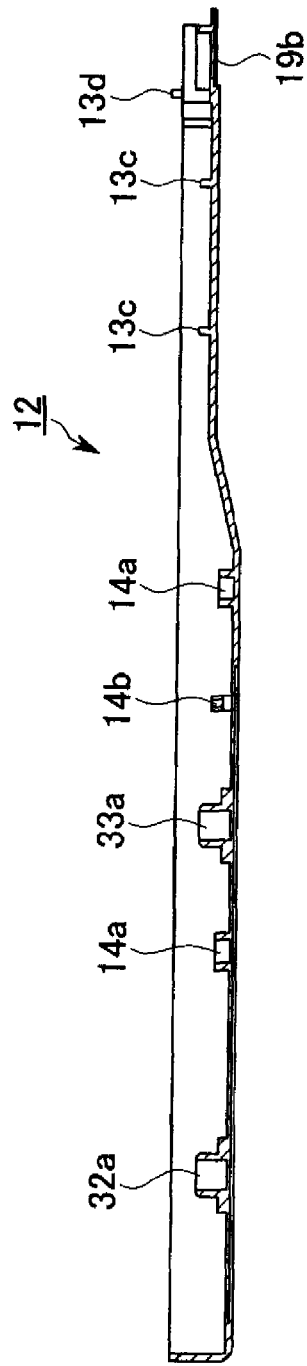
FIGS. 3A and 3B are views showing a first case half body according to the cleaning tool shown in FIG. 1, with FIG. 3A being a cross-sectional view taken along a line III-III in FIG. 3B, and FIG. 3B being a front view.
Figure 3B:
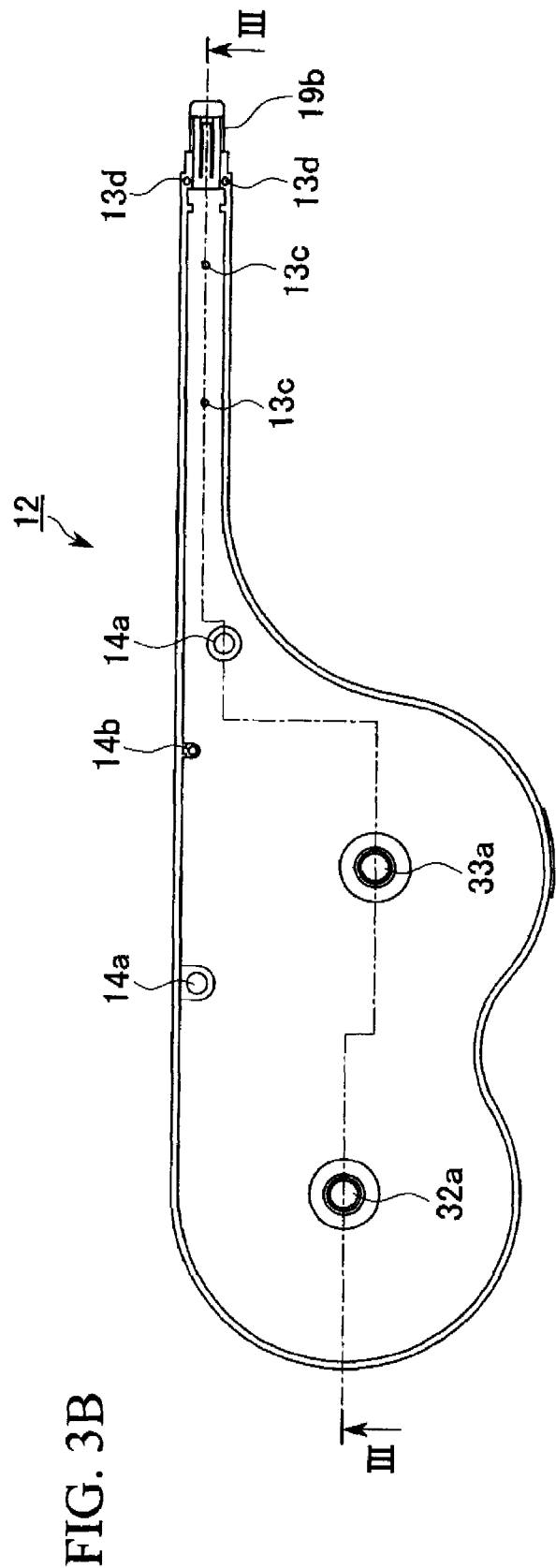

As is shown in FIGS. 2A, 2B, and 4, a protruding wall 19c that is used to reinforce the protruding portion 19 of the tool distal end portion is provided in the interior of the protruding portion 19. Because a path from the supply reel 30 towards the head component 23 of an unused upstream portion 2b (referred to below on occasion simply as 'upstream portion') of the cleaning medium 2, and a path from the head component 23 towards the take-up reel 31 of a downstream portion 2c of the cleaning medium 2 which has been contaminated by the cleaning process (referred to below on occasion simply as 'downstream portion') are separated by this protruding wall 19c, the effect is achieved that any migration of the contamination of the cleaning medium 2 is prevented.

(Head Unit)

As is shown in FIGS. 10A to 10D, FIG. 11, FIGS. 13A and 13B, FIGS. 14A and 14B, and FIGS. 15A to 15D and the like, the head unit 4 which has the head component 23 which is used to press the cleaning medium 2 against the joining end surface 61a of the ferrule 61 is fitted onto the distal end portion of the cleaning tool including the protruding portion 19.

The head unit 4 is equipped with the head component 23 which has the cleaning medium pressing surface 24 which during cleaning faces towards the joining end surface 61a of the optical plug 60 to be cleaned, and a head supporting portion 40 that is connected to a rear surface 23b side of the head component 23 which is the side of the head component 23 which is opposite to the cleaning medium pressing surface 24 side, and that supports the head component 23.

The head unit 4 functions as a cleaning medium pressing mechanism according to the present invention.

Figure 11:
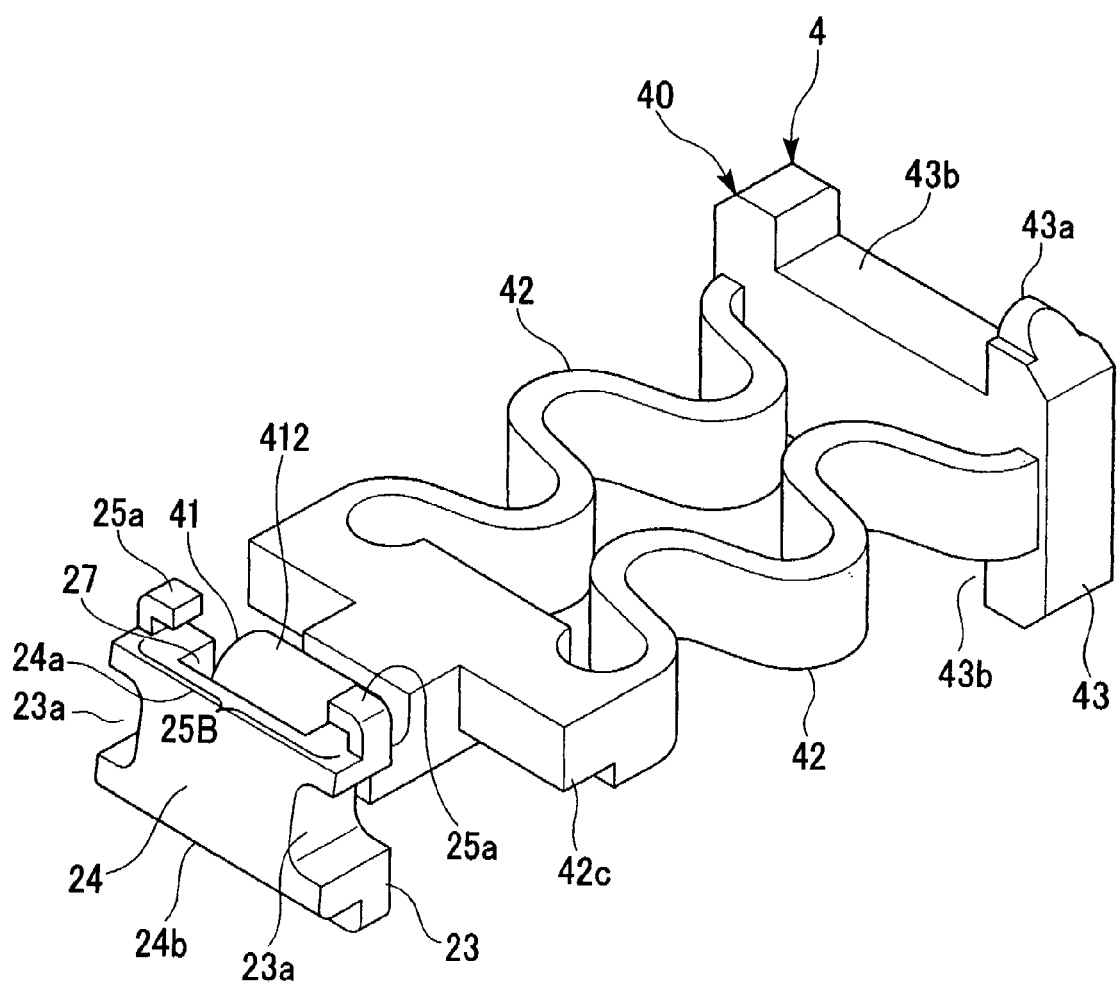
FIG. 11 is a perspective view of the head unit shown in FIG. 10A through FIG. 10D.
Figure 13A:
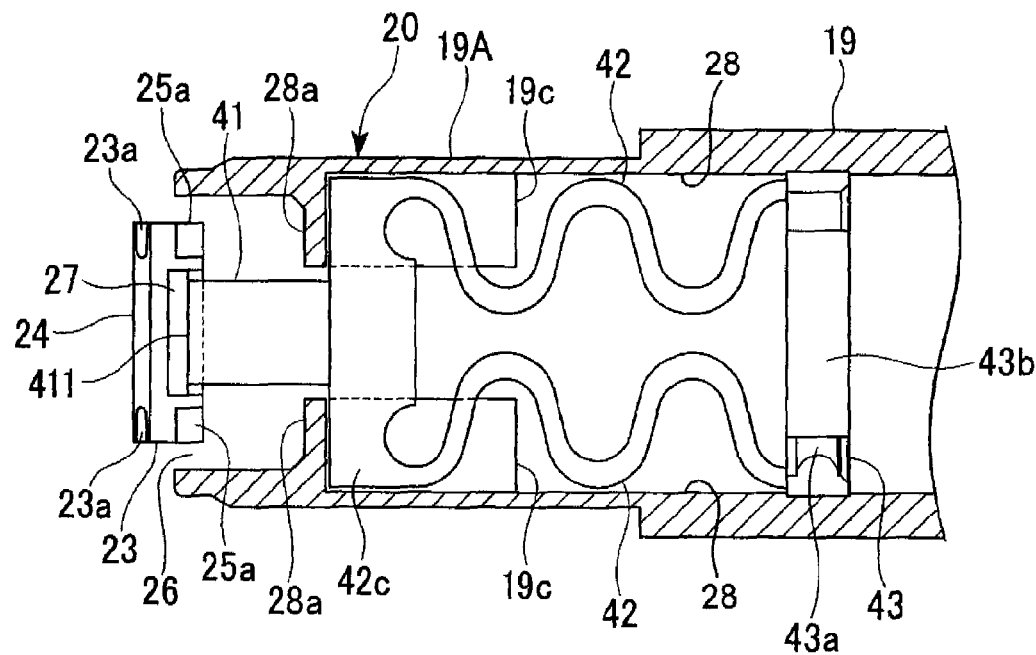
FIGS. 13A and 13B are a plan cross-sectional view and a front cross-sectional view of a tool distal end portion of the present cleaning tool.
Figure 13B:
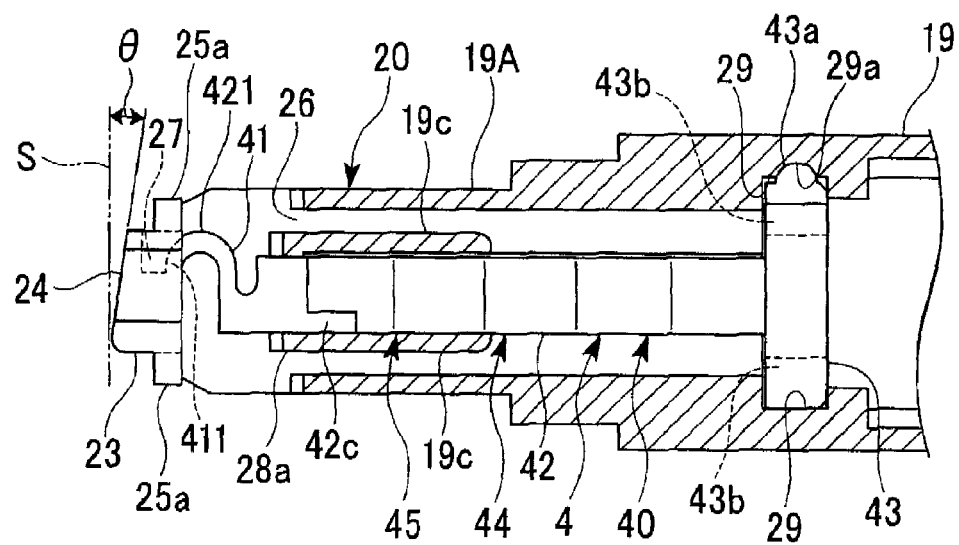

In the present specification, for the head unit 4, the left side in FIGS. 10A and 10C, the left side coming up from the drawing in FIG. 11, and the left side in FIGS. 13A and 13B are described as being the front, and the opposite sides thereto are described as being the rear. In addition, in FIGS. 10A to 10D, FIG. 11, FIG. 13B, and FIGS. 15A to 15D, the top side is described as being the top, and the bottom side is described as being the bottom.

Here, the head unit 4 has a structure in which the head component 23 and the head supporting portion 40 are integrally molded, and the head unit 4 can be molded using an appropriate molding method, for example, from a plastic such as polyoxymethylene (POM).

The head unit 4 is located between the upstream portion 2b of the cleaning medium 2 which is on the supply reel 30 side of the head component 23, and the downstream portion 2c of the cleaning medium 2 which is on the take-up reel 31 side of the head component 23. Because of this, the head unit 4 does not obstruct the feed movement of the cleaning medium 2.

Figure 14A:
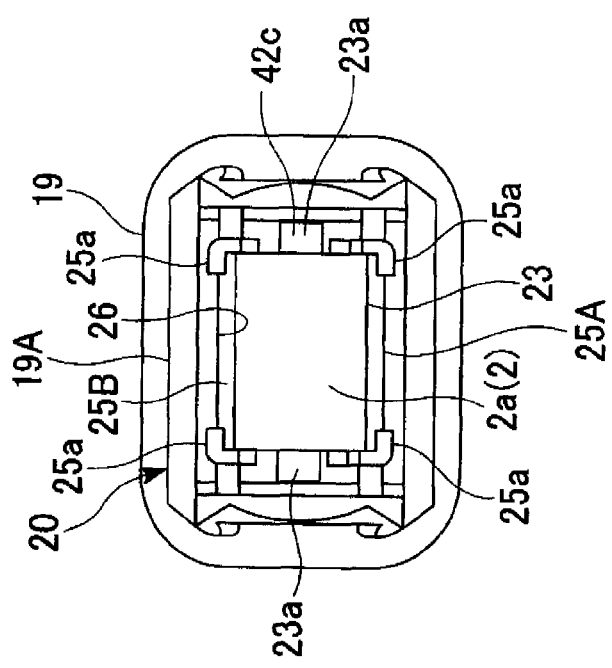
FIGS. 14A and 14B are views showing the vicinity of an insertion portion of the present cleaning tool, with FIG. 14A showing the structure as seen from a head component side, and FIG. 14B being a frontal view.
Figure 14B:
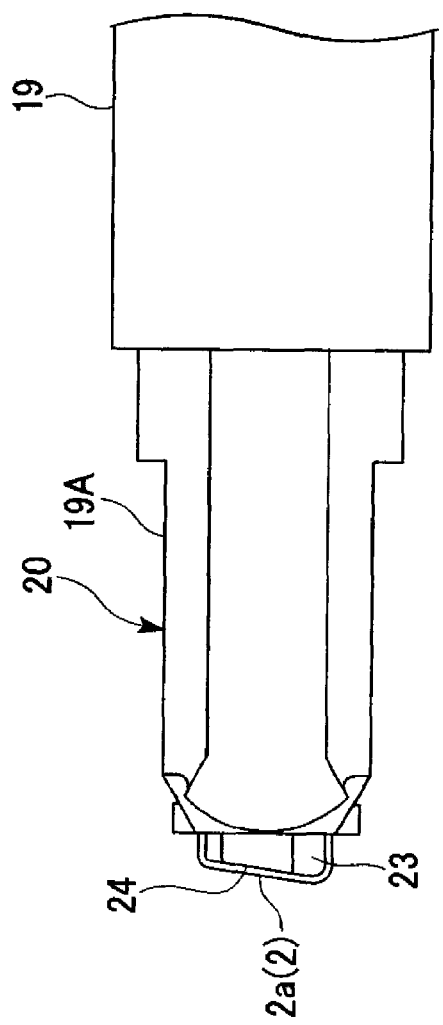

As is shown in FIG. 11 and FIG. 14A, the head component 23 has a substantially quadrangular cleaning medium pressing surface 24, so that a contact surface where the head component 23 is in contact with the joining end surface 61a of the optical plug 60 is effectively secured. This cleaning medium pressing surface 24 is an end surface on the insertion distal end side of the head component 23 (i.e., the front end side—the left side in FIG. 13A and FIG. 13B), and is exposed to the aperture portion 26 at the distal end of the protruding portion 19.

A pair of guide pin insertion recessed locations 23a are formed on both sides in the transverse direction of the protruding portion 19 as protruding component runoff portions through which protruding components (i.e., guide pins) 65 that protrude from the joining end surface 61a can be inserted. The guide pin insertion recessed locations 23a penetrate from the cleaning medium pressing surface 24 to the rear surface 23b of the head component 23. As a result, when the protruding portion 19 is inserted into the optical adapter 70, interference between the head component 23 and the guide pin 65 can be avoided.

Guide grooves 25A and 25B that guide the feeding of the cleaning medium 2 are provided at both the top and bottom ends of the head component 23 sandwiching the cleaning medium pressing surface 24. These guide grooves 25A and 25B function as cleaning medium, or tape, positioning mechanisms.

The upstream side from the cleaning medium pressing surface 24 in the feeding direction of the cleaning medium 2 that has been wound onto the head component 23 is housed in the bottom side guide groove 25A, while the downstream side thereof is housed in the top side groove 25B.

The width of the guide grooves 25A and 25B matches the width of the cleaning medium 2. The cleaning medium 2 is wound around the head component 23 by the respective pairs of guide grooves 25A and 25B on the upstream side and downstream side of the cleaning medium pressing surface 24.

In this manner, as a result of the cleaning medium 2 being placed within the guide grooves 25A and 25B, even if the head component 23 becomes tilted, the cleaning medium 2 can be prevented from shifting its position or coming away from the head component 23.

Furthermore, as is shown in FIG. 14A and the like, protruding pieces (drop prevention pieces 25a) that prevent the cleaning medium 2 which is located within the guide grooves 25A and 25B dropping from the guide grooves 25A and 25B are provided at both the top and bottom end of the head component 23 shown in the drawings so as to protrude from both sides of the width of the guide grooves 25A and 25B. Because both end portions in the transverse direction of the cleaning medium 2 are housed between the bottom of the guide grooves 25A and 25B and the drop prevention pieces 25a, it is possible to reliably prevent the cleaning medium 2 dropping out from the guide grooves 25A and 25B.

As is shown in FIG. 14A and the like, at the cleaning medium pressing surface 24 of the head component 23, the guide pin insertion recessed locations 23a are placed so as to be open at both sides of the width of the cleaning medium 2 which is guided by the guide grooves 25A and 25B. As a result of this, the guide pins 65 and 65 can be inserted into the guide pin insertion recessed locations 23a without interfering with the cleaning medium 2.

As is shown in FIGS. 10A to 10D, and FIG. 11 and the like, the head supporting portion 40 is equipped with a tilt spring 41 that is used to support the head component 23 while allowing the head component 23 to be tilted, compression springs 42 that elastically urge the head component 23 against the optical plug 60 (more specifically, the ferrule 61), and a plate-shaped mounting portion 43 that is used to mount the head unit 4 on the protruding portion 19.

A portion of this head supporting portion 40 excluding the tilt spring 41, namely, the portion on the rear side of the tilt spring 41 corresponds to the supporting portion main body 44 of the present invention.

The plate-shaped mounting portion 43 is provided so as to substantially cover the internal cross section of the protruding portion 19 by being fitted into a pair of mounting recessed portions 29 (see FIG. 13B) that are provided facing both sides in the thickness direction of the protruding portion 19 of the tool distal end.

Moreover, a substantially semicircular cylinder-shaped fitting portion 43a (see FIG. 11) that fits into a fitting groove 29a that is formed in one of the two mounting recessed portions 29 is provided so as to protrude from one of the two end portions of the mounting portion 43 that are inserted into the pair of mounting recessed portions 29. As a result, there is only one orientation by which the mounting portion 43 can be inserted into the pair of mounting recessed portions 29.

By assembling the mounting portion 43 in the protruding portion 19 so that the head unit 4 is incorporated in the protruding portion 19, the front-back direction of the head unit 4 is aligned with the direction in which the protruding portion 19 protrudes from the tool main body 10, more specifically, is aligned with a direction along the center axis of the cylindrical protruding portion 19.

As is shown in FIG. 13A, here, the compression springs 42 are waveform springs, and a pair of compression springs 42 are arranged symmetrically in the transverse direction (i.e., the up and down direction in FIG. 13A) of the protruding portion 19.

Front ends of the pair of compression springs 42 are each connected to a linking plate 42c, while rear ends thereof are connected to the mounting portion 43.

The compression springs 42 that are provided in two parallel rows and the linking plate 42c constitute an elastic bridging portion 45 that bridges the gap between the mounting portion 43 and the tilt spring 41.

The compression spring 42 which is a waveform spring is a rod-shaped or belt-shaped molded portion that undulates back and forth over a single flat plane, and is formed in an S shape or in the shape of a plurality of S shapes joined together.

The two compression springs 42 that are arranged in parallel are bent on the same plane. In addition, the linking plate 42c is also formed on the same plane as the pair of compression springs 42.

The overall shape of the elastic bridging portion 45 is a substantially elongated plate shape.

The pair of compression springs 42 is formed perpendicular to the plate-shaped mounting portion 43.

Because of this, the elastic bridging portion 45 is positioned within the protruding portion 19 such that the longitudinal direction thereof matches the direction of the center axis of the protruding portion 19 (in other words, the protruding direction from the tool man body 10).

The head unit 4 and the front end portion of the elastic bridging portion 45 (specifically, the linking plate 42c and the front end portion of the pair of compression springs 42) are housed within a pair of slide grooves 28 that are provided on both sides in the transverse direction of the protruding portion 19. The slide grooves 28 extend in the direction in which the insertion portion 19 is inserted or removed i.e., the left-right direction in FIGS. 13A and 13B), and have an end portion wall 28a that closes off an end portion of the distal end side (i.e., on the left side in FIGS. 13A and 13B) of the protruding portion 19.

When pressing force is not applied to the cleaning medium pressing surface 24 of the head component 23, the compression springs 42 use their own elastic force to urge the linking plate 42c so that it butts against end portion walls 28a of the slide grooves 28. The linking plate 42c can be slid by the expansion or contraction of the compression spring 42 along the slide grooves 28 in both directions in the center axis direction of the protruding portion 19.

However, a structure in which the elastic bridging portion 45 is equipped with the linking plate 42c is not essential, and it is also possible, for example, for front ends of the pair of compression springs 42 to each be connected to both ends of the width of the tilt springs 41, and for the pair of compression springs 42 themselves to constitute the elastic bridging portion 45.

The tilt spring 41 protrudes towards the front from the front end of the supporting portion main body 44, namely, from the front end of the linking plate 42c.

This tilt spring 41 has a circular arc plate shape, and is formed as an arch that forms a bridge between the front end of the supporting portion main body 44 and the head component 23. The head component 23 is connected to a protruding distal end 411 that protrudes from the supporting portion main body 44 of the tilt spring 41 which extends in an arch shape from the front end of the supporting portion main body 44.

More specifically, in the head unit 4 shown in the drawings, the protruding distal end 411 of the tilt spring 41 is connected with a central portion in the vertical direction of the head component 23. When pressing force acts on the head component 23 from the front side of the head unit 4 towards the rear side thereof, the tilt spring 41 is elastically deformed. Moreover, as a result of the elastic deformation of the tilt spring 41, tilting of the head component 23 becomes possible.

Moreover, a recessed location 27 that houses the protruding distal end 411 of the tilt spring 41 is formed in the rear surface 23b of the head component 23. The head component 23 is supported by the protruding distal end 411 of the tilt spring 41 that is housed within this recessed location 27.

The protruding distal end 411 of the tilt spring 41 is positioned on an extension of the plate-shaped elastic bridging portion 45. The arch-shaped tilt spring 41 is bent so as to project outwards from one side (i.e. the top side in FIGS. 10B to 10D, FIG. 11, FIG. 13B, and FIGS. 15A to 15D) of the extension of the plate-shaped elastic bridging portion 45.

In the present specification, for the head unit 4, taking the plate-shaped elastic bridging portion 45 and the extension thereof as a reference, the side of the tilt spring 41 on which a curve apex portion 412 is present, namely the top side in FIG. 10B through FIG. 10D, FIG. 11, FIG. 13B, and FIG. 15A through FIG. 15D is called the 'spring apex side', while the opposite side therefrom (i.e., the bottom side) is called the 'spring rear side'.

The head component 23 extends upwards and downwards from the protruding distal end 411 of the tilt spring 41, namely, extends so as to be stretched between the spring apex portion side and the spring rear side.

Figure 37A:
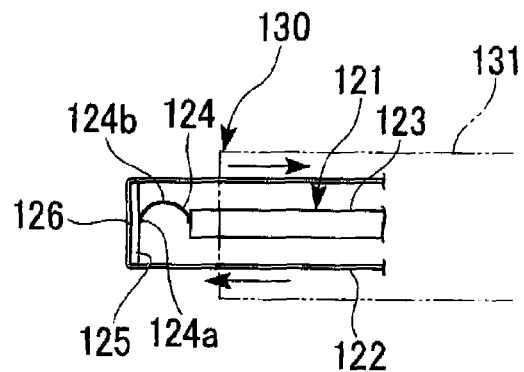
FIGS. 37A to 37D are views illustrating the behavior of a head unit when a cleaning tape is pressed against a joining end surface of an optical plug by a head plate of a head unit of a conventional cleaner, with FIG. 37A showing a state prior to the pressing, FIGS. 37B and 37C showing the cleaning tape being pressed against the diagonally polished joining end surface of an optical plug, and FIG. 37D showing the cleaning tape being pressed against a flat polished joining end surface of an optical plug.

However, the head component 23 is supported on the protruding distal end 411 of the tilt spring 41 not when the cleaning medium pressing surface 24 is oriented so as to be perpendicular to the longitudinal direction of the head unit 4 (for example, not in the state shown in FIG. 37A (see Patent document 5)), but when the cleaning medium pressing surface 24 is oriented so as to be slightly tilted from a perpendicular surface (i.e., a virtual perpendicular surface S—see FIG. 13B) relative to the extension direction of the elastic bridging portion 45 in which it extends in the front rear direction of the head unit 4. Here, the tilt angle θ1 relative to the perpendicular surface is 8° (or between 7 and 9°), however, the tilt angle is not limited to this.

The tilt of the cleaning medium pressing surface 24 of the head component 23 which is supported on the protruding distal end 411 of the tilt spring 41 is inclined forwards as it moves from the spring apex portion side towards the spring rear side.

The cleaning medium 2 is wound around the head component 23 such that, compared to the apex portion side, the spring rear side of the head component 23 is on the upstream side in the flow direction of the cleaning medium 2.

As is shown in FIG. 10D and the like, cleaning medium (or tape) grooves 43b through which the cleaning medium is passed are provided at both the upper and lower ends of the mounting portion 43. The upstream side tape 2b and the downstream side tape 2c of the head component 23 are passed through the respective tape grooves 43b.

(Guide Cap)

As is shown in FIG. 12A through FIG. 12D and FIG. 18, a guide cap 50 has a guide main body 51 that is formed substantially in a sleeve shape (i.e., a cylindrical shape) from plastic or the like, and a lid 55 that is joined by a hinge 56 to one end of the guide main body 51. An engaging hole 55a that engages with a projection 51a which protrudes from the guide main body 51 is formed on the lid 55. By bending the hinge 56 and causing the projection 51a of the guide main body 51 to engage with the engaging hole 55a of the lid 55, it is possible to maintain a state in which the lid 55 is closed.

A connector insertion aperture 52 (i.e. a plug insertion aperture) into which the optical plug 60 is inserted is formed in one end of the lid 55 side of the guide main body 51, while an insertion portion insertion aperture 53 into which the insertion portion 20 of the cleaning tool 1 is inserted is formed in the other end facing the plug insertion aperture 52. The plug insertion aperture 52 and the insertion portion insertion aperture 53 are connected by an internal space 54 of the guide cap 50.

In the guide cap 50, by inserting an optical plug 60 through the plug insertion aperture 52 and inserting the insertion portion 20 of the cleaning tool 1 through the insertion portion insertion aperture 53, the distal end portion of the optical plug 60 (including the joining end surface 61a) and the insertion portion 20 of the cleaning tool 1 can be housed in the internal space 54 of the guide cap 50 in a state in which they are facing each other.

A key groove 57a that is able to be engaged with a key 62a that protrudes from an outer surface of the housing 62 of the optical plug 60 is provided in an inner wall 70a on the plug insertion aperture 52 side of the guide main body 51. Moreover, a key groove 57b that is able to deal with the insertion of an insertion portion which has a key protruding from the side surface of a protruding portion that protrudes from the tool main body, such as is described in Patent document 5, is provided in an inner wall on the insertion portion insertion aperture 53 side of the guide main body 51. However, because the key protruding from the insertion portion 20 of the cleaning tool 1 illustrated in the present embodiment is omitted, it is possible to employ a structure in which, even when the guide cap 50 is used, the key groove 57b is omitted. If the key groove 57b is omitted from the guide cap 50, then when the insertion portion 20 of the cleaning tool 1 is housed, it is possible to improve the adhesion between the inner wall surfaces of the guide cap and the outer circumferential surface of the insertion portion 20, which contributes to an improvement in the dust proof properties of the interior of the guide cap.

In the same way as for the optical adapter 70, the insertion portion 20 of the cleaning tool 1 can be removably inserted at either the forward orientation or the reverse orientation into the guide cap 50.

The guide cap 50 is removably fitted onto the distal end portion 19A of the protruding portion 19. Namely, when no optical plug 60 is being cleaned, the guide cap 50 can be left with the insertion portion 20 of the cleaning tool 1 inserted in the insertion portion insertion aperture 53. Furthermore, by shutting the lid 55 which closes off the plug insertion aperture 52 of the guide cap 50, as is shown by the double dot chain line in FIG. 12A, any entry of dirt and dust or moisture and the like into the internal space 54 of the guide cap 50 is prevented, and the internal space 54 can be constantly maintained in an operable state.

(Tape Feed Mechanism)

Next, the cleaning medium feed mechanism 3 of the cleaning tool 1 shown in the drawings will be described in detail.

It should be noted, however, that provided that the cleaning medium feed mechanism is able to achieve a feeding movement of the cleaning medium 2, then it is not limited to the mechanism described in the present embodiment, and it is possible to employ cleaning medium, or tape, feed mechanisms having a variety of structures.

This cleaning medium feeding mechanism 3 is provided with a supply reel 30 onto which the cleaning medium 2 has been loaded, a take-up reel 31 onto which used cleaning medium 2 is wound and thereby recovered, and an operating dial 34 that operates the feeding movement of the cleaning medium 2. By performing an operation to rotate the operating dial 34 which has a portion thereof exposed to the outer side of the tool main body 10, the take-up reel 31 can be rotated so as to take up the cleaning medium 2, which results in cleaning medium 2 also being unwound from the supply reel 30.

The supply reel 30, the take-up reel 31, and the operating dial 34 may be manufactured by molding using a die from a plastic such as, for example, polystyrene (PS), polyoxymethylene (POM, polyacetal), or the like.

On the inner side of the first case half body 11 (i.e., on the side facing the housing space 35) there are provided a supply reel supporting shaft 32 onto which the supply reel 30 is rotatably fitted, and a take-up reel supporting shaft 33 onto which the take-up reel 31 and the operating dial 34 are rotatably fitted such that they protrude towards the second case half body 12 side.

Here, the supply reel supporting shaft 32 and the take-up reel supporting shaft 33 are formed integrally with the one case half body 11. In addition, by inserting distal ends of the supporting shafts 32 and 33 into engagement holes 32*a* and 33*a* that are provided in the other case half body 12, bridges are formed inside the housing space 35 connecting the two case half bodies 11 and 12, so that the supply reel 30 and the take-up reel 31 can be held without dropping off.

Between the supply reel 30 and the take-up reel 31, the cleaning medium 2 is threaded within the housing space 35 following pin-shaped cleaning medium guides 36. Partway along this path, the cleaning medium 2 is wound around the head component 23 that is housed within the protruding portion 19. As is shown in FIG. 2, here, the cleaning medium guides 36 are provided as outer circumferential surfaces of engaging pins 13*a* that protrude from the first case half body 11.

Ratchet grooves 32*c* and 33*c* that extend in the axial direction of the reel supporting shafts 32 and 33 are provided on outer circumferences of the supply reel supporting shaft 32 and the take-up reel supporting shaft 33. These ratchet grooves 32*c* and 33*c* are able to engage with respective ratchet arm projections of the supply reel 30 and the take-up reel 31 (described below).

As is shown in FIG. 5, the same number of (in this case, three) supply reels 30 and take-up reels 31 are provided respectively as the number of tapes or cleaning mediums 2. The reels 30 and 31 are supported by the supply reel supporting shaft 32 and the take-up reel supporting shaft 33 so as to be aligned with each other horizontally.

Figure 8A:
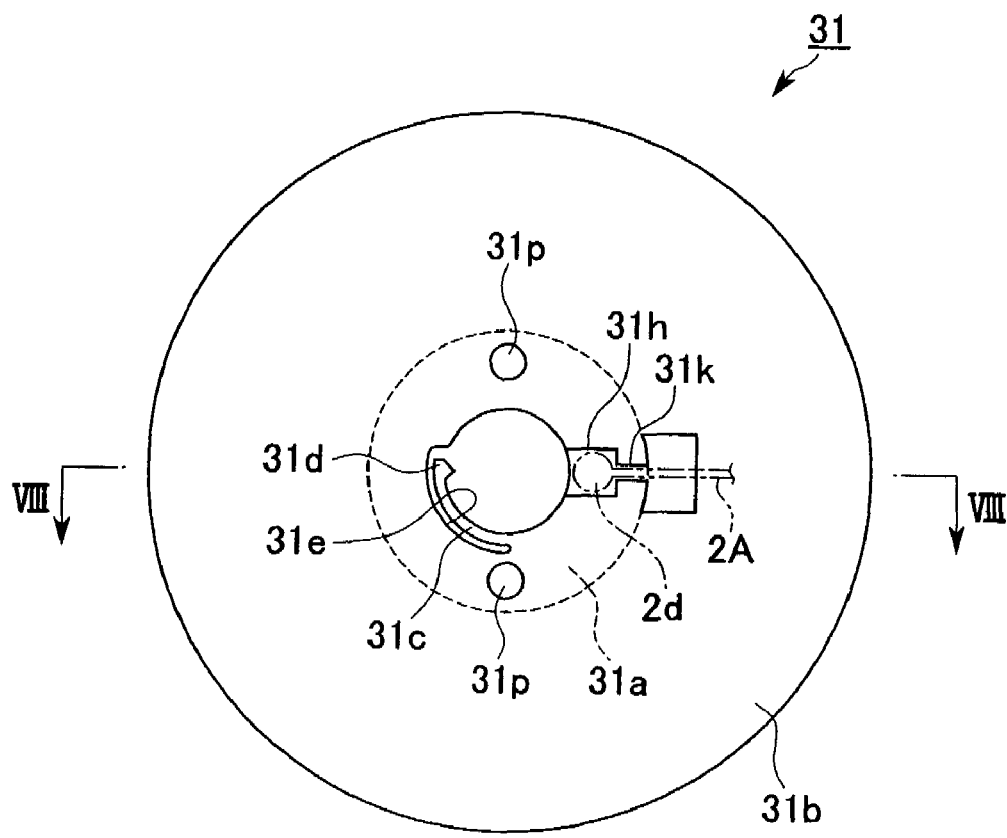
FIGS. 8A and 8B are views showing an example of a supply reel and a winding reel of the present cleaning tool, with FIG. 8A being a front view and FIG. 8B being a cross-sectional view taken along a line VIII-VIII in FIG. 8A.
Figure 8B:
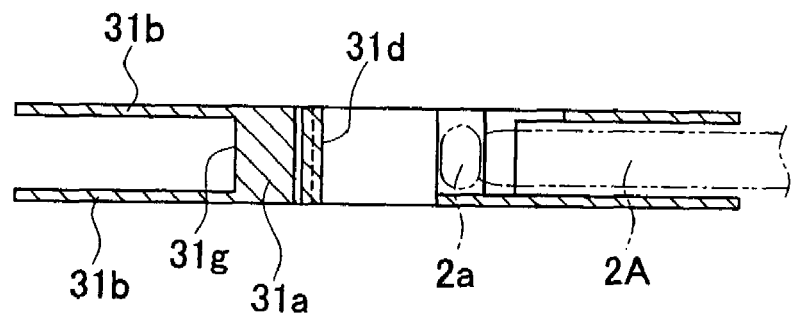
Figure 9:
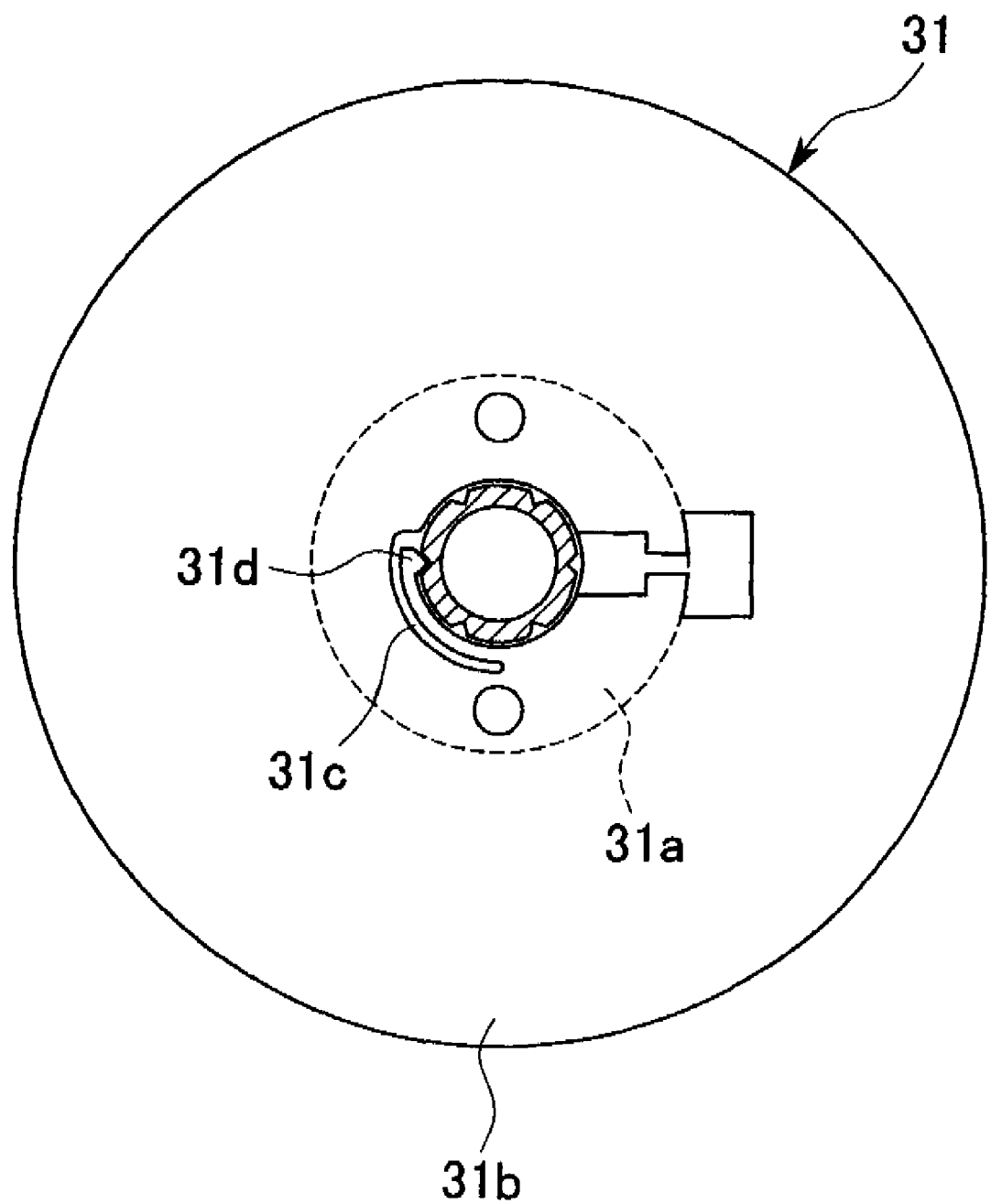
FIG. 9 is a partial cross-sectional view showing a state in which the supply reel and winding reel shown in FIGS. 8A and 8B are fitted onto a supporting shaft.

FIGS. 8A and 8B and FIG. 9 show an example of a take-up reel 31 onto which a cleaning medium 2A has been wound. In this take-up reel 31, a hollow, circular cylinder-shaped core portion 31*a* is integrally molded from plastic or the like with side plate portions 31*b* and 31*b* that are formed at both ends of the core portion 31*a*. One cleaning medium is wound onto one take-up reel 31. The gap between the two side plate portions 31*b* and 31*b* is set to match the width of the cleaning medium which is wound on to the take-up reel 31.

An insertion hole 31*h* (i.e., a through hole) is formed in the core portion 31*a* so as to face an outer circumferential surface 31*g* of the core portion 31*a*, and the insertion hole 31*h* includes a constricted portion 31*k*. The method used to attach an end portion of the cleaning medium is not particularly restricted, however, as is shown in FIGS. 8A and 8B, and example thereof is a method in which a bulbous knot 2*d* is tied in one end of the cleaning medium 2A that has been passed through the insertion hole 31*h* of the take-up reel 31 so that this knot 2*d* forms an anchor in the constricted portion 31*k*.

A ratchet arm 31*c* is formed on an inner surface of the core portion 31*a* of the take-up reel 31. A substantially semicircular cylinder-shaped projection 31*d* is formed on a distal end of the ratchet arm 31*c* extending towards the center in the radial direction of the take-up reel 31. A recessed portion 31*e* which houses the ratchet arm 31*c* is formed in an inner surface of the core portion 31*a*. The ratchet arm 31*c* is able to cause the projection 31*d* to swing in the radial direction of the take-up reel 31 by elastically deforming.

When the take-up reel 31 is supported on the take-up reel supporting shaft 33, the projection 31*d* of the ratchet arm 31*c* is engaged in the ratchet groove 33*c* that is provided in the circumference of the take-up reel supporting shaft 33. When the take-up reel 31 is being rotated, the projection 31*d* is repeatedly engaged with and disengaged from the ratchet groove 33*c* through the elastic deformation of the ratchet arm 31*c*. Consequently, rotational resistance is imparted to the rotation of the take-up reel 31. As a result, a fixed tensile force is necessary for the feeding movement of the cleaning medium and any slippage by the take-up reel 31 is prevented. Namely, the ratchet arm 31*c* of the take-up reel 31 and the ratchet groove 33*c* of the take-up reel supporting shaft 33 function as a rotation resistance imparting mechanism which imparts rotation resistance to the rotation of the take-up reel 31.

The fixed tensile force which allows the feeding movement of the cleaning medium 2 is not so great that any stretching of the cleaning medium caused by the pulling of the cleaning medium feeding mechanism 3 has a harmful effect on the cleaning, and is set just large enough to prevent any forward movement of the cleaning medium when, for example, the cleaning tool 1 is pulled or carried around.

Note that because the take-up reels 31 onto which the cleaning mediums 2B and 2C have been wound employ the same structure as the take-up reel 31 for the cleaning mediums 2A shown in FIGS. 8A and 8B, apart from the fact that the gap between the two side portions 31*b* and 31*b* is different, an illustration thereof is omitted from the drawings.

Moreover, the same type of reel as that used for the take-up reel 31 can be used for the supply reel 30.

In the same way as in the take-up reel 31, a ratchet arm having a protrusion which engages with a ratchet groove 32*c* provided on the circumference of the supply reel supporting shaft 32 is provided on the supply reel 30, so as to form the above described rotation resistance imparting mechanism.

The operating dial 34 is fitted onto the outer circumference of the take-up reel supporting shaft 33 so as to be concentric with the take-up reel 31.

Figure 6A:
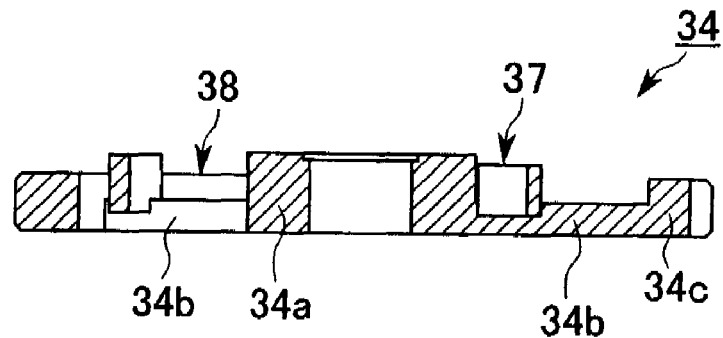
FIGS. 6A and 6B are views showing an example of a dial of the present cleaning tool, with FIG. 6A being a cross-sectional view taken along a line VI-VI in FIG. 6B, and FIG. 6B being a front view.
Figure 6B:
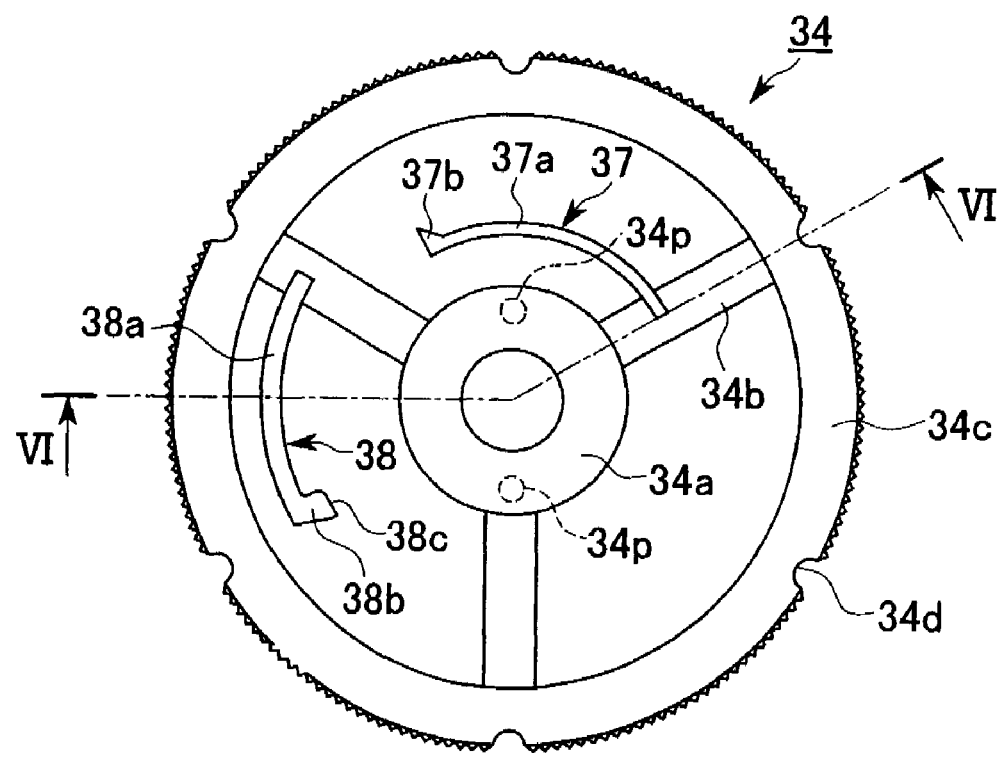
Figure 7:
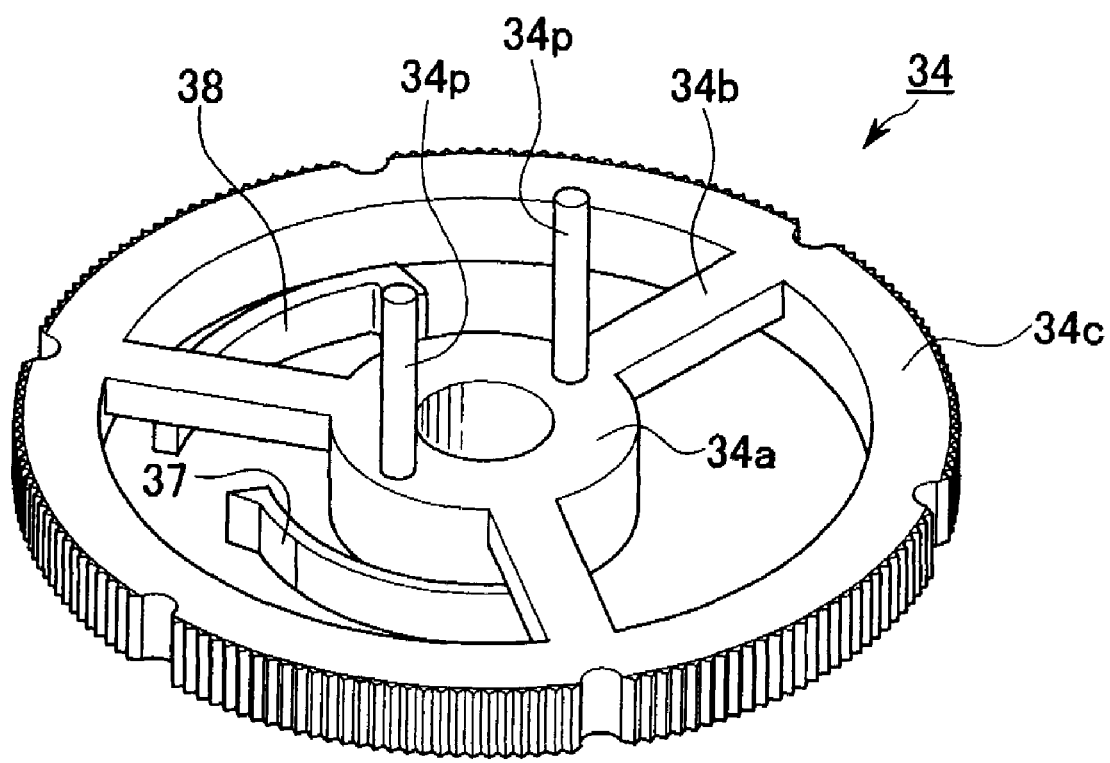
FIG. 7 is a perspective view of the dial is shown in FIG. 6A and FIG. 6B.

As is shown in FIGS. 6A and 6B and FIG. 7, the operating dial 34 is formed by the integral molding from plastic or the like of a hub portion 34*a* which is fitted onto the take-up reel supporting shaft 33, a rim portion 34*c* which has a knurling surface on the outer circumference thereof, and a plurality of spoke portions 34*b* that join together the hub portion 34*a* and the rim portion 34*c*. On one of the plurality of spoke portions 34*b* is provided a ratchet arm 37 on the distal end of whose arm portion 37*a* which extends in the circumferential direction of the operating dial 34 is formed a protruding engaging claw 37*b*. On another spoke portion 34*b* is provided a hammer arm 38 on the distal end of whose arm portion 38*a* which extends in the circumferential direction of the operating dial 34 is formed a protruding hammer portion 37b.

The arm portions 37a and 38a of the ratchet arm 37 and the hammer arm 38 are able to be elastically deformed.

As is shown in FIG. 1A and FIG. 1, a portion of the operating dial 34 is exposed to the outside of the tool main body 10 through a window 11a that is provided in a side surface of the tool main body 10.

The operating dial 34 and the take-up reel 31 are joined together as a single unit as a result of pins 34p which are provided in the operating dial being fitted into insertion holes 31p which are formed in the take-up reel 31.

The radius of the operating dial 34 is larger than the radius of the take-up reel 31. As a result, the length of the cleaning medium 2 that is taken up by the take-up reel 31 is shorter by the amount of this radius ratio than the amount that the operating dial 34 is operated (i.e., the displacement amount along the outer circumference of the operating dial 34).

As a result, it is possible to feed the cleaning medium 2 in minute quantities.

As is shown in FIGS. 2A and 2B, the cleaning medium feeding mechanism 3 can be driven by being rotated in a predetermined direction as a result of the operating dial 34 being operated manually. Namely, as a result of the operating dial 34 being rotated, the take-up reel 31 is rotated and takes up the cleaning medium 2. In addition, unused cleaning medium 2 is unwound from the supply reel 30 and is fed forward. Because the operating dial 34 is exposed to the outside of the tool main body 10 through the window 11a, even when the cleaning tool 1 is being held in one hand, the operating dial 34 can be easily operated using the fingers of the hand holding the cleaning tool 1.

As is shown in FIGS. 2A and 2B, a toroidal wall portion 16 is formed on an inner surface of the first case half body 11 surrounding the take-up reel supporting shaft 32. A plurality (six in FIGS. 2A and 2B) of mountable projections 17 are formed at equal intervals around the circumference of the toroidal wall portion 16 on an outer circumference of the toroidal wall portion 16. In addition, a number of ratchet teeth 16b are provided on an inner circumferential surface of the toroidal wall portion 16.

The mountable projections 17 have an inclined surface 17a that forms an acute angle relative to the outer circumferential surface 16a of the toroidal wall portion 16 when seen in the front view shown in FIGS. 2A and 2B, and FIGS. 22A to 22D. The inclined surfaces 17a are provided on the side of the respective mountable projections 17 which faces in the rotation direction of the take-up reel 31 (i.e., an anticlockwise direction in FIGS. 22A to 22D).

The operating dial 34 is prevented from rotating in reverse as a result of the engaging claw 37b of the ratchet arm 37 engaging with the ratchet teeth 16b of the toroidal wall portion 16. Namely, the ratchet teeth 16 and ratchet arm 37 function as a reverse feeding prevention mechanism that prevents reverse feeding of the cleaning medium 2 (i.e., a reverse rotation prevention mechanism that prevents reverse rotation of the take-up reel). Accordingly, the cleaning medium 2 can be fed forward consistently in a predetermined direction, and any sagging of the cleaning medium 2 can be prevented.

Figure 22A:
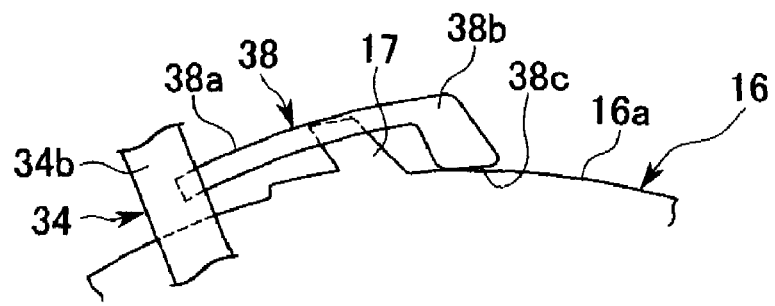
FIGS. 22A to 22D are views illustrating the operation of a feed quantity notifying mechanism according to the present cleaning tool.

As is shown in FIG. 22A, when the operating dial 34 has been fitted onto the take-up reel supporting shaft 33, a striking surface 38c of the hammer portion 38b of the hammer arm 38 butts against the outer circumferential surface 16a of the toroidal wall portion 16.

Figure 22B:
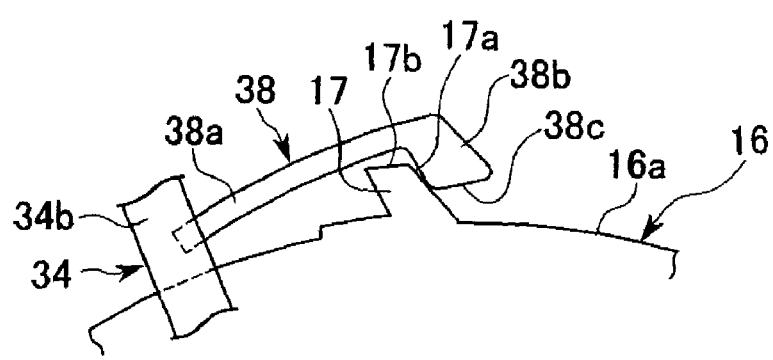
Figure 22C:
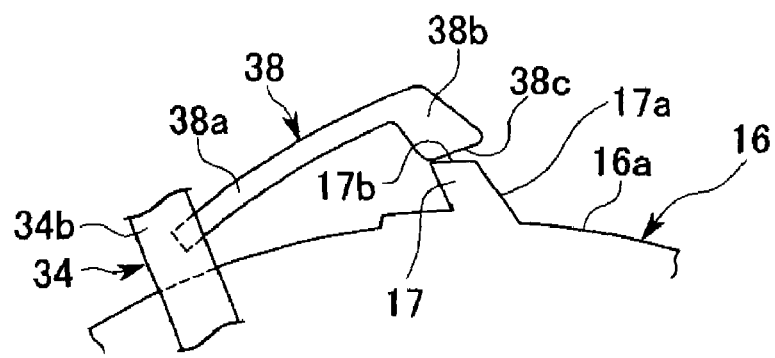
Figure 22D:
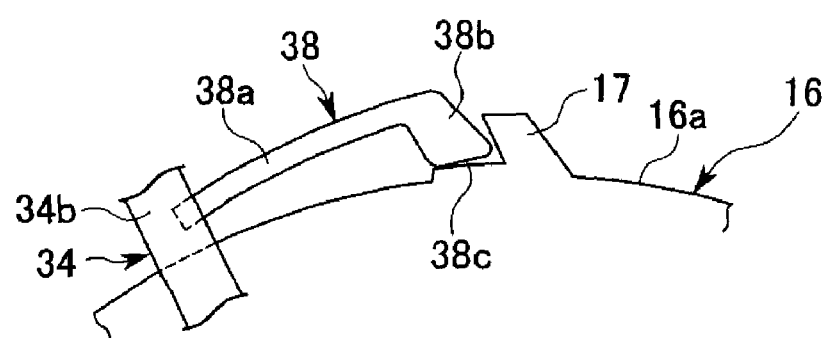

As is shown in FIGS. 22B and 22C, when the operating dial 34 is rotated, the hammer portion 38b rides up along the inclined surface 17a of the mountable projections 17 as far as an apex portion 17b. If the operating dial 34 is rotated further, then as is shown in FIG. 22D, the support of the mountable projection 17 is lost and the elastic force of the arm portion 38a causes the hammer arm 38 to swing the hammer portion 38b downwards towards the outer circumferential surface 16a of the toroidal wall portion 16. The striking surface 38c of the hammer portion 38b thereby collides with the outer circumferential surface 16a, resulting in a striking sound being generated. In this manner, an operator can be notified as to the feed quantity of the cleaning medium 2 using these striking sounds that are generated each time the feed quantity of the cleaning medium 2 reaches a predetermined quantity.

Namely, in the cleaning tool 1 of the present embodiment, a feed quantity notification mechanism that notifies an operator as to the feed quantity of the cleaning medium 2 is formed by the mountable projections 17 of the toroidal wall portion 16 and the hammer arm 38 of the operating dial 34.

Note that the feed quantity of the cleaning medium 2 that corresponds to one striking sound can be set to the feed quantity required for the single cleaning of an optical connector. Moreover, a plurality of striking sounds can be set to correspond to the feed quantity required for the single cleaning of an optical connector. Work can thus be performed with the number of striking sounds that correspond to a single cleaning of an optical connector appropriately altered in accordance with the level of contamination of the optical connector.

A description will now be given of an example of a process to clean the joining end surface 61a of an optical plug 60 housed inside an optical adaptor 70 as an example of a method of using this cleaning tool 1.

As is shown in FIG. 17, when the insertion portion 20 of the cleaning tool 1 is inserted through the connector insertion aperture 71 of the optical adapter 70, the insertion portion 20 enters into the connector housing hole 72 while the outer surface thereof is positioned by the inner wall 70a of the optical adapter 70. As a result, the cleaning medium 2 is positioned at a suitable location of the joining end surface 61a of the optical plug 60 (here, on and around the optical fiber hole 61b) and is placed in contact with this position.

Even when guide pins 65 are protruding from the joining end surface 61a of the optical plug 60, because the guide pins 65 are housed within the guide pin insertion recessed locations 23a that are provided in the head component 23, the insertion portion 20 can be housed in the connector housing hole 72 without interfering with the guide pins 65.

When the operating dial 34 is rotated by a predetermined amount, because the cleaning medium 2 is moved in conjunction with the rotation of the take-up reel 31 so that the joining end surface 61a is wiped clean by this cleaning medium 2, contamination such as dirt and dust and oil and the like that has adhered to the joining end surface 61a is reliably wiped off by the cleaning medium 2.

Because contamination that has been wiped off adheres to the cleaning medium 2 and moves in the direction in which it is wound onto the take-up reel 31, used cleaning medium (i.e., the downstream portion) 2c is no longer exposed via the aperture portion 26 of the protruding portion 19, and there is no possibility that contamination will become adhered again to the joining end surface 61a.

Accordingly, the joining end surface 61a can be cleaned to a high degree of cleanliness.

After the cleaning, by pulling the cleaning tool in the opposite direction (i.e., in the removal direction) to the direction in which it was inserted, the insertion portion 20 can be easily withdrawn.

Next, a description will be given of a process to clean the joining end surface 61a of an optical plug 60 outside the optical adapter 70.

Figure 18:
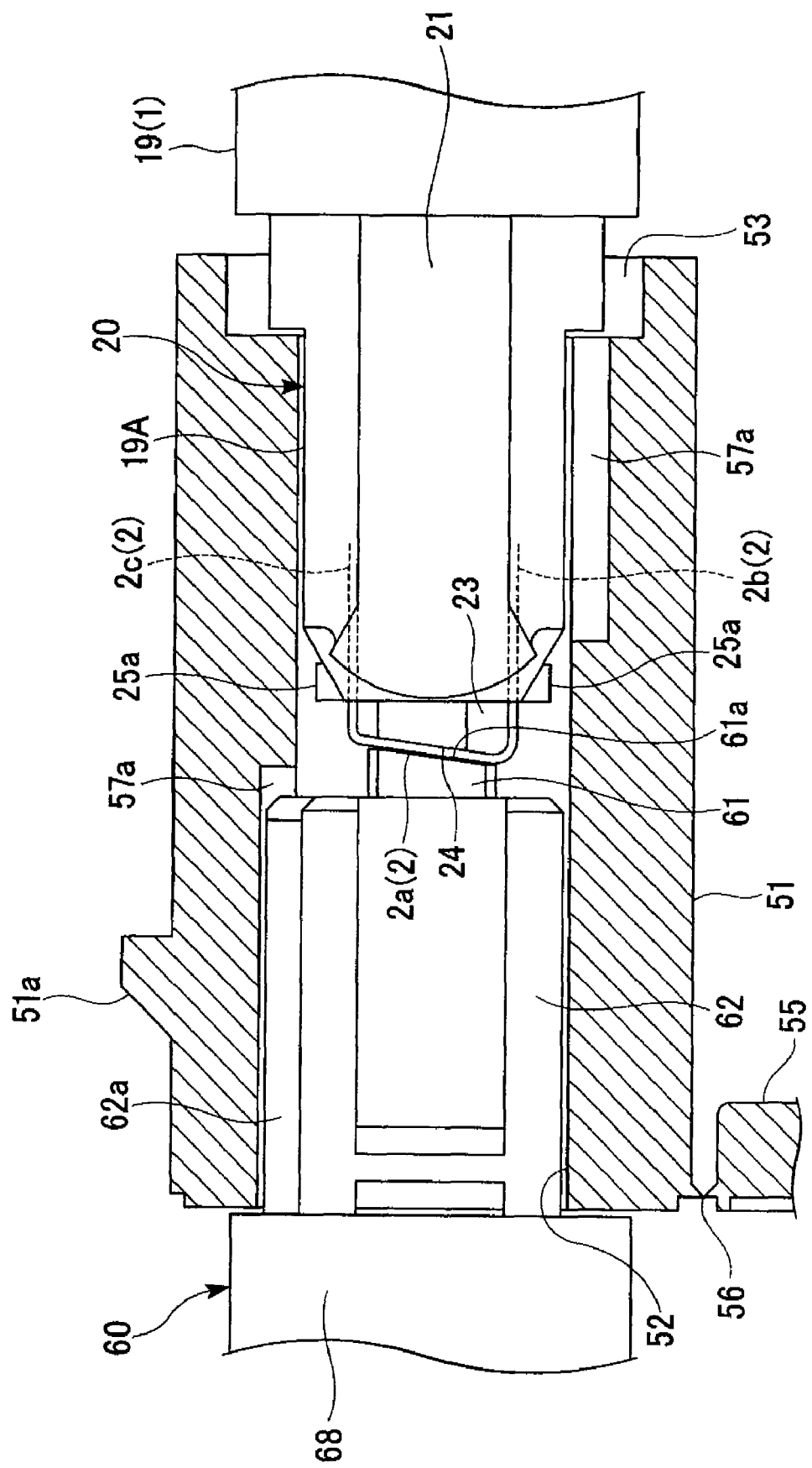
FIG. 18 is a cross-sectional view showing an example of a state in which an optical connector plug and the insertion portion of the present cleaning tool are inserted into a guide cap.

As is shown in FIG. 18, by inserting the insertion portion 20 of the cleaning tool 1 in the insertion portion insertion aperture 53, and removing the lid 55 of the guide cap 50 and inserting the optical plug 60 in the opened plug insertion aperture 52, the optical plug 60 enters into the internal space 54 inside the guide cap 50 while the outer surfaces of the housing 62 are positioned by the inner walls of the guide cap 50. By pushing in the optical plug 60 in this manner, the cleaning medium 2 is positioned at a suitable location of the joining end surface 61a of the optical plug 60 (here, on and around the optical fiber hole 61b) and is placed in contact with this position.

In this manner, because the butting together of the joining end surface 61a of the optical plug 60 and the contact portion 2a (i.e., the portion of the cleaning medium 2 that is wound around the head component 23 that is located at the cleaning medium pressing surface 24 of the head component 23) of the cleaning medium of the insertion portion 20 is suitably guided by the guide cap 50, the cleaning of the joining end surface 61a of the optical plug 60 inside the guide cap 50 can be performed in the same manner as for the joining end surface 61a of the optical plug 60 inside the above described optical adaptor 70.

Namely, according to the cleaning tool 1 of the present embodiment, in addition to it being possible to clean the joining end surface 61a of the optical plug 60 inside the optical adaptor 70 while it is still housed inside the optical adaptor 70, by fitting the guide cap 50 onto the insertion portion 20, it is also possible to clean the joining end surface 61a of the optical plug 60 outside the optical adaptor 70. Because any optical plug can be cleaned using one type of cleaning tool, it is possible to reduce the number of components required for the task.

By closing the lid 55 of the guide cap 50 and leaving it fitted on the insertion portion 20, when the tool is not in use (i.e., when a cleaning task is not being performed), the guide cap 50 functions as a cap to prevent the cleaning medium 2 being exposed via the aperture portion 26 of the protruding portion 19, and it is possible to prevent the interior of the guide cap 50 and the cleaning medium 2 and the like becoming contaminated while the cleaning tool 1 is being stored or transported.

Figure 15A:
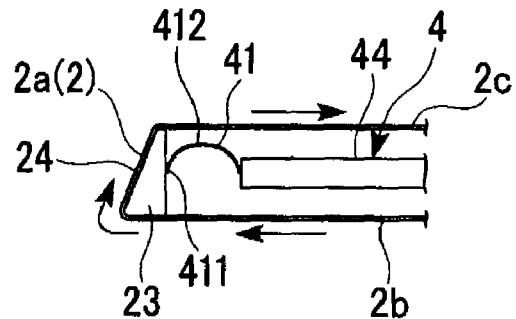
FIGS. 15A to 15D are views illustrating the behavior of a head unit when a cleaning medium is pressed against a joining end surface of an optical plug by the head component of the present cleaning tool, with FIG. 15A showing a state prior to the pressing, FIGS. 15B and 15C showing the cleaning medium being pressed against the diagonally polished joining end surface of an optical plug, and FIG. 15D showing the cleaning medium being pressed against a flat polished joining end surface of an optical plug.
Figure 15B:
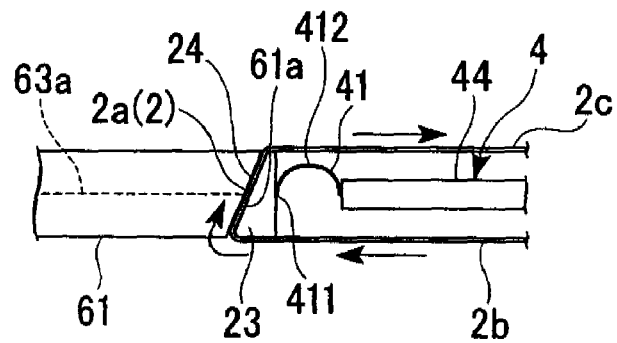
Figure 15C:
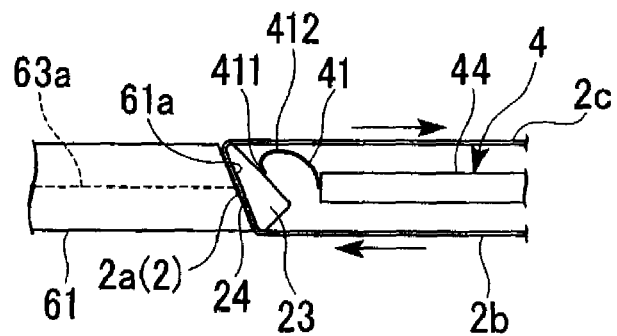
Figure 15D:
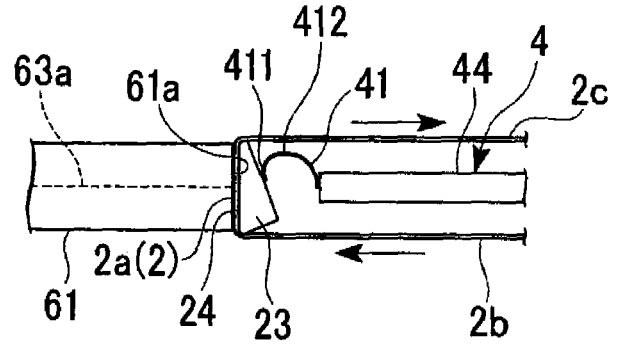
Figure 16:
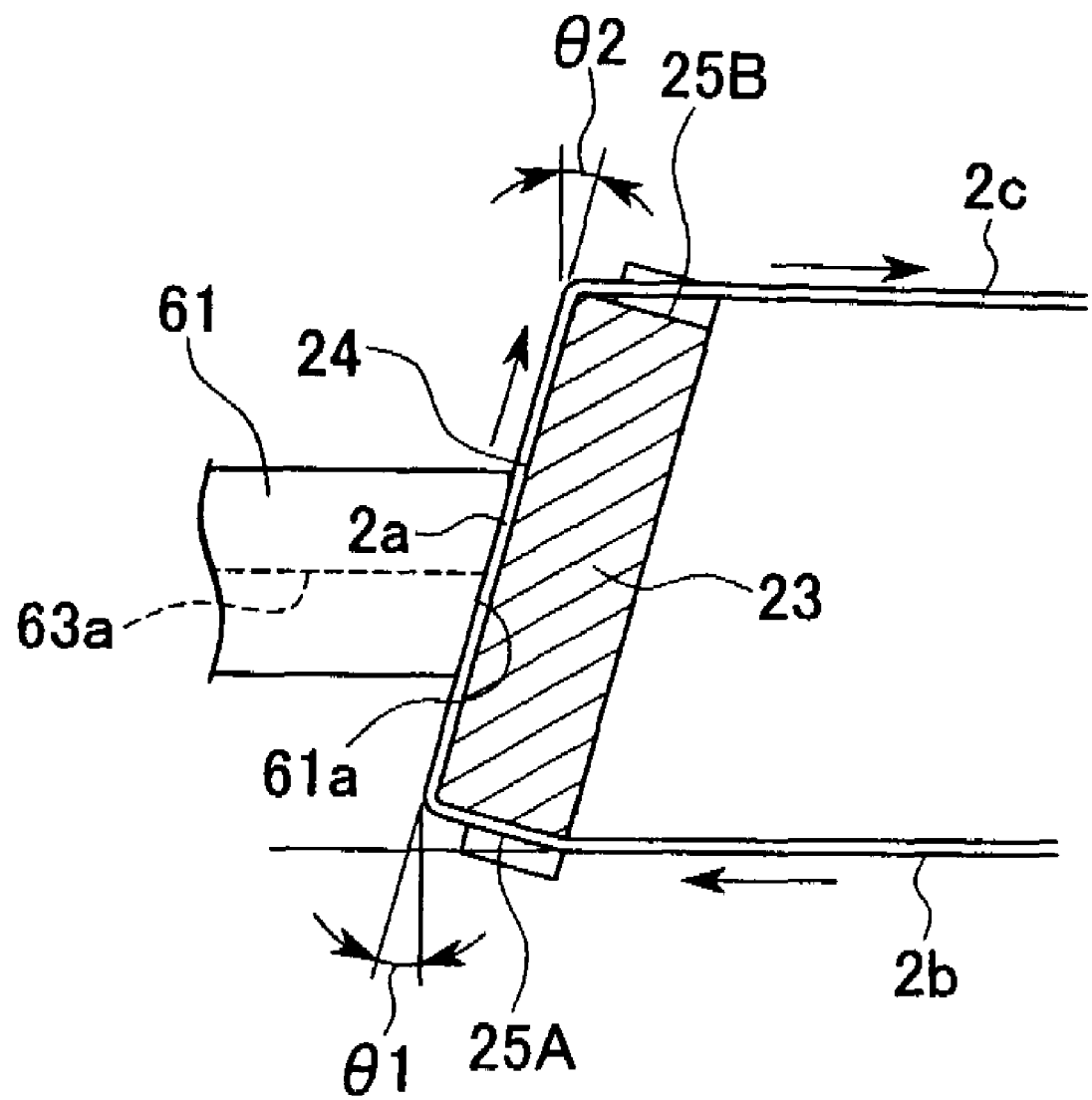
FIG. 16 is a view showing a state in which cleaning medium is pressed against the diagonally polished joining end surface of an optical plug by the head component of the head unit of the present cleaning tool.

Because the head component 23 is able to tilt relatively to the pressing force when the cleaning medium pressing surface 24 of the head component 23 is in contact with the joining end surface 61a of the optical plug 60, even when a ferrule 61 such as that shown in FIG. 15D whose joining end surface 61a has been polished at a right angle (i.e. has been flat polished) is in contact with the cleaning medium pressing surface 24, the orientation of the cleaning medium pressing surface 24 can be matched to the orientation of the joining end surface 61a, and the cleaning medium 2a which is on the cleaning medium pressing surface 24 can be more uniformly and reliably placed in contact with the joining end surface 61a. Moreover, during cleaning, even if an operator holding the cleaning tool 1 unintentionally swings the cleaning tool 1, or if the insertion portion 20 is tilted so as to be inclined relative to the optical axis of an optical fiber (i.e., the bare optical fiber 63a) that is exposed at the joining end surface 61a of the optical plug 60, the orientation of the cleaning medium pressing surface 24 of the head component 23 follows this swing so as to match the orientation of the joining end surface 61a of the ferrule 61, and the state of the surface contact of the cleaning medium 2 can be maintained. As a result, the pressing force is not concentrated in localized portions, and the pressing force acts more uniformly between the cleaning medium pressing surface 24 of the head component 23 and the joining end surface 61a of the ferrule 61, and the joining end surface 61a can be evenly and reliably cleaned.

In the head unit 4, as a result of the head component 23 being moved backwards in the opposite direction to the insertion direction by the pressing force of the ferrule 61 of the optical plug 60 with the compression springs 42 and the like being elastically deformed, the pressing force acting on the head component 23 is alleviated. Accordingly, when the insertion portion 20 is inserted through the connector insertion aperture 71 and the head component 23 is butted against the ferrule 61, the pressing force is not strongly applied directly, and the head component 23 is able to receive the force from the ferrule 61 as it is being softened by the tilt spring 41. Consequently, it is possible to prevent the joining end surface 61a and the end surface of the optical fibers 63a and the like becoming scratched.

Namely, in the above described head unit 4, when a pressing force towards the rear side acts on the head component 23, the head component 23 retreats towards the base end side (i.e., the tool main body 10 side—the right side in FIG. 14B and FIGS. 15A to 15D) of the protruding portion 19 due to the elastic deformation of the tilt spring 41 and the compression spring 42.

Because of this, as is shown in FIGS. 15A to 15D, FIG. 16, and FIG. 17 and the like, when the head component 23 is pressed against the joining end surface 61a of the optical plug 60, the pressing force from the head component 23 against the joining end surface 61a of the optical plug 60 is prevented from becoming larger than is necessary, and the tilt spring 41 and compression spring 42 function as an urging device that elastically urge the head component 23 against the joining end surface 61a of the optical plug 60.

Moreover, even if the hand of an operator holding the cleaning tool 1 shakes or the like during cleaning, the tilting of the head component 23 lessens any variations in the pressing force with which the head component 23 presses the ferrule 61, and it is possible to prevent any excessive pressing force acting on the joining end surface 61a and prevent the joining end surface 61a and the end surface of the optical fibers 63a and the like becoming scratched.

Moreover, dirt is prevented from adhering to and becoming stuck on the ferrule 61 on the optical connector 60 side, so that dirt can be easily wiped off.

Moreover, because the amount of rearward displacement of the cleaning medium pressing surface 24 of the head component 23 can be maintained by the compression spring 42, this optical connector cleaning tool can also be applied, for example, to optical components such as optical plugs and transceivers in which the position of the optical reference surface is different, and cleaning performed with the position of the cleaning medium 2a matched to the joining end surface.

When the head component 23 is tilted, there is substantially no (or absolutely no) displacement of the head unit 4 in the vertical direction (i.e., in the up and down direction in FIG. 15A through 15D). Because of this, it is possible to prevent any shift in the central position between the joining end surface 61a of the optical plug 60 and the cleaning medium pressing surface 24 of the head component 23 resulting in the cleaning medium 2a not making satisfactory contact with the joining end surface 61a, and prevent any unevenness in the contact force with which the joining end surface 61a comes into contact with the cleaning medium 2a. It is thus possible to even more reliably remove any contamination from the joining end surface 61a.

Because the insertion portion 20 is also positioned in the connector housing hole 72 of the optical adapter 70 during cleaning, the joining end surface 61a can be wiped clean by a uniform pressing force from the cleaning medium contact portion 2a without any shift in position. In addition, the insertion portion 20 can be supported within the optical adapter 70 by an extremely light force, so that workability is excellent.

Here, a more detailed explanation will be given of the tilting of the head component 23 in this head unit 4.

FIG. 17 shows a state in which the insertion portion 20 of this cleaning tool 1 is inserted into the connector housing hole 72 of the optical adapter 70, and the cleaning medium 2 is pressed against the joining end surface 61a of the optical plug 60 by the head component 23 of the head unit 4.

FIGS. 15A to 15D are views showing in typical form the vicinity of the head component 23 and tilt spring 41 in the head unit 4.

FIG. 15A shows a state prior to the cleaning medium 2 being pressed against the optical plug 60 by the head component 23, while FIGS. 15B through 15D show a state in which the cleaning medium 2 is pressed against the optical plug 60.

Note that FIGS. 15B to 15D show a case in which the insertion portion 20 is inserted into the optical adaptor 70 when the tilt of the tape pressing surface 24 prior to it being pressed against the joining end surface 61a of the optical plug 60 has the orientation shown in FIG. 15A (the tilt of the cleaning medium pressing surface 24 shown in FIG. 15B is the same as in FIG. 15A), and the head component 23 is pressed against the joining end surface 61a of the optical plug 60.

The insertion portion 20 can be inserted in or removed from the connector housing hole 72 of the optical adapter 70 by moving along an axis which is an extension of the optical axis of the optical fiber 63a incorporated in the ferrule 61.

FIGS. 15B and 15C show a case of an optical plug 60 having the diagonally polished joining end surface 61a; FIG. 15D shows a case of an optical plug 60 having a flat polished joining end surface 61a (i.e., a joining end surface that has been polished perpendicularly to the optical axis of the optical fiber 63a (FIG. 16) incorporated in the ferrule 61).

The joining end surfaces 61a of the optical plugs 60 shown in FIGS. 15B and 15C are tilted surfaces that are tilted 8° compared to the joining end surface 61a of the optical plug 60 shown in FIG. 15D.

Here, a tilt angle θ2 (see FIG. 16) of the diagonally polished joining end surface 61a relative to a joining end surface that has been flatly polished matches a tilt angle θ1 (see FIG. 13) of the cleaning medium pressing surface 24.

However, the direction of the tilt of the joining end surface 61a in FIG. 15B is the reverse of that in FIG. 15C.

In FIG. 15B, the orientation of the joining end surface 61a of the optical plug 60 is aligned with the orientation of the cleaning medium pressing surface 24 of the head component 23 of the insertion portion 20 that has been inserted into the optical adapter 70.

In FIG. 15C, the orientation of the tilt of the joining end surface 61a of the optical plug 60 is the reverse of that in FIG. 15B.

Note that, in the same way as FIG. 15B, FIG. 17 also shows a case in which the orientation of the joining end surface 61a of the optical plug 60 is aligned with the orientation of the cleaning medium pressing surface 24 of the head component 23 of the insertion portion 20 that has been inserted into the optical adapter 70, and FIG. 15B shows the state depicted in FIG. 17 in typical view.

In the case shown in FIG. 15B, because the orientation of the joining end surface 61a of the optical plug 60 is aligned with the orientation of the cleaning medium pressing surface 24 of the head component 23 of the insertion portion 20 that has been inserted into the optical adapter 70, if the insertion portion 20 is pushed in the direction of the optical plug 60 into the optical adaptor 70, there is substantially (or absolutely) no tilting of the head component 23, and the cleaning medium 2 can be gripped between the joining end surface 61a and the cleaning medium pressing surface 24 and is pushed hard against the joining end surface 61a. At this time, the entire portion of the cleaning medium 2 that is positioned along the cleaning medium pressing surface 24 of the head component 23 (i.e., the contact portion 2a) can be pressed against the joining end surface 61a of the optical plug 60 by a uniform pressing force.

As in FIGS. 15C and 15D, when the orientations of the joining end surface 61a of the optical plug 60 and the cleaning medium pressing surface 24 of the head component 23 do not match, then when pressing force is applied from the head component 23 to the optical plug 60, the pressing force acting on the head component 23 is unevenly distributed between a top edge 24a side (i.e., the end portion on the spring apex portion side) and the bottom edge 24b side (i.e., the end portion on the spring rear side) of the cleaning medium pressing surface 24. As a result, the tilt spring 41 is elastically deformed and the head component 23 is tilted.

The head component 23 is tilted by the elastic deformation of the tilt spring 41 so as to follow the joining end surface 61a of the optical plug 60 as the pushing in of the insertion portion 20 which has been inserted into the optical adapter 70 towards the optical plug 60 progresses. Ultimately, the head component 23 is pushed hard against the joining end surface 61a of the optical plug 60, and the cleaning medium 2 becomes gripped between the head component 23 and the joining end surface 61a.

In the cases shown in FIGS. 15C and 15D, due to the pressing of the head component 23 against the joining end surface 61a of the optical plug 60, a pressing force from the optical plug 60 (specifically, the ferrule 61) is applied relatively more towards the rear at the bottom edge 24b of the cleaning medium pressing surface 24 compared to the top edge 24a, so that the tilt spring 41 is elastically deformed such that the two ends thereof in the front and rear directions come closer to each other. In FIGS. 15C and 15D, as a result of the distance between the two ends in the front and rear directions of the arch-shaped tilt spring 41 becoming shorter, compared to the state shown in FIG. 15A, the tilt spring 41 takes on a more narrow elongated shape vertically.

Moreover, as a result of the bottom edge 24b of the cleaning medium pressing surface 24 being displaced towards the rear side relatively compared to the top edge 24a, there is a change in the orientation of the head component 23 such that the top edge 24a of the cleaning medium pressing surface 24 is displaced towards the front, which results in the cleaning medium pressing surface 24 on the spring apex portion side pressing the cleaning medium 2 against the joining end surface 61a of the optical plug 60.

Figure 37B:
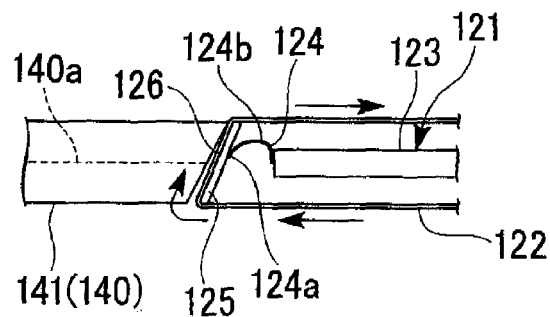
Figure 37C:
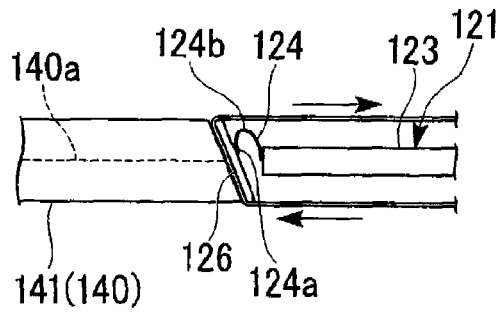
Figure 37D:
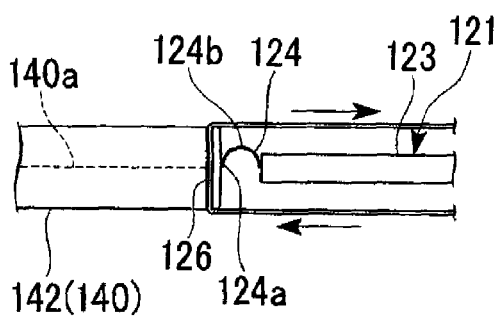

Here, in the same way as in the cases shown in FIGS. 37C and 37D, the change in the orientation of the head component 23 in the cases shown in FIG. 15C and FIG. 15D is achieved by the deformation of the entire tilt spring 41.

In the cases shown in FIGS. 15C and 15D, the phenomenon such as that described with reference to FIG. 37B does not occur. Namely, there is no occurrence of the phenomenon in which a deformation is applied to the portion of the tilt spring 41 on the protruding distal end 411 side from the curve apex portion 412, and the protruding distal end 411 side is pushed out towards the front relative to the curve apex portion 412 so that the curvature radius is enlarged. Because of this, the deformation of the entire tilt spring 41 proceeds smoothly, and the cleaning medium pressing surface 24 is guaranteed to be able to follow the joining end surface 61a extremely closely.

As a result, sufficient uniformity can be achieved in the pressing force from the cleaning medium pressing surface 24 onto the joining end surface 61a of the optical plug 60, and the portion 2a of the cleaning medium 2 that is located on the cleaning medium pressing surface 24 (also referred to below as the contact portion) can be pressed uniformly against the joining end surface 61a and an excellent cleaning performance can be obtained.

According to this cleaning tool 1, by employing a structure in which the cleaning medium pressing surface 24 of the head component 23 that is supported by the protruding distal end 411 of the tilt spring 41 is tilted gradually forward as it moves from the spring apex portion side towards the spring rear side, when the cleaning medium 2 is pressed by the head component 23 against the joining end surface 61a, then irrespective of the tilt direction of the joining end surface 61a of the optical plug 60, it is possible to ensure a high capability to follow the joining end surface 61a in the cleaning medium pressing surface 24 as a result of the elastic deformation of the tilt spring 41. Because of this, the portion of the cleaning medium 2 that is positioned along the cleaning medium pressing surface 24 can be pressed against the joining end surface 61a by a uniform pressing force, and an excellent cleaning performance can be reliably maintained.

Moreover, as a result of this, it is also possible to obtain an excellent cleaning performance irrespective of the orientation of the insertion of the insertion portion 20 into the optical adapter 70 (i.e., without switching the front and back thereof). Because a high capability to follow the tilt direction of the joining end surface 61a of the optical plug 60 is obtained in the cleaning medium pressing surface 24 of the head component 23, even if a variation in the orientation of the cleaning medium pressing surface 24 relative to the joining end surface 61a arises due to a tilting operation or the like of the cleaning tool 1 by the operator of the cleaning tool 1, it is still possible to consistently obtain an excellent cleaning performance. Naturally, it is of course possible to maintain a state of tight adhesion of the cleaning medium 2 against the joining end surface 61a of the optical plug 60.

It is preferable for the tilt angle θ1 of the cleaning medium pressing surface 24 to be the same as the tilt angle θ2 of the diagonally polished joining end surface 61a of the optical plug 60 (see FIG. 16), or larger than the tilt angle θ1 (namely, θ2≦θ1) as this enables the above described effects to be more reliably obtained.

(Relationship Between the Tape Feeding Direction and the Tilt of the Tape Pressing Surface)

As is shown in FIGS. 15B through 15D and FIG. 16 and the like, it is preferable from the standpoint of ensuring a consistently excellent cleaning performance for the feed direction in which the cleaning medium 2 is fed by the feeding mechanism 3 to be a direction in which the end portion on the spring rear side of the head component 23 on which the cleaning medium 2 has been wound is the upstream side in the feeding direction, and for the spring apex portion side to be the downstream side in the feeding direction (i.e., at the cleaning medium pressing surface 24, this is a feed movement from the spring rear side towards the spring apex portion side).

This is because the head unit 4 that is incorporated in the insertion portion 20 supports the arch-shaped tilt spring 41 and the head component 23 in a cantilevered structure at the front end of the supporting portion main body 44 that is supported on the protruding portion 19.

When the cleaning medium 2 has been fed forward by the operation of the cleaning medium feeding mechanism 3, as a result of the contact resistance with the cleaning medium 2 that is wound around the head component 23, the head component 23 receives a displacement force following the cleaning medium 2 towards the downstream side in the feeding direction of the cleaning medium 2. As a result, deformation force is applied to the tilt spring 41.

If the feeding direction of the cleaning medium 2 is a direction heading from the spring rear side towards the spring apex portion side in the head component 23, then due to the contact resistance between the head component 23 and the cleaning medium 2, a rotation force towards the front centering on the protruding distal end 411 of the tilt spring 41 acts on the spring rear side end portion of the head component 23, while a displacement force acts on the rear side of the spring apex portion side end portion.

Here, in order to actually generate a rotational displacement towards the front centering on the protruding distal end 411 of the tilt spring 41 on the spring rear side end portion of the head component 23, it is also necessary to realize a phenomenon such as that described with reference to FIG. 37B, namely, the phenomenon in which deformation is applied to the portion of the arch-shaped tilt spring 41 on the protruding distal end 411 side from the curve apex portion 412, and the protruding distal end 411 side is pushed out towards the front relative to the curve apex portion 412 so that the curvature radius is enlarged, and relative to the curve apex portion 412, the protruding distal end 411 is displaced forwards relatively in the pressing direction towards the ferrule 61.

However, as is shown in FIGS. 15B through 15D, in a state in which the cleaning medium 2 is pressed tightly against the joining end surface 61a of the optical plug 60 by the pressing force from the head component 23, because the displacement towards the front of the spring rear side portion of the head component 23 that is supported at the front end (i.e., the protruding distal end 411) of the arch-shaped tilt spring 41 is restricted by the joining end surface 61a of the optical plug 60, there is no available space for the phenomenon to occur in which deformation is applied to the portion of the arch-shaped tilt spring 41 on the protruding distal end 411 side from the curve apex portion 412, and the protruding distal end 411 side is pushed out towards the front relative to the curve apex portion 412 so that the curvature radius is enlarged, and in which, relative to the curve apex portion 412, the protruding distal end 411 is displaced forwards relatively in the pressing direction towards the ferrule 61. Because of this, in a state in which the joining end surface 61a of the ferrule 61 and the cleaning medium pressing surface 24 of the head component 23 are closed together sandwiching the cleaning medium 2, even if the cleaning medium 2 is fed forward, there is no change in the orientation of the head component 23. Moreover, it is also possible to consistently obtain a pressing state in which the cleaning medium 2 is pressed uniformly against the joining end surface 61a by the pressing force from the cleaning medium pressing surface 24.

However, if the feed direction of the cleaning medium 2 is a direction heading from the spring rear side towards the spring apex portion side in the head component 23, then it is possible to consistently maintain a uniform pressing state of the cleaning medium 2 by the cleaning medium pressing surface 24 against the joining end surface 61a, and an excellent cleaning performance can be consistently obtained.

In contrast, if the feed direction in which the cleaning medium 2 is fed by the operation of the cleaning medium cleaning mechanism 3 is temporarily changed to a direction heading from the spring apex portion side towards the spring rear side (namely, a movement in the opposite direction to the cleaning medium feeding direction indicated by the arrows and FIGS. 15B through 15D and FIG. 16) at the cleaning medium pressing surface 24, then, for example, when a strong displacement force which exceeds the pressing force of the head component 23 against the joining end surface 61a which is created by the tilt spring 41 and compression springs 42 of the head unit 4 towards the rear side of the head unit 4 is applied to the spring rear side end portion of the head component 23 as a result of contact with the cleaning medium 2, there is a possibility that a displacement towards the rear side of the head unit 4 will be generated.

The spring rear side portion of the head component 23 is able to be displaced towards the rear side of the head unit 4 by the elastic deformation of the tilt spring 41 and compression springs 42. Because of this, if a strong displacement force towards the rear side of the head unit 4 is applied as a result of the feeding movement of the cleaning medium 2 to the spring rear side end portion of the head component 23, then this displacement towards the rear side of the head unit 4 may occur due to the elastic deformation of the tilt spring 41 and compression springs 42.

At this time, the displacement towards the front side of the spring apex portion rear portion of the head component 23 is restricted by the joining end surface 61a of the optical plug 60. The displacement of the spring rear side portion of the head component 23 towards the rear side of the head unit 4 is generated by a rotational displacement of the head component 23 centering on the spring apex portion end portion of the head component 23.

Accordingly, according to this cleaning tool 1, if the end portion on the spring rear side of the head component 23 on which the cleaning medium 2 has been wound is the upstream side in the feeding direction, and if the spring apex portion side is the downstream side in the feeding direction (i.e., at the cleaning medium pressing surface 24, this is a feed movement from the spring rear side towards the spring apex portion side), then even in any of the cases shown in FIGS. 15B to 15D, this is advantageous as it is possible to secure an excellent cleaning performance.

Note that, in FIGS. 10A to 10D, FIG. 11, FIGS. 13A and 13B, and FIGS. 15A to 15D and the like, an example is shown in which the triangular block-shaped head component 23, which is equipped with a rear surface 23b which is perpendicular to the front-rear direction of the head unit 4, and the cleaning medium pressing surface 24 which is inclined relative to the rear surface 23b, is used for the head component, however, it is also possible to employ a plate-shaped head component 23 which is equipped with a rear surface 23c which is parallel to the cleaning medium pressing surface 24 such as is shown in the example in FIGS. 20A through 20D as the head component. In this case as well, the behavior of the head unit 4 such as the tilting of the head component when the cleaning medium 2 is pressed against the flat polished or diagonally polished joining end surface 61a of the optical plug 60 by the cleaning medium pressing surface 24 is the same as in the case of triangular block-shaped head component 23.

Figure 20A:
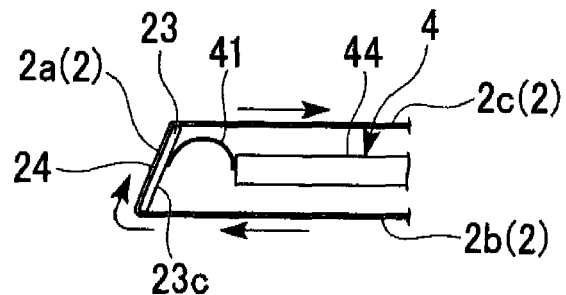
FIGS. 20A to 20D are views illustrating the behavior of a head unit when a cleaning medium is pressed against a joining end surface of an optical plug by the head component when the head component of the head unit of the present cleaning tool is plate shaped, with FIG. 20A showing a state prior to the pressing, FIGS. 20B and 20C showing the cleaning medium being pressed against the diagonally polished joining end surface of an optical plug, and FIG. 20D showing the cleaning medium being pressed against a flat polished joining end surface of an optical plug.
Figure 20B:
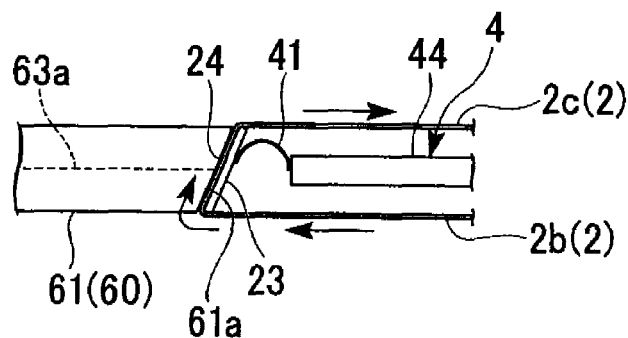
Figure 20C:
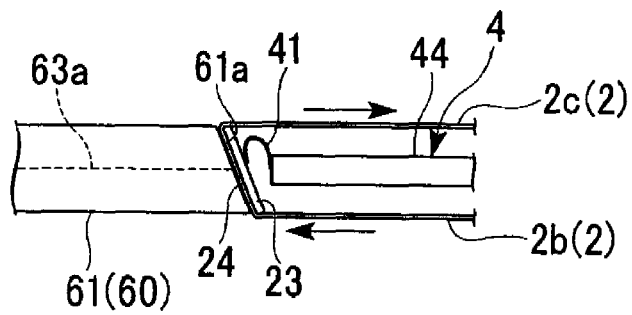
Figure 20D:
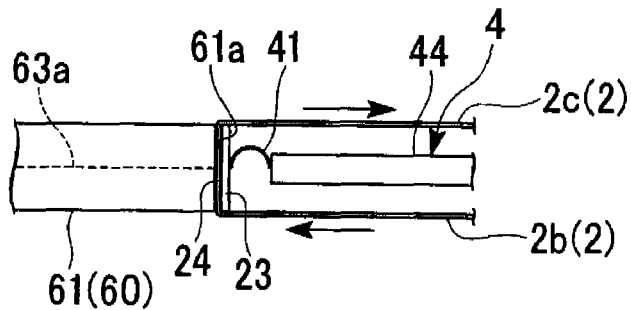

The orientation of the joining end surface 61a of the optical plug 60 shown in FIGS. 20B through 20D corresponds to that in FIGS. 15B through 15D.

Because the cleaning tool of the present embodiment can be manufactured without the use of metal components such as screws and the like by component assembly from a flammable material such as POM or PS, after use, it does not need to be disassembled and can be disposed of by burning.

The present invention has been described above on the basis of a preferred embodiment thereof, however, the present invention is not limited to this preferred embodiment and various modifications can be made without departing from the spirit or scope of the present invention.

Another embodiment of the optical connector cleaning tool according to the present invention will now be described with reference made to the drawings. Components and parts that are the same as those in the embodiment described with reference to FIG. 1A through FIG. 22D are given the same reference symbols and duplicated drawings and duplicated descriptions are omitted where appropriate.

Figure 31:
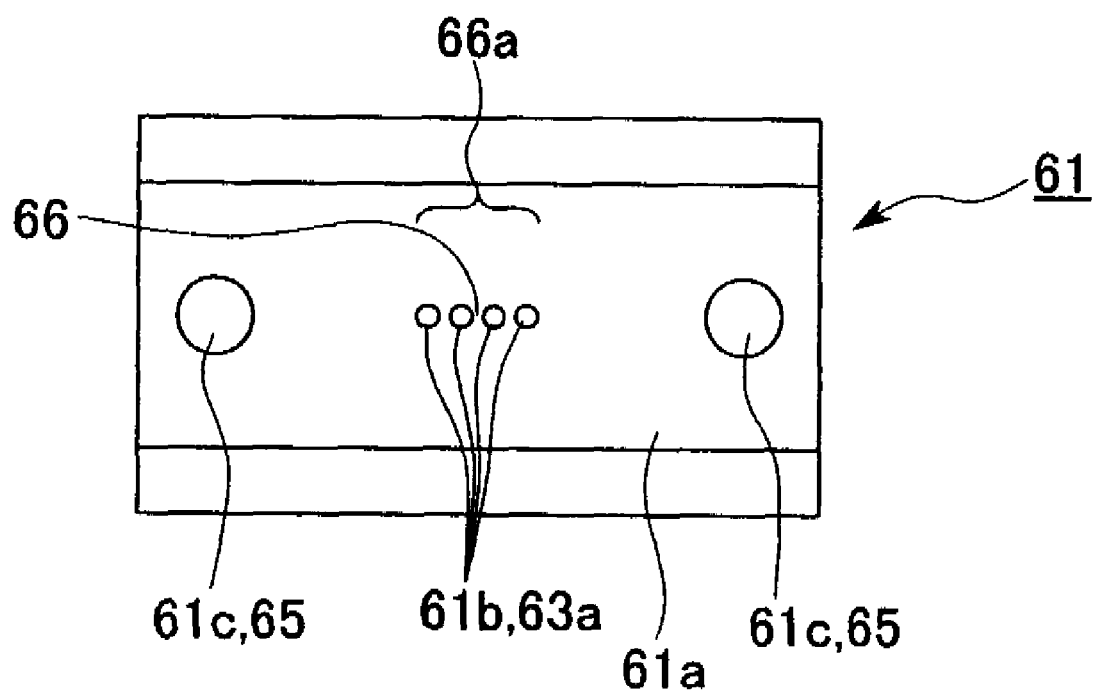
FIG. 31 is a front view showing an example of a ferrule of an optical connector plug.

Note that FIG. 31 is a view showing the schematic structure of a ferrule 61 that has a vertically polished (i.e., a flat polished) or diagonally polished joining end surface 61a as viewed from the joining end surface 61a side.

Figure 28A:
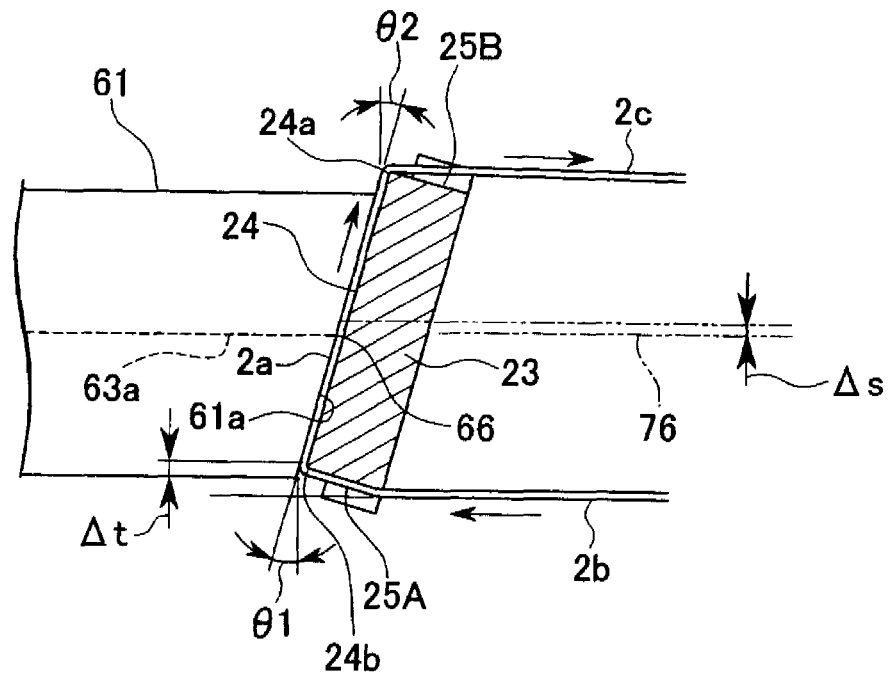
FIGS. 28A and 28B are views showing a state in which cleaning medium is pressed against the diagonally polished joining end surface of an optical plug by the head component of the head unit of the present cleaning tool.
Figure 28B:
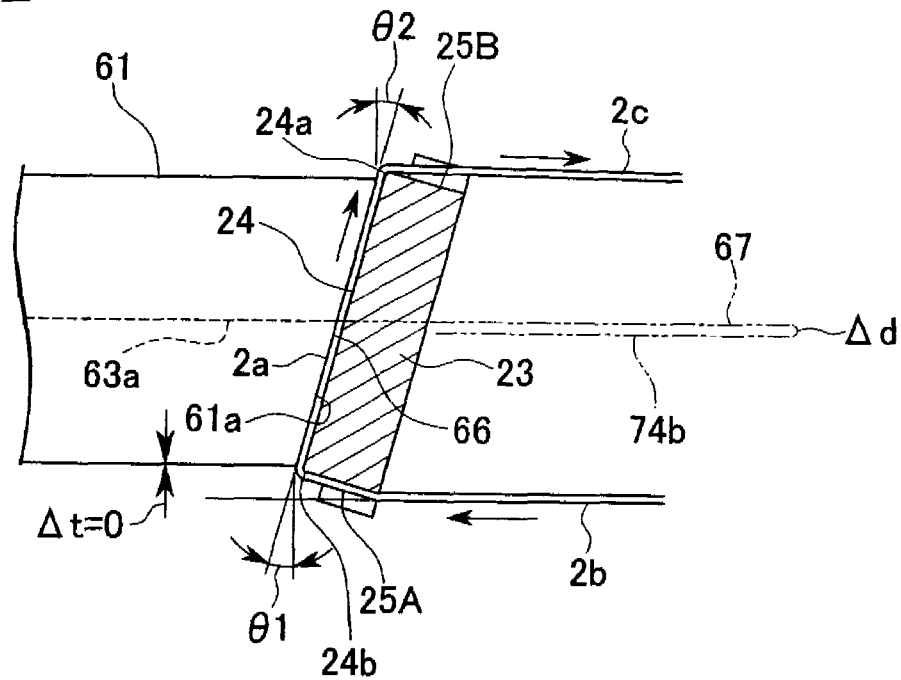
Figure 29:
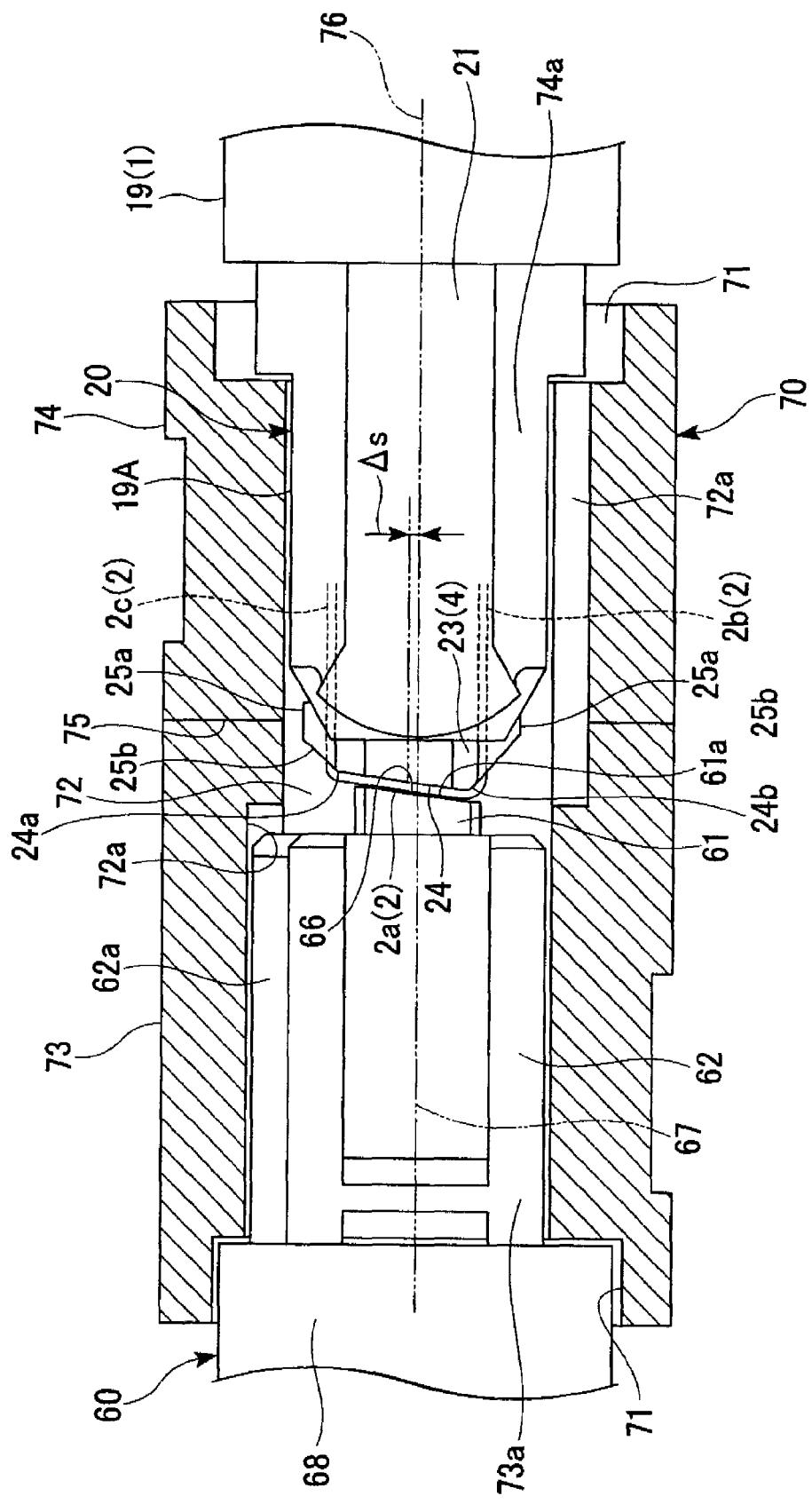
FIG. 29 is a schematic view showing a state in which the diagonally polished joining end surface of an optical connector plug is butted against the distal end surface of the head component.
Figure 30:
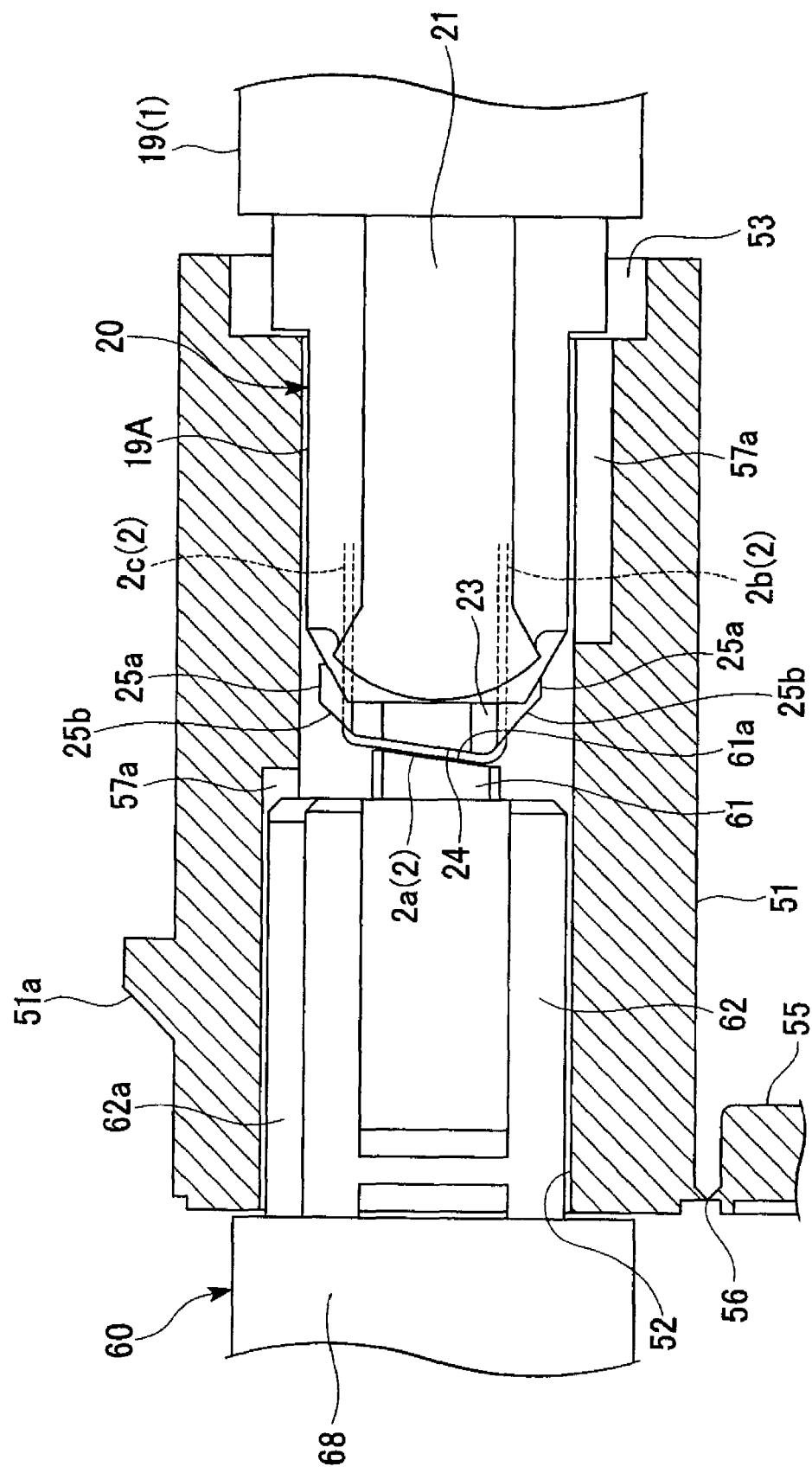
FIG. 30 is a cross-sectional view showing an example of a state in which an optical connector plug and the insertion portion of the present cleaning tool are inserted into a guide cap.

As is shown in FIGS. 28A and 28B and FIG. 29 and the like, in cases in which the ferrule 61 of the optical plug 60 is a ferrule having a diagonally polished joining end surface 61a as well, the up and down direction shown in FIG. 31 is described as the thickness direction, while the left-right direction in FIG. 31 corresponds to the transverse direction.

As is shown in FIG. 31, a predetermined number of (here, four) optical fiber holes 61b (i.e., micro holes) are formed in a pattern in the vicinity (i.e., a fiber exposure area 66a) of a center position 66 of a joining end surface 61a of the ferrule 61. Guide pin holes 61c are provided on both outer sides in the transverse direction of the fiber exposure area 66a.

Because the cleaning tool of the present embodiment can be manufactured without the use of metal components such as screws and the like by component assembly from a flammable material such as POM or PS, after use, it does not need to be disassembled and can be disposed of by burning.

A head unit 4 (i.e., a cleaning medium pressing mechanism) is incorporated.

In FIGS. 28A and 28B the top side is referred to as the top while the bottom side is referred to as the bottom.

Figure 26B:
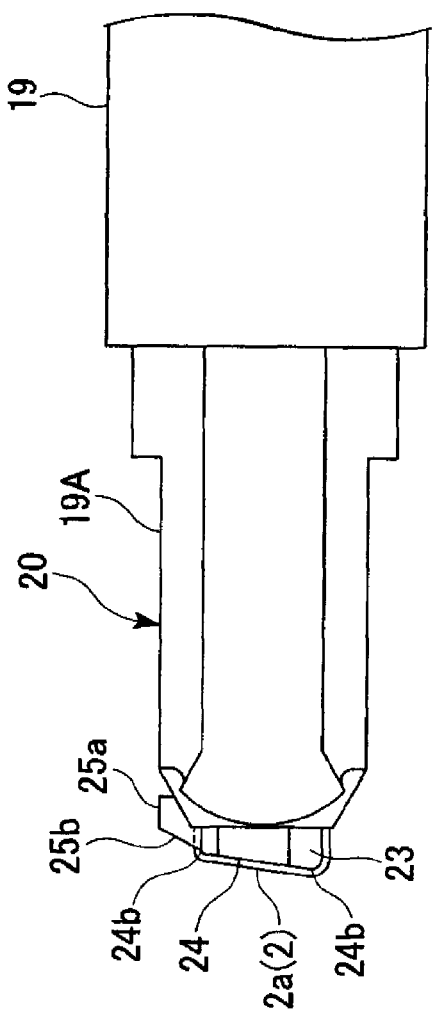
FIGS. 26A and 26B are views showing the vicinity of an insertion portion of the present cleaning tool, with FIG. 26A showing the structure as seen from a head component side, and FIG. 26B being a frontal view.
Figure 26A:
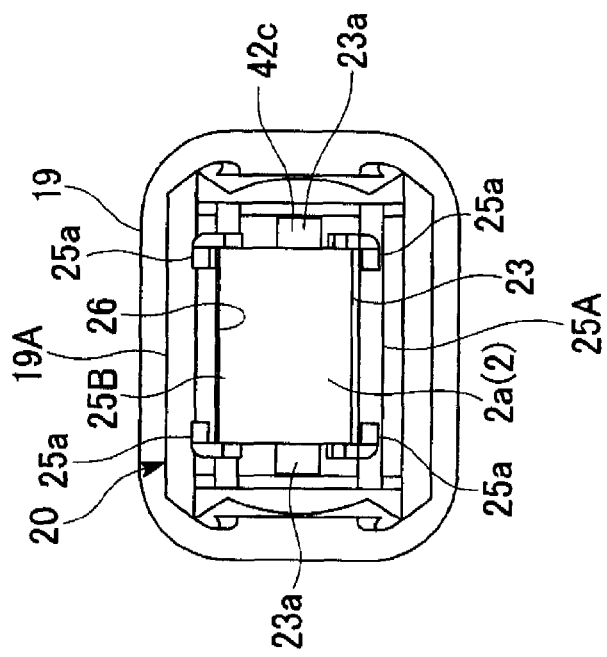

As is shown in FIG. 26B and the like, the head component 23 is supported in a state of protruding from the distal end of the tool distal end protruding portion 19 by the head supporting portion 40.

Figure 24:
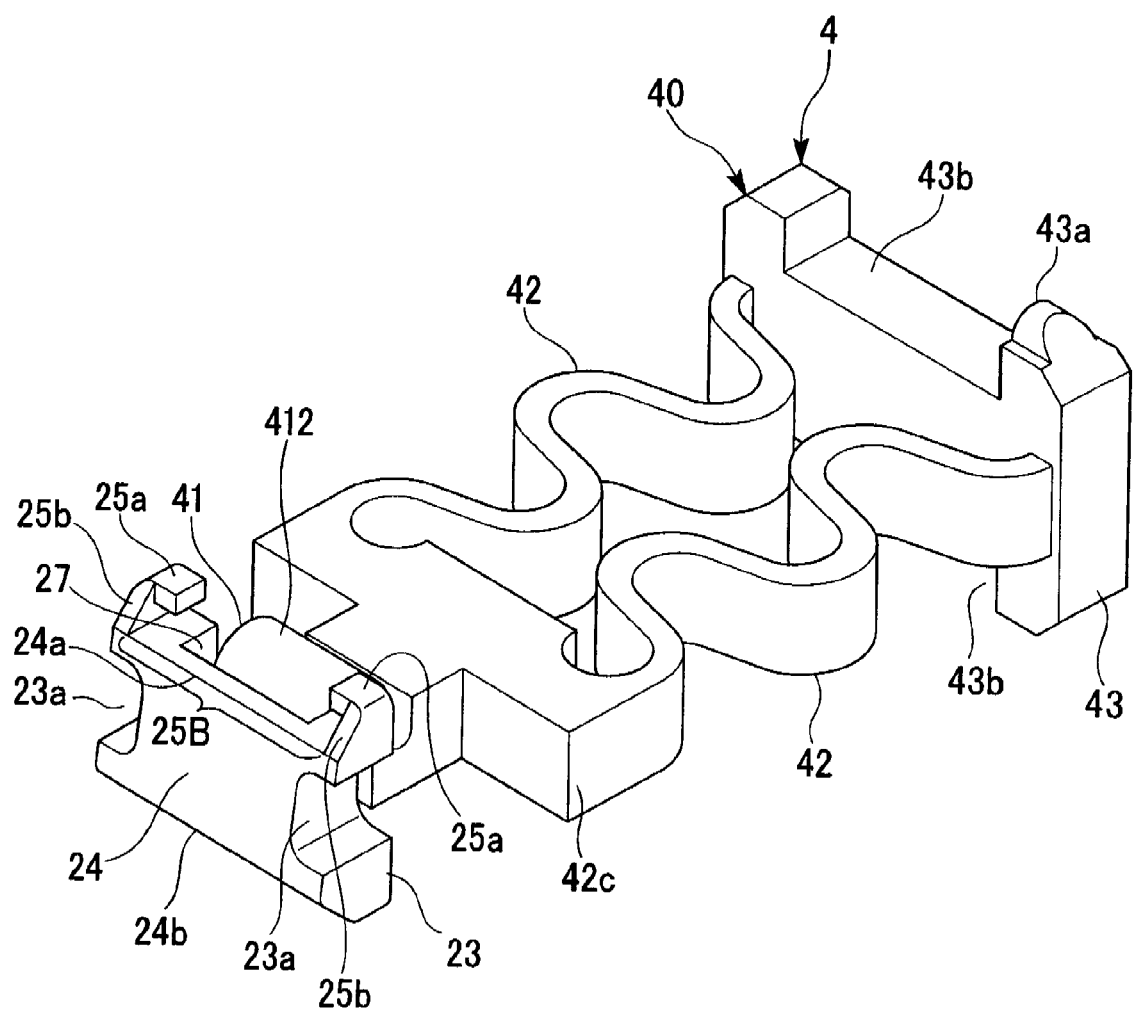
FIG. 24 is a perspective view of the head unit shown in FIG. 23A through FIG. 23D.

As is shown in FIG. 23C, FIG. 24, FIG. 26B, and the like, projection-shaped drop prevention pieces 25a that are provided at both the top and bottom end of the head component 23 are equipped on the front side thereof with sloping walls 25b in which the size of the protrusion in the up and down direction from the head component 23 becomes gradually larger moving from the front side (i.e., the side where the cleaning medium pressing surface 24 is formed) of the head component 23 towards the rear side (i.e., the side of the surface (the rear surface) located opposite the cleaning medium pressing surface 24 of the head component 23) thereof. The sloping walls 25b perform the function of enabling the task of inserting the insertion portion 20 into the connector housing hole 72 of the optical adaptor 70 to proceed smoothly. Consequently, the drop prevention pieces 25a do not obstruct the insertion task.

However, in the head component 23, the cleaning medium pressing surface 24 is not oriented so as to be perpendicular to the longitudinal direction of the cleaning medium pressing surface 24 (see, for example, Patent document 5).

The dimension in the up and down direction of the cleaning medium pressing surface 24 (here, this indicates the distance between the top edge 24a and the bottom edge 24b) of the head component 23, and the dimension in the left-right direction (i.e., the dimension in the left-right direction in FIG. 23C) are either the same as or slightly larger than the dimensions of the short sides and long sides of the rectangular joining end surface 61a of the ferrule 61.

However, as is shown in FIG. 28A, a center position 66 of the cleaning medium pressing surface 24 which is located in the center (i.e., a position the same distance from both edges 24a and 24b) between the bottom edge 24b (i.e., the upstream side end portion in the tape or cleaning medium flow direction) of the cleaning medium pressing surface 24 and the top edge 24a (i.e., the downstream side end portion in the tape flow direction) thereof is slightly offset towards the spring apex portion side from an extension of the center axis (here, a reference plane Ds located in the center of the thickness of the plate-shaped elastic bridging portion 45) of the insertion portion 20.

In FIG. 29, the optical adaptor 70 is formed by placing a pair of sleeve-shaped adaptor half bodies 73 and 74 in series and then joining them together to form a single unit. Connector housing holes 73a and 74a on the inner sides of the respective adaptor half bodies 73 and 74 penetrate through the connector housing hole 72 that extends through the inner side of the optical adaptor 70. In addition, a key groove 72a of the optical adaptor 70 is formed in each of the optical adaptor half bodies 73 and 74.

In the optical adaptor 70, ferrules 61 of optical plugs 60 that have been inserted from both sides into the connector housing hole 72 are butted together and connected in the vicinity of a joining boundary 75 between the two adaptor half bodies 73 and 74. Even when the insertion portion 20 of the cleaning tool 1 is inserted into the connector housing hole 72 of the optical adaptor 70 and the joining end surface 61a of the ferrule 61 of the optical plug 60 that is connected to one side of the optical adaptor 70 (i.e., one adaptor half body 63) is cleaned, the pressing of the cleaning medium 2 against the joining end surface 61a by the head component 23 is achieved in the vicinity of the joining boundary 75 between the pair of adaptor half bodies 73 and 74.

FIG. 29 is a view showing a state in which the center axis of the connector housing holes 73a and 74a of the respective adaptor half bodies 73 and 74 matches a single straight line (hereinafter, this straight line is referred to as a center axis of the connector housing hole 72 of the optical adaptor 70 (and is given the symbol 76)), and in which the center axis (i.e., a straight line that passes through the center position 66 of the joining end surface 61a of the ferrule 61, and is parallel with the optical axis of the optical fiber 63a that is exposed to the joining end surface 61a) of the optical plug 60 that is housed within the connector housing hole 73a of the adaptor half body 73 also matches the straight line 76 of the connector housing hole 72 of the optical adaptor 70, and the reference plane Ds of the elastic bridging portion 45 of the insertion portion 20 which is housed within the connector housing hole 74a of the other adaptor half body 74 is positioned on the center axis 76 of the optical adaptor 70 (i.e., the reference plane Ds is superimposed on the center axis 76).

Note that, here, because the reference plane Ds is positioned on (i.e., superimposed on) the center axis (here, the center axis of the protruding portion 19 of the tool body—an axis that matches the center axis of the adaptor half body 74) of the insertion portion 20, the center axis of the insertion portion 20 also matches the center axis 76 of the optical adaptor 70.

FIG. 28A is an enlarged view showing a typical view of a relationship between the head component 23, the cleaning medium 2, and the ferrule 61 in the state shown in FIG. 29.

In FIG. 28A and FIG. 29, the thickness direction (i.e., the up and down direction in FIG. 31) of the ferrule 61 of the optical plug 60 that is connected to the optical adaptor 70 is aligned with the up and down direction in FIG. 28A and FIG. 29. The transverse direction (i.e., the left-right direction in FIG. 31) of the ferrule 61 is the depth direction from the paper surface in FIG. 28A and FIG. 29, and the pair of guide pin holes 61c that are formed at a distance from each other in the transverse direction (i.e., the left-right direction in FIG. 31) of the joining end surface 61a of the ferrule 61 in FIG. 28A and FIG. 29 are present at a distance from each other in the depth direction from the paper surface.

In the head unit 4 of the insertion portion 20 of the cleaning tool 1, the reference plane Ds is oriented perpendicularly to the up and down direction in FIG. 28A and FIG. 29. As in FIG. 29, when the center axis of the optical plug 60 matches the center axis 76 of the connector housing hole 72 of the optical adaptor 70, the center axis of the pair of guide pin holes 61c of the ferrule 61 of the optical plug 60 is positioned on an extension of the reference plane Ds (i.e., is superimposed on the reference plane Ds).

However, as has been described above, the center position of the cleaning medium pressing surface 24 of the head component 23 is slightly offset towards the spring apex portion side from the center axis of the insertion portion 20 (here, the reference plane Ds of the head unit 4).

Because of this, the center position of the cleaning medium pressing surface 24 of the head component 23 does not match the center axis 76 of the optical adaptor 70, and is offset by a shift amount Δs from the center axis 76. In FIG. 28A and FIG. 29, this is a shift towards the top.

The position of the head component 23 of the insertion portion 20 is set such that the cleaning medium pressing surface 24 faces and is able to press the cleaning medium 2 within a range that includes at least the fiber exposure area 66a from within the joining end surface 61a of the ferrule 61. The bottom edge 24b and the top edge 24a of the cleaning medium pressing surface 24 of the head component 23 are placed vertically apart from each other via the center axis (here, matching the center axis 76 of the optical adaptor 70) of the insertion portion 20.

However, as has been described above, the center position of the cleaning medium pressing surface 24 is offset towards the top from the center axis of the insertion portion 20. Because of this, the distance from the center axis 76 of the optical adapter 70 to the bottom edge 24b of the cleaning medium pressing surface 24 is shorter compared with the top edge 24a.

In addition, in the state shown in FIG. 28A and FIG. 29, the position of the head component 23 of the cleaning tool 1 is set such that the position in the up and down direction in FIG. 17 of the bottom edge 24b of the cleaning medium pressing surface 24 is above the bottom edge of the joining end surface 61a (i.e., a portion of the outer circumferential portion of the joining end surface 61a—the bottom edge of the joining end surface 61a in FIG. 28A, FIG. 29, and FIG. 31), and below the optical fiber 63a that is exposed at the fiber exposure area 66a in the central portion of the joining end surface 61a.

Note that, in the head unit 4, it is sufficient for the reference plane Ds to be parallel with the center axis of the adapter half body 73 in which the insertion portion 20 is housed, and to be oriented perpendicularly to the up and down direction in FIG. 28A and FIG. 29, and it is not absolutely essential for the reference plane Ds to be superimposed on the center axis 76 of the optical adapter 70.

However, it is of course to be understood that, in the state shown in FIG. 28A and FIG. 29, the position where the head unit 4 is incorporated in the insertion portion 20 is set such that the position in the up and down direction in FIG. 28A and FIG. 29 of the bottom edge 24b of the cleaning medium pressing surface 24 is above the bottom edge of the joining end surface 61a, and below the optical fiber 63a that is exposed at the fiber exposure area 66a in the central portion of the joining end surface 61a.

(Guide Cap)

The plug insertion aperture 52 and the insertion portion insertion aperture 53 communicate via the internal space 54 (i.e., the connector housing hole) of the guide cap 50.

(Cleaning Using the Guide Cap)

Next, an example of the procedure when the joining end surface 61a of an optical plug 60 outside the optical adapter 70 is cleaned using the guide cap 50 will be described.

Figure 27A:
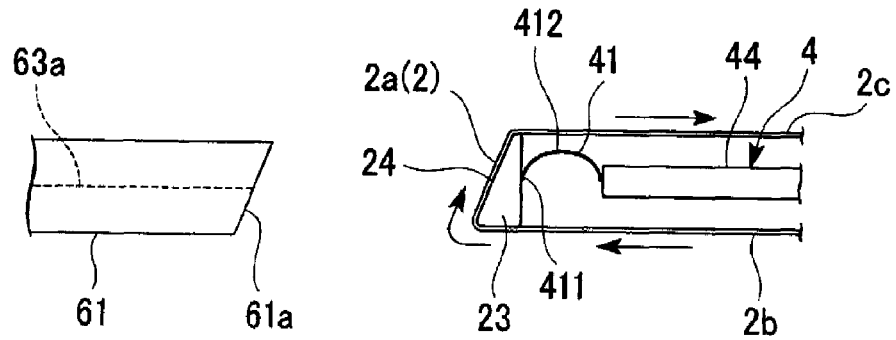
FIGS. 27A to 27D are views illustrating the behavior of a head unit when a cleaning medium is pressed against a joining end surface of an optical plug by the head component of the present cleaning tool, with FIG. 27A showing a state prior to the pressing, FIGS. 27B and 27C showing the cleaning medium being pressed against the diagonally polished joining end surface of an optical plug, and FIG. 27D showing the cleaning medium being pressed against a flat polished joining end surface of an optical plug.
Figure 27B:
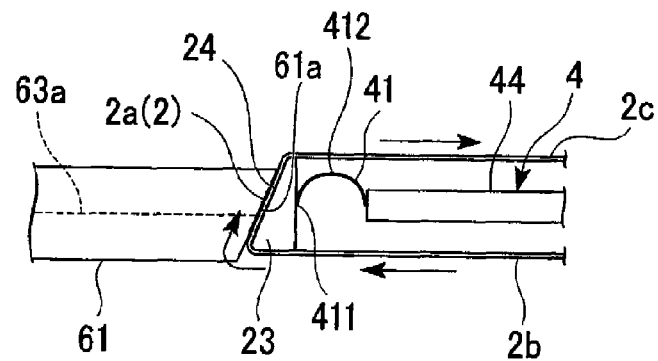
Figure 27C:
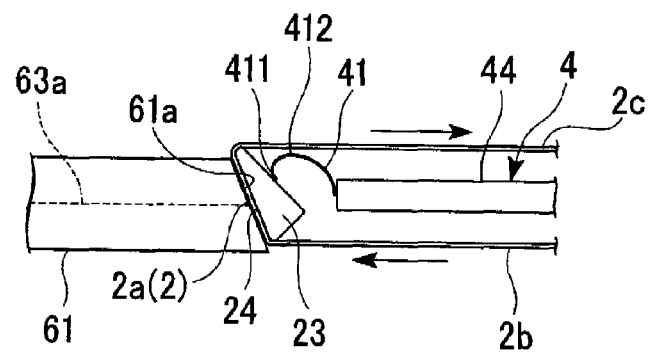
Figure 27D:
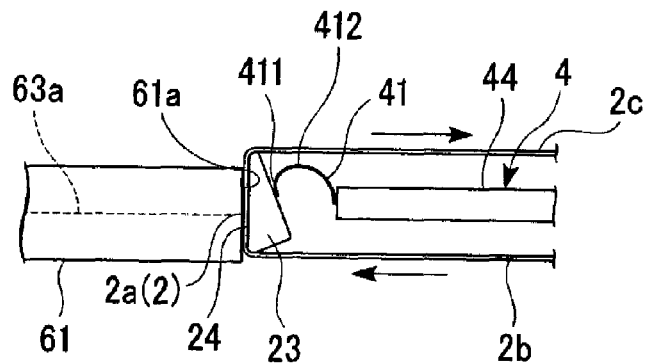

Because the head component 23 is able to tilt relatively to the pressing force when the cleaning medium pressing surface 24 of the head component 23 is in contact with the joining end surface 61a of the optical plug 60, even when a ferrule 61 such as that shown in FIG. 27D (i.e., a ferrule in which the joining end surface 61a is a polished surface that extends in the thickness direction of the ferrule 61) whose joining end surface 61a has been polished at a right angle (i.e. has been flat polished) is in contact with the cleaning medium pressing surface 24, or when a ferrule 61 such as that shown in FIGS. 27B and 27C (i.e., a ferrule in which the joining end surface 61a is a surface which has been diagonally polished relative to the thickness direction of the ferrule 61) whose joining end surface 61a has been diagonally polished is in contact with the cleaning medium pressing surface 24, the orientation of the cleaning medium pressing surface 24 can be matched to the orientation of the joining end surface 61a, and the cleaning medium 2a which is on the cleaning medium pressing surface 24 can be more uniformly and reliably placed in contact with the joining end surface 61a.

(Tilt of the Head Component)

Here, a detailed description will be given of the tilt of the head component 23 in the head unit 4.

Figure 33A:
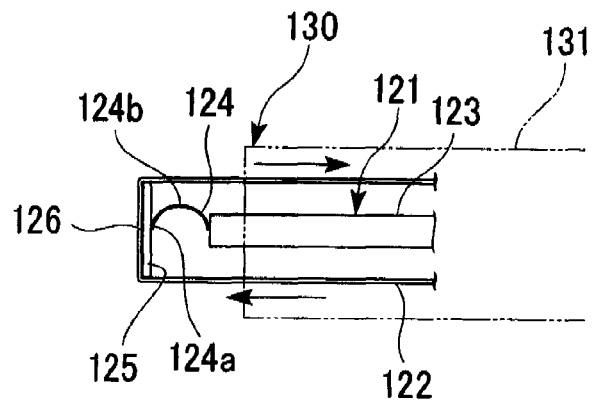
FIGS. 33A to 33D are views illustrating the behavior of a head unit when a cleaning medium is pressed against a joining end surface of an optical plug by a head plate of a head unit of a predetermined cleaner serving as a comparative example of the present invention, with FIG. 33A showing a state prior to the pressing, FIGS. 33B and 33C showing the cleaning medium being pressed against the diagonally polished joining end surface of an optical plug, and FIG. 33D showing the cleaning medium being pressed against a flat polished joining end surface of an optical plug.

In order to simplify understanding, firstly, a comparative example will be described with reference made to FIGS. 33A to 33D. FIG. 33A shows an example of an insertion portion 130 that is provided protruding from the above described optical connector cleaning tool.

In FIG. 33A, the insertion portion 130 is equipped with a head component 121 that is assembled in a protruding portion 131 that protrudes from the optical connector cleaning tool. Cleaning medium 122 is wound around a head plate 125 (i.e., a head portion) at the distal end of this head component 121.

Note that in FIGS. 33A through 33D, for the insertion portion 130, the left side is described as being the front, the right side is described as being the rear, the top side is described as being the top, and the bottom side is described as being the bottom.

The head component 121 is formed by a head supporting portion 123 that is assembled in the protruding portion 131 of the optical connector cleaning tool, an elastically deformable circular plate-shaped spring portion 124 that protrudes from the distal end of the head supporting portion 123, and a head plate 125 that is supported on a protruding distal end 124a (i.e., a front end) that protrudes from the head supporting portion 123 of this spring portion 124.

The head plate 125 is supported on the head supporting portion 123 such that an end surface thereof (i.e., the front end surface—referred to below as a tape pressing surface or cleaning medium surface 126) which is located on the side facing the optical connector (i.e., a ferrule 140—see FIG. 33B through FIG. 33D) that is to be cleaned is oriented so as to be perpendicular to the forward-rearward direction of the insertion portion 130.

The cleaning medium 122 is wound around the head plate 125 so as to be in contact with the tape pressing surface 126 of the head plate 125.

The spring portion 124 supports a central portion in the up and down direction of the head plate 125 at the protruding distal end 124a that protrudes from the head supporting portion 123.

In the head plate 125, the side above the protruding distal end 124a of the spring portion 124 where a curve apex portion 124b of the spring portion 124 is located (i.e., the portion above the protruding distal end 124a in FIGS. 33A to 33D) is described below as a 'spring apex portion side', while the opposite side therefrom (i.e., the portion below the protruding distal end 124a in FIGS. 33A to 33D) is described below as a 'spring rear side'.

Figure 33B:
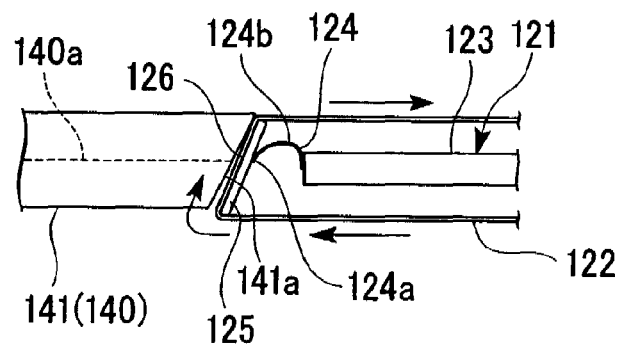
Figure 33C:
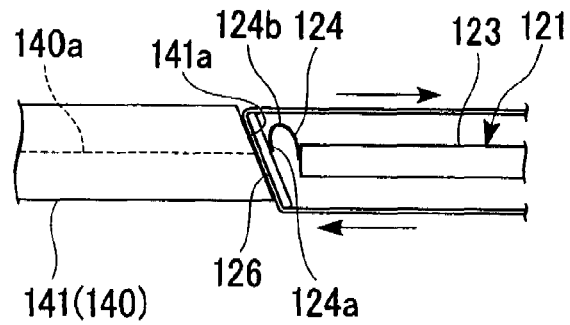
Figure 33D:
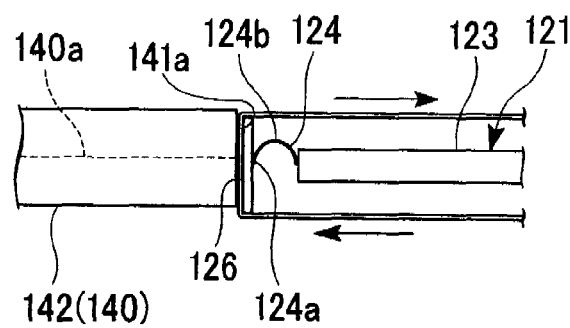

FIGS. 33B through 33D are views showing a state in which the cleaning medium 122 is pushed by the head component 121 against the joining end surface of the distal end of the ferrule 140 using the insertion portion of the above described cleaning tool.

However, in FIGS. 33B to 33D, the protruding portion 131 is not shown.

FIGS. 33B and 33C show a case in which the ferrule 140 is equipped with the diagonally polished joining end surface 141a (the symbol 141 is used below for this ferrule), while FIG. 33D shows a case in which the ferrule 140 is equipped with a flatly polished joining end surface (i.e., a joining end surface that is polished perpendicularly to the optical axis of an optical fiber 140a that is incorporated in the ferrule 140) 142a (the symbol 142 is used below for this ferrule).

The joining end surfaces 141a of the ferrules 141 shown in FIG. 33B and FIG. 33C are inclined surfaces that are inclined 8° compared to the joining end surface 142a of the ferrule 142 shown in FIG. 33. However, the directions of the tilt of the joining end surface 141a are the opposite in FIG. 33B and FIG. 33C.

According to investigations made by the present inventors and others, in the case of FIG. 33C and FIG. 33D from among FIG. 33B to FIG. 33D, it is possible to achieve satisfactory uniformity in the pressing force with which the head plate 125 presses the cleaning medium 122 onto the joining end surfaces 141a and 142a of the ferrules 141 and 142, however, in the case of FIG. 33B, compared with FIG. 33C and FIG. 33D, it was ascertained that there were instances in which there was considerable unevenness in the distribution of the pressing force.

Although the cause of this is unclear and needs to be investigated, it is thought to derive from the structure of the head component 121.

In the case of FIG. 33C and FIG. 33D, due to the pressing force with which the head plate 125 presses the cleaning medium 122 against the joining end surfaces 141a and 142a of the ferrules 141 and 142, the entire spring portion 124 is deformed, resulting in a uniform pressing force being achieved.

In the case of FIG. 33C, the head plate 125 (the orientation of this head plate 125 may also be referred to below as being 'flat' relative to the tilt of the joining end surfaces of the ferrules) which is perpendicular to the optical axis of the optical fiber 140*a* that is built into the ferrule 141 is pressed against the joining end surface 141*a* which is tilted relative to this optical axis, however, as a result of the deformation of the entire spring portion 124, the orientation of the head plate 125 changes so as to follow the tilt of the joining end surface 141*a*, and a uniform pressing force against the joining end surface 141*a* is achieved from the tape pressing surface 126.

In contrast to this, in the case of FIG. 33B, there is a tendency for the pressing force from the head plate 125 against the ferrule 141 to act more strongly, compared with other portions, on that portion where the amount of protrusion onto the insertion portion 130 side is greatest by the distal end of the ferrule 141 in which is formed the joining end surface 141*a* which is tilted relative to the optical axis of the optical fiber 140*a*.

In this case, due to the pressing of the head plate 125 against the protruding distal end of the ferrule 141, the spring apex portion side of the head plate 125 is pressed towards the rear in the pressing direction, so that the spring portion 124 is deformed and the orientation of the head plate 125 keeps changing as if it were rotating around a central portion between the end portion on the spring apex portion side of the head plate 125 and the end portion on the spring rear side thereof. The orientation of the head plate 125 thus progresses from a state of being perpendicular relative to the optical axis of the optical fiber 140*a* that is incorporated in the ferrule 141 to a state of tilting to match the joining end surface 141*a* of the ferrule 141.

The spring rear side portion of the head plate 125 moves towards the front in the pressing direction while tilting in conjunction with the change in the orientation of the head plate 125.

In FIG. 33C, the change (i.e., the tilt movement), which is caused by the pressing of the head plate 125 against the ferrule 141, in the orientation of the head plate 125 from a state of being perpendicular relative to the optical axis of the optical fiber 140*a* that is incorporated in the ferrule 141 is caused by the spring portion 124 which is formed in an arch shape so as to bridge the gap between the head plate 125 and the head supporting portion 123 deforming such that the curvature radius thereof becomes smaller (i.e., the distance between the front and rear ends of the spring portion 124 becomes shorter).

Because the spring rear side portion of the head plate 125 is a portion that extends within the head plate 125 towards the rear side from the protruding distal end 124*a* of the arch-shaped spring portion 124 as if to lengthen the spring portion 124, if the spring rear side portion of the head plate 125 is pushed by the protruding distal end of the ferrule 141 towards the rear side relative to the spring apex portion side portion, then the spring portion 124 is deformed as if to shrink its curvature radius.

In addition, the elastic restorative force of the spring portion 124 acts as a pressing force of the head plate 125 against the joining end surface 141*a*.

In contrast to this, in the case shown in FIG. 33B, the orientation of the portion adjacent to the protruding distal end 124*a* of the spring portion 124 changes in correspondence with the change in the orientation of the head plate 125, and this latter change accompanies the pressing in of the spring apex portion side portion of the head plate 125 towards the rear side in the pressing direction relative to the spring rear side portion which is caused by the pressing of the head plate 125 against the ferrule 141. As a result of this, a deformation is applied to the portion on the protruding distal end 124*a* side from the curve apex portion 124*b* of the spring portion 124 such that, compared with the state before the head plate 125 was pressing against the ferrule 141, the protruding distal end 124*a* is pushed outwards towards the front relative to the curve apex portion 124*b* and there is an expansion in the curvature radius.

However, if the above described type of deformation in which the curvature radius is expanded occurs in the portion on the protruding distal end 124*a* side from the curve apex portion 124*b* of the spring portion 124, then due to the elastic restorative force of the spring portion 124 against the deformation, on the spring rear side of the head plate 125, the pressing force acts in the opposite direction from the pressing force of the head plate 125 against the ferrule 141.

Because of this, in the case of FIG. 33B, it is thought that the pressing force from the rear side of the head plate 125 against the ferrule 141 shows a tendency to become smaller compared with the spring apex portion side due to the elastic restorative force of the spring portion 124.

In the case of FIG. 33B, there is only a small amount of uneven distribution in the pressing force from the head plate 125 against the joining end surface 141*a* of the ferrule 141, and the effect on the cleaning performance does not pose any problems provided that the insertion portion is held in a predetermined orientation inside the positioning housing.

However, there is a possibility that, due to an operator over-tilting the cleaning tool during a manual operation or the like, there may be an increase in the uneven distribution in the pressing force from the head plate 125 against the joining end surface 141*a* of the ferrule 141, or alternatively, due to the effects of vibration and the like, there is a possibility that the spring rear side portion of the head plate 125 may lift up slightly from the joining end surface of the ferrule.

Because of this, the development of a technology is demanded that makes it possible to achieve a satisfactory uniform pressing force from a cleaning medium against a joining end surface during a manual operation of a cleaning tool by an operator or to counteract an external force such as vibration or the like.

Note that, in the case of FIG. 33C, because there is no occurrence of the phenomenon in which bending deformation that pushes the protruding distal end 124*a* side forward relative to the curve apex portion 124*b* is not imparted to the portion on the protruding distal end 124*a* side of the curve apex portion 124*b* of the spring portion 124, the overall deformation of the spring portion 124 proceeds smoothly, and a sufficient capability to follow the joining end surface is ensured.

Next, a description will be given of the tilting behavior of the head component of the cleaning tool 1 according to the present invention.

FIG. 29 shows a state in which the insertion tool 20 of this cleaning tool 1 is inserted into the connector housing hole 72 of the optical adapter 70, and the cleaning medium 2 is pressed against the joining end surface 61*a* of the optical plug 60 by the head component 23 of the head unit 4.

FIGS. 27A to 27D are views showing in typical form the vicinity of the head component 23 and tilt spring 41 in the head unit 4.

FIG. 27A shows a state prior to the cleaning medium 2 being pressed against the optical plug 60 by the head component 23, while FIGS. 27B through 27D show a state in which the insertion portion 20 is inserted into the optical adaptor plug 70 and the cleaning medium 2 is pressed against the optical plug 60.

The insertion portion 20 can be inserted in or removed from the connector housing hole 72 of the optical adapter 70 by moving along an axis which is an extension of the optical axis of the optical fiber 63*a* incorporated in the ferrule 61.

FIGS. 27B and 27C show a case of an optical plug 60 having a diagonally polished joining end surface 61a, while FIG. 27D shows a case of an optical plug 60 having a flat polished joining end surface 61a (i.e., a joining end surface that has been polished perpendicularly to the optical axis of the optical fiber 63a incorporated in the ferrule 61).

The joining end surfaces 61a of the optical plugs 60 shown in FIGS. 27B and 27C are tilted surfaces that are tilted 8° compared to the joining end surface 61a of the optical plug 60 shown in FIG. 27D.

Figure 25A:
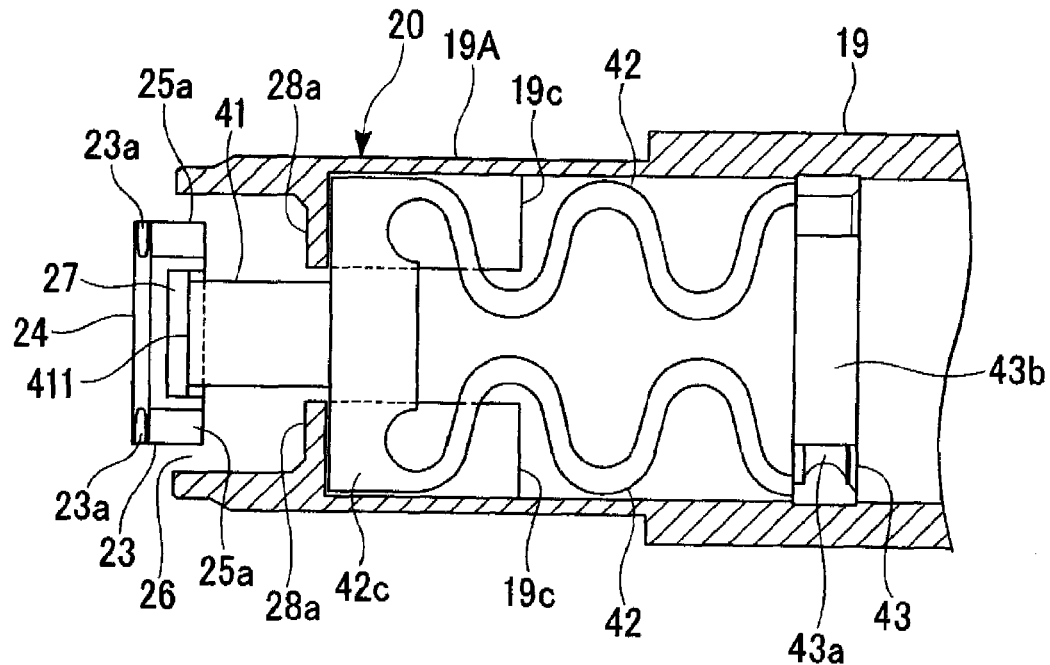
FIGS. 25A and 25B are a plan cross-sectional view and a front cross-sectional view of a tool distal end portion of the present cleaning tool.
Figure 25B:
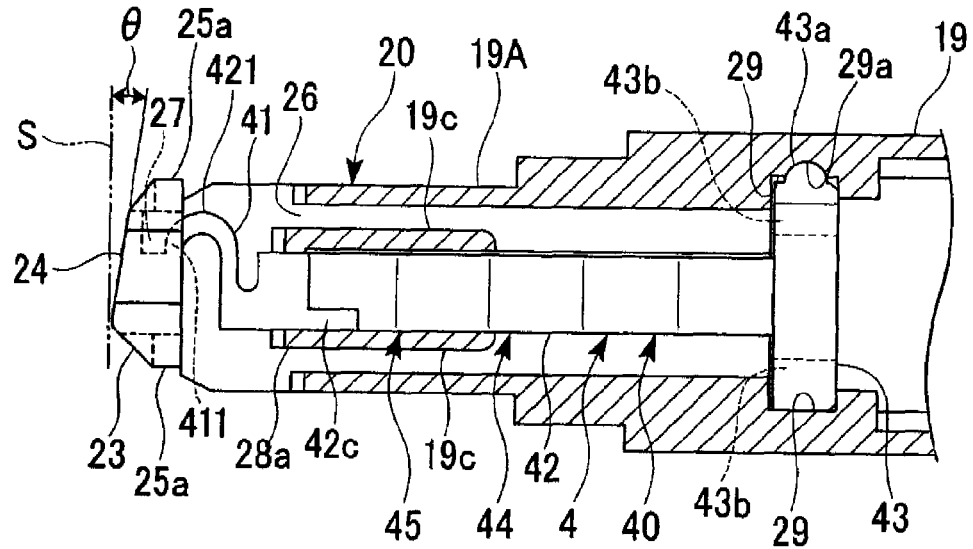

Here, a tilt angle θ2 (see FIG. 28A) of the diagonally polished joining end surface 61a relative to a joining end surface that has been flatly polished matches a tilt angle θ1 (see FIG. 25B) of the cleaning medium pressing surface 24.

However, the direction of the tilt of the joining end surface 61a in FIG. 27B is the reverse of that in FIG. 27C.

In FIG. 27B, the orientation of the joining end surface 61a of the optical plug 60 is aligned with the orientation of the cleaning medium pressing surface 24 of the head component 23 of the insertion portion 20 that has been inserted into the optical adapter 70 prior to the cleaning medium pressing surface 24 pressing the cleaning medium 2 against the optical plug 60.

In FIG. 27C, the orientation of the tilt of the joining end surface 61a of the optical plug 60 is the reverse of that in FIG. 27B.

Note that, in the same way as FIG. 27B, FIG. 29 also shows a case in which the orientation of the joining end surface 61a of the optical plug 60 is aligned with the orientation of the cleaning medium pressing surface 24 of the head component 23 of the insertion portion 20 that has been inserted into the optical adapter 70, and FIG. 27B shows the state depicted in FIG. 29 in typical view.

In the case shown in FIG. 27B, because the orientation of the joining end surface 61a of the optical plug 60 is aligned with the orientation of the cleaning medium pressing surface 24 of the head component 23 of the insertion portion 20 that has been inserted into the optical adapter 70, if the insertion portion 20 is pushed towards the optical plug 60 into the optical adaptor 70, there is substantially (or absolutely) no tilting of the head component 23, and the cleaning medium 2 can be gripped between the joining end surface 61a and the cleaning medium pressing surface 24 and is pushed hard against the joining end surface 61a. At this time, the entire portion of the cleaning medium 2 that is positioned along the cleaning medium pressing surface 24 of the head component 23 (i.e., the contact portion 2a) can be pressed against the joining end surface 61a of the optical plug 60 by a uniform pressing force.

As in FIGS. 27C and 27D, when the orientations of the joining end surface 61a of the optical plug 60 and the cleaning medium pressing surface 24 of the head component 23 do not match, then when pressing force is applied from the head component 23 to the optical plug 60, the pressing force acting on the head component 23 is unevenly distributed between a top edge 24a side (i.e., the end portion on the spring apex portion side) and the bottom edge 24b side (i.e., the end portion on the spring rear side) of the cleaning medium pressing surface 24. As a result, the tilt spring 41 is elastically deformed and the head component 23 is tilted.

The head component 23 is tilted by the elastic deformation of the tilt spring 41 so as to follow the joining end surface 61a of the optical plug 60 as the pushing in of the insertion portion 20 which has been inserted into the optical adapter 70 towards the optical plug 60 progresses. Ultimately, the head component 23 is pushed hard against the joining end surface 61a of the optical plug 60, and the cleaning medium 2 becomes gripped between the head component 23 and the joining end surface 61a.

In the cases shown in FIGS. 27C and 27D, due to the pressing of the head component 23 against the joining end surface 61a of the optical plug 60, a pressing force from the optical plug 60 (specifically, the ferrule 61) is applied relatively more towards the rear at the bottom edge 24b of the cleaning medium pressing surface 24 compared to the top edge 24a, so that the tilt spring 41 is elastically deformed such that the two ends thereof in the front and rear directions come closer to each other. In FIGS. 27C and 27D, as a result of the distance between the two ends in the front and rear directions of the arch-shaped tilt spring 41 becoming shorter, compared to the state shown in FIG. 27A, the tilt spring 41 takes on a more narrow elongated shape vertically.

Moreover, as a result of the bottom edge 24b of the cleaning medium pressing surface 24 being displaced towards the rear side relatively compared to the top edge 24a, there is a change in the orientation of the head component 23 such that the top edge 24a of the cleaning medium pressing surface 24 is displaced towards the front, which results in the cleaning medium pressing surface 24 on the spring apex portion side pressing the cleaning medium 2 against the joining end surface 61a of the optical plug 60.

Here, in the same way as in the cases shown in FIGS. 33C and 33D, the change in the orientation of the head component 23 in the cases shown in FIG. 27C and FIG. 27D is achieved by the deformation of the entire tilt spring 41.

In the cases shown in FIGS. 27C and 27D, there is no occurrence of a phenomenon such as that described with reference to FIG. 33B. Namely, there is no occurrence of the phenomenon in which a deformation is applied to the portion of the tilt spring 41 on the protruding distal end 411 side from the curve apex portion 412, and the protruding distal end 411 side is pushed out towards the front relative to the curve apex portion 412 so that the curvature radius is enlarged. Because of this, the deformation of the entire tilt spring 41 proceeds smoothly, and a sufficient capability to follow the joining end surface 61a is ensured in the cleaning medium pressing surface 24.

As a result, sufficient uniformity can be achieved in the pressing force from the cleaning medium pressing surface 24 onto the joining end surface 61a of the optical plug 60, and the portion 2a of the cleaning medium 2 that is located on the cleaning medium pressing surface 24 (also referred to below as the contact portion) can be pressed uniformly against the joining end surface 61a and an excellent cleaning performance can be obtained.

According to this cleaning tool 1, by employing a structure in which the cleaning medium pressing surface 24 of the head component 23 that is supported by the protruding distal end 411 of the tilt spring 41 is tilted gradually forward as it moves from the spring apex portion side towards the spring rear side, when the cleaning medium 2 is pressed by the head component 23 against the joining end surface 61a, then irrespective of the tilt direction of the joining end surface 61a of the optical plug 60, it is possible to ensure in the cleaning medium pressing surface 24 a high capability to follow the joining end surface 61a as a result of the elastic deformation of the tilt spring 41. Because of this, the portion of the cleaning medium 2 that is positioned along the cleaning medium pressing surface 24 can be pressed against the joining end surface 61a by a uniform pressing force, and an excellent cleaning performance can be reliably maintained.

Moreover, as a result of this, it is also possible to obtain an excellent cleaning performance irrespective of the orientation of the insertion of the insertion portion 20 into the optical adapter 70 (i.e., without switching the front and back thereof). Because a high capability to follow the tilt direction of the joining end surface 61a of the optical plug 60 is obtained in the cleaning medium pressing surface 24 of the head component 23, even if a variation in the orientation of the cleaning medium pressing surface 24 relative to the joining end surface 61a arises due to a tilting operation or the like of the cleaning tool 1 by the operator of the cleaning tool 1, it is still possible to consistently obtain an excellent cleaning performance. Naturally, it is of course possible to maintain a state of tight adhesion of the cleaning medium 2 against the joining end surface 61a of the optical plug 60.

It is preferable for the tilt angle θ1 of the cleaning medium pressing surface 24 to be the same as the tilt angle θ2 of the diagonally polished joining end surface 61a of the optical plug 60 (see FIG. 28A), or larger than the tilt angle θ2 (namely, θ2≦θ1) as this enables the above described effects to be more reliably obtained.

(Relationship Between the Cleaning Medium Feeding Direction and the Tilt of the Cleaning Medium Pressing Surface)

As is shown in FIGS. 27B through 27D and FIG. 28A and the like, it is preferable from the standpoint of ensuring a consistently excellent cleaning performance for the feed direction in which the cleaning medium 2 is fed by the feeding mechanism 3 to be a direction in which the end portion on the spring rear side of the head component 23 on which the cleaning medium 2 has been wound is the upstream side in the feeding direction, and for the spring apex portion side to be the downstream side in the feeding direction (i.e., at the cleaning medium pressing surface 24, this is a feed movement from the spring rear side towards the spring apex portion side).

In the cleaning tool 1 according to the present invention, the end portion on the spring rear side of the head component 23 is the upstream side in the feeding direction, the spring apex portion side is the downstream side in the feeding direction, and this is advantageous for securing a consistently excellent cleaning performance.

This is because the head unit 4 that is incorporated in the insertion portion 20 supports the arch-shaped tilt spring 41 and the head component 23 in a cantilevered structure at the front end of the supporting portion main body 44 that is supported on the protruding portion 19.

When the cleaning medium 2 has been fed forward by the operation of the cleaning medium feeding mechanism 3, as a result of the contact resistance with the cleaning medium 2 that is wound onto the head component 23, the head component 23 receives a displacement force following the cleaning medium 2 towards the downstream side in the feeding direction of the cleaning medium 2. As a result, deformation force is applied to the tilt spring 41.

If the feeding direction of the cleaning medium 2 is a direction heading from the spring rear side towards the spring apex portion side in the head component 23, then due to the contact resistance between the head component 23 and the cleaning medium 2, a rotation force towards the front centering on the protruding distal end 411 of the tilt spring 41 acts on the spring rear side end portion of the head component 23, while a displacement force acts on the rear side of the spring apex portion side end portion.

Here, in order to actually generate a rotational displacement towards the front centering on the protruding distal end 411 of the tilt spring 41 on the spring rear side end portion of the head component 23, it is also necessary to realize a phenomenon such as that described with reference to FIG. 33B, namely, the phenomenon in which deformation is applied to the portion of the arch-shaped tilt spring 41 on the protruding distal end 411 side from the curve apex portion 412, and the protruding distal end 411 side is pushed out towards the front relative to the curve apex portion 412 so that the curvature radius is enlarged, and relative to the curve apex portion 412, the protruding distal end 411 is displaced forwards relatively in the pressing direction towards the ferrule 61.

However, as is shown in FIGS. 27B through 27D, in a state in which the cleaning medium 2 is pressed tightly against the joining end surface 61a of the optical plug 60 by the pressing force from the head component 23, because the displacement towards the front of the spring rear side portion of the head component 23 that is supported at the front end (i.e., the protruding distal end 411) of the arch-shaped tilt spring 41 is restricted by the joining end surface 61a of the optical plug 60, there is no available space for the phenomenon to occur in which deformation is applied to the portion of the arch-shaped tilt spring 41 on the protruding distal end 411 side from the curve apex portion 412, and the protruding distal end 411 side is pushed out towards the front relative to the curve apex portion 412 so that the curvature radius is enlarged, and in which, relative to the curve apex portion 412, the protruding distal end 411 is displaced forwards relatively in the pressing direction towards the ferrule 61. Because of this, in a state in which the joining end surface 61a of the ferrule 61 and the cleaning medium pressing surface 24 of the head component 23 are closed together sandwiching the cleaning medium 2, even if the cleaning medium 2 is fed forward, there is no change in the orientation of the head component 23. Moreover, it is also possible to consistently obtain a pressing state in which the cleaning medium 2 is pressed uniformly against the joining end surface 61a by the pressing force from the cleaning medium pressing surface 24.

However, if the feed direction of the cleaning medium 2 is a direction heading from the spring rear side towards the spring apex portion side in the head component 23, then it is possible to consistently maintain a uniform pressing state of the cleaning medium 2 by the cleaning medium pressing surface 24 against the joining end surface 61a, and an excellent cleaning performance can be consistently obtained.

In contrast, if the feed direction in which the cleaning medium 2 is fed by the operation of the cleaning medium cleaning mechanism 3 is temporarily changed to a direction heading from the spring apex portion side towards the spring rear side (namely, a movement in the opposite direction to the cleaning medium feeding direction indicated by the arrows and FIGS. 27B through 27D and FIG. 28A) at the cleaning medium pressing surface 24, then, for example, when a strong displacement force which exceeds the pressing force of the head component 23 against the joining end surface 61a which is created by the tilt spring 41 and compression springs 42 of the head unit 4 towards the rear side of the head unit 4 is applied to the spring rear side end portion of the head component 23 as a result of contact with the cleaning medium 2, there is a possibility that a displacement towards the rear side of the head unit 4 will be generated.

The spring rear side portion of the head component 23 is able to be displaced towards the rear side of the head unit 4 by the elastic deformation of the tilt spring 41 and compression springs 42. Because of this, if a strong displacement force towards the rear side of the head unit 4 is applied as a result of the feeding movement of the cleaning medium 2 to the spring rear side end portion of the head component 23, then this displacement towards the rear side of the head unit 4 may occur due to the elastic deformation of the tilt spring 41 and compression springs 42.

At this time, the displacement towards the front side of the spring apex portion rear portion of the head component 23 is restricted by the joining end surface 61*a* of the optical plug 60. The displacement of the spring rear side portion of the head component 23 towards the rear side of the head unit 4 is generated by a rotational displacement of the head component 23 centering on the spring apex portion end portion of the head component 23.

Accordingly, according to this cleaning tool 1, if the end portion on the spring rear side of the head component 23 on which the cleaning medium 2 has been wound is the upstream side in the feeding direction, and if the spring apex portion side is the downstream side in the feeding direction (i.e., at the cleaning medium pressing surface 24, this is a feed movement from the spring rear side towards the spring apex portion side), then even in any of the cases shown in FIGS. 27B to 27D, this is advantageous as it is possible to secure an excellent cleaning performance.

Note that, in FIGS. 23A to 23D, FIG. 24, FIGS. 25A and 25B, and FIGS. 27A to 27D and the like, an example is shown in which the triangular block-shaped head component 23, which is equipped with a rear surface 23*b* which is perpendicular to the front-rear direction of the head unit 4, and with the cleaning medium pressing surface 24 which is inclined relative to the rear surface 23*b*, is used for the head component, however, it is also possible to employ a plate-shaped head component 23 which is equipped with a rear surface 23*c* which is parallel to the cleaning medium pressing surface 24 such as is shown in the example in FIGS. 32A through 32D as the head component. In this case as well, the behavior of the head unit 4 such as the tilting of the head component when the cleaning medium 2 is pressed against the flat polished or diagonally polished joining end surface 61*a* of the optical plug 60 by the cleaning medium pressing surface 24 is the same as in the case of triangular block-shaped head component 23.

Figure 32A:
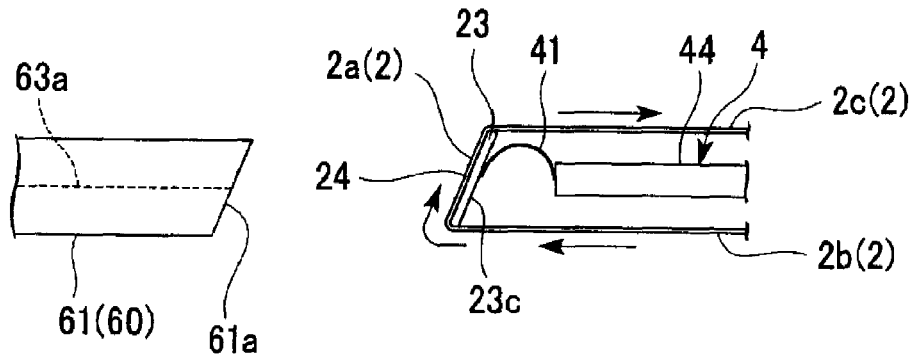
FIGS. 32A to 32D are views illustrating the behavior of a head unit when a cleaning medium is pressed against a joining end surface of an optical plug by the head component when the head component of the head unit of the present cleaning tool is plate-shaped, with FIG. 32A showing a state prior to the pressing, FIGS. 32B and 32C showing the cleaning medium being pressed against the diagonally polished joining end surface of an optical plug, and FIG. 32D showing the cleaning medium being pressed against a flat polished joining end surface of an optical plug.
Figure 32B:
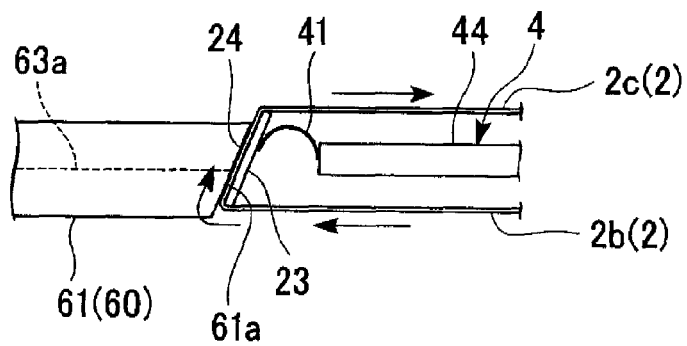
Figure 32C:
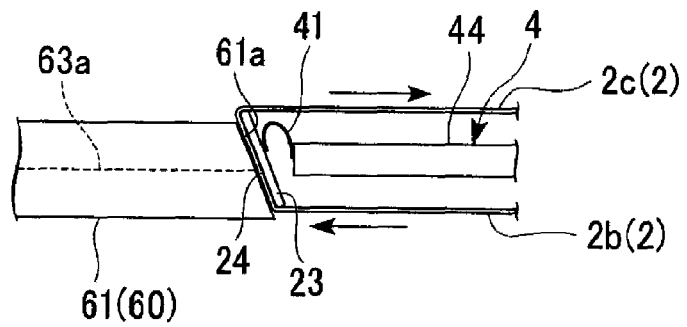
Figure 32D:
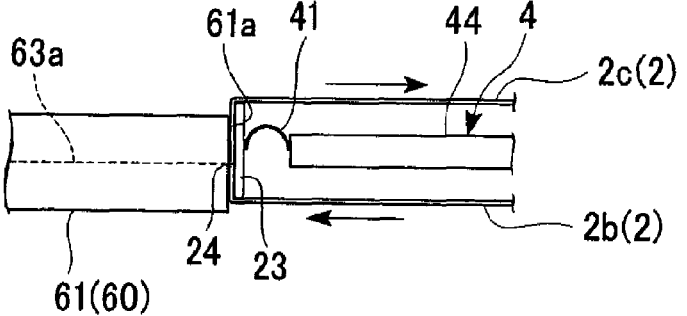

The orientation of the joining end surface 61*a* of the optical plug 60 shown in FIGS. 32B through 32D corresponds to that in FIGS. 27B through 27D.

(Positional Relationship Between the Joining End Surface of an Optical Connector and the Cleaning Medium Pressing Surface of a Head Component)

As has been described above, in the cleaning tool 1 of the present invention, in the state shown in FIG. 28A and FIG. 29, namely, in a state in which the center axes of the connector housing holes 73*a* and 74*a* of the respective adaptor half bodies 73 and 74, the center axis of the optical plug 60, and the reference plane Ds of the elastic bridging portion 45 of the insertion portion 20 are located on the center axis 76, which is a single straight line passing through the connector housing hole 72 of the optical adaptor 70, the position in the up and down direction in FIG. 28A and FIG. 29 of the bottom edge 24*b* of the cleaning medium pressing surface 24 is above the bottom edge of the joining end surface 61*a* of the ferrule 61, and below the optical fiber 63*a* that is exposed at the fiber exposure area 66*a* in the central portion of the joining end surface 61*a*.

The position of the bottom edge 24*b* of the cleaning medium pressing surface 24 is offset from the outer circumferential portion (i.e., the bottom end in FIG. 28A and FIG. 29) of the joining end surface 61*a* of the ferrule 61. The distance from the bottom edge 24*b* of the cleaning medium pressing surface 24 to the center position 66 of the joining end surface 61*a* in the up and down direction is different from the distance from the bottom end of the joining end surface 61*a* of the ferrule 61 to the center position 66. A difference (i.e., a shift amount Δt in the up and down direction) between the distance from the bottom edge 24*b* of the cleaning medium pressing surface 24 to the center position 66 of the joining end surface 61*a* (i.e., the distance in the up and down direction— can also be described as the distance from the center axis 76) and the distance from the bottom end of the joining end surface 61*a* of the ferrule 61 to the center position 66 is secured. In the example shown in the drawings, the shift amount Δt is the distance between the bottom edge 24*b* of the tape pressing surface 24 and the joining end surface 61*a* of the ferrule 61 in the thickness direction of the ferrule 61 (i.e., in other words, in the up and down direction in FIG. 28A and FIG. 29).

If the above described structure is used, it is possible to avoid a situation in which the cleaning medium 2 is pressed against a corner portion of the bottom end of the joining end surface 61*a* of the ferrule 61 (i.e., a portion of the outer circumferential portion of the joining end surface 61) by the cleaning medium pressing surface 24 of the head component 23. Because of this, it is possible to avoid the occurrence of problems such as a strong displacement force acting on the ferrule in a direction following the movement of the cleaning medium which is caused by the feeding movement of the cleaning medium that has been pressed against a corner portion of the outer edge of the joining end surface of the ferrule, and resulting in the ferrule becoming displaced, as was described with reference to FIGS. 38A and 38B.

Figure 38A:
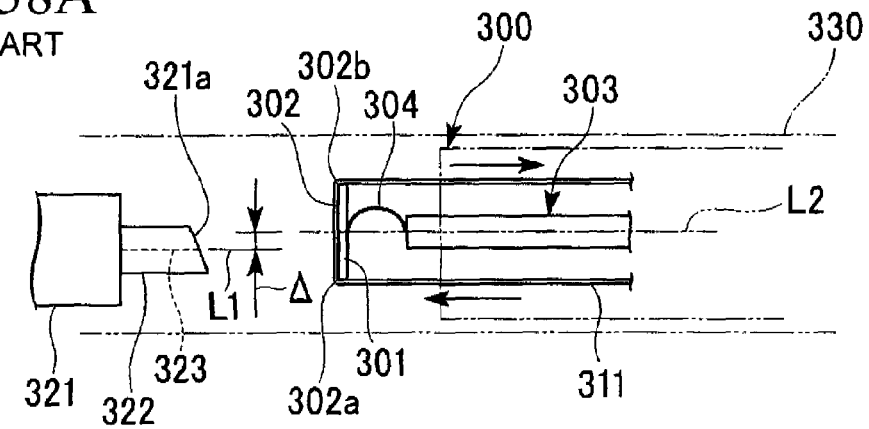
FIGS. 38a to 38D are views illustrating the behavior of a head portion when a cleaning tape is pressed against the joining end surface of an optical connector by the head portion of a conventionally structured optical connector cleaning tool in which is provided a protruding insertion portion in whose distal end is incorporated a tape pressing head whose head portion is tiltably supported by a plate spring-shaped spring portion that has been molded in a curve.
Figure 38B:
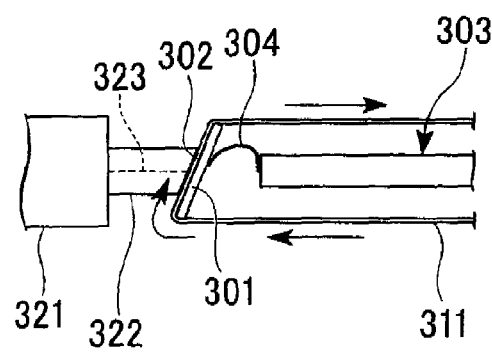
Figure 38C:
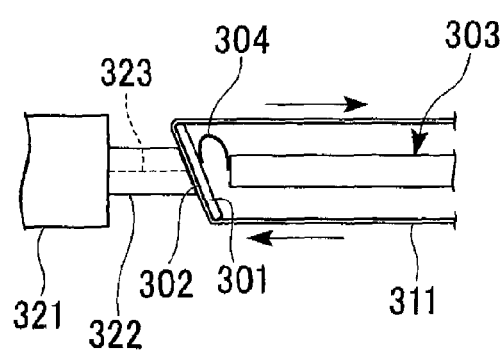
Figure 38D:
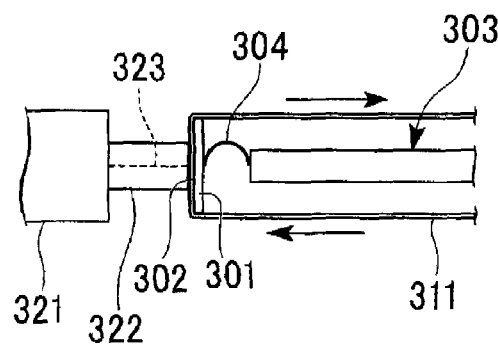

If a structure is employed in which the bottom edge 24*b* of the cleaning medium pressing surface 24 presses the cleaning medium 2 against the joining end surface 61*a* of the ferrule 61, as was depicted in FIGS. 38A and 38B, compared with a structure in which the cleaning medium 2 is pressed against a corner portion of the bottom end of the joining end surface 61*a* of the ferrule 61 by the cleaning medium pressing surface 24 of the head component 23, it is possible to markedly reduce the contact resistance between the cleaning medium 2 that is being fed forward and the ferrule 61. Accordingly, because it is possible to prevent displacement of the ferrule 61 which is caused by contact resistance between the cleaning medium 2 which is being fed forward and the ferrule 61, this contributes to securing a consistently excellent cleaning performance.

Moreover, for example, even in cases in which, due to reasons such as the accuracy with which an optical adaptor and an optical plug are assembled and the like, there is a shift between the positions in the thickness direction of the ferrule 61 of the optical plug 60 (i.e., the up and down direction in FIG. 28A and FIG. 29) of the ferrule 61 of the optical adaptor 60 which is connected to an optical adaptor and the head component 23 of the head unit 4 of the insertion portion 20 which has been inserted into the optical adaptor 70 (in other words, if there is a shift in the thickness direction of the ferrule 61 of the center axis of the insertion portion 20 relative to the center axis of the optical plug 60), if the structure according to the present invention is employed, it is possible to secure a state in which, within a range of the distance (i.e., the shift amount Δt) from the bottom end of the joining end surface 61*a* of the ferrule 61 to the bottom edge 24*b* of the tape pressing surface 24, the bottom edge 24*b* of the tape pressing surface 24 presses the cleaning medium 2 against the joining end surface 61*a* of the ferrule 61.

In the case of working MPO-type optical connectors (optical adaptors and optical plugs) that are currently supplied, even if unforeseen dimensional errors and the like occurring during manufacturing are included, the size (i.e., the size of an position shift between the center axes of the respective optical plugs) of any position shift that can occur between optical plugs which are connected together inside an optical adaptor is always less than 50 μm.

Accordingly, for example, if the position of the head component 23 is set in the insertion portion 20 such that a shift amount Δt of approximately 50 to 60 μm is ensured in the state shown in FIG. 28A and FIG. 29, then the state in which the bottom edge 24b of the cleaning medium pressing surface 24 is pressing the cleaning medium 2 against the joining end surface 61a of the ferrule 61 can be secured with a considerable degree of reliability.

Note that depending on the position setting of the head component 23 in the insertion portion 20, the shift amount Δt that is secured in the state shown in FIG. 28A and FIG. 29 is also referred to below as a reference shift amount.

FIG. 28B shows a case in which, in the optical adaptor 70, depending on the position shift (i.e., a discrepancy Δd) between the center axis 74b (the center axis of the insertion portion 20 is the center axis 74b of the connector housing hole 74) of the connector housing hole 74a which houses the insertion portion 20 of the cleaning tool 1, and the center axis 67 of the optical plug 70 that is connected to the optical adaptor 70 on the opposite side from the insertion portion 20, compared with the case shown in FIG. 28A and FIG. 29, the position of the head component 23 in the thickness direction of the ferrule 61 is offset towards the bottom end side of the joining end surface 61a relative to the ferrule 61, and the shift amount Δt is zero. If the size of the position shift downwards (i.e., the discrepancy Δd) of the head component 23 relative to the ferrule 61 does not exceed the reference shift amount, it is possible to avoid a situation in which the cleaning medium 2 is pressed against a corner portion of the bottom end of the joining end surface 61a of the ferrule 61 (i.e., a portion of the outer circumferential portion of the joining end surface 61) by the cleaning medium pressing surface 24 of the head component 23.

On the other hand, in a case in which, in contrast with the state shown in FIG. 28A and FIG. 29, the position of the head component 23 in the thickness direction of the ferrule 61 is offset towards the opposite side (i.e., the top side in FIGS. 28A and 28B and FIG. 29) from the bottom end of the joining end surface 61a relative to the ferrule 61, then compared with the case shown in FIG. 28A and FIG. 29, the shift amount Δt is greater than the reference shift amount. In this case, if the pressing position where the cleaning medium 2 is pressed against the joining end surface 61a of the ferrule 61 by the bottom edge 24b of the cleaning medium pressing surface 24 of the head component 23 is within a range of the joining end surface 61a of the ferrule 61 which extends from the bottom end of this joining end surface 61a to the fiber exposure area 66a in the center portion of the joining end surface 61a (this range is also referred to below as an 'upstream end pressing area (and has the symbol 61d), and includes the bottom end of the joining end surface 61a), then a consistently excellent cleaning performance can be obtained.

It is to be understood that while the reference shift amount is set to a size that ensures a sufficient width in order for the pressing position where the cleaning medium 2 is pressed against the joining end surface 61a of the ferrule 61 by the bottom edge 24b of the cleaning medium pressing surface 24 of the head component 23 to be within the range of the upstream end pressing area 61d in accordance with the position shift of the head component 23 towards the opposite side from the bottom side of the joining end surface 61a, it should not be set to a size that is too large to secure a sufficient distance from the optical fiber 63a that is exposed in the fiber exposure area 66a to the bottom edge 24b of the cleaning medium pressing surface 24.

According to the cleaning tool 1, by securing the reference shift amount so that any shift (i.e., the discrepancy Δd) that can occur between the positions of the ferrule 61 of the optical adaptor 60 which is connected to an optical adaptor and the head component 23 of the head unit 4 of the insertion portion 20 which has been inserted into the optical adaptor 70 which shift may be caused by the accuracy with which an optical adaptor and an optical plug are assembled and the like is absorbed, it is possible to maintain a pressing position where the cleaning medium 2 is pressed against the joining end surface 61a of the ferrule 61 by the bottom edge 24b of the cleaning medium pressing surface 24 of the head component 23 within the upstream end pressing area 61d.

The reference shift amount functions as a shift absorption width which maintains, in correspondence with the position shift (i.e., the discrepancy Δd) of the head component 23 towards the front end side of the joining end surface 61a relative to the ferrule 61, a pressing position where the cleaning medium 2 is pressed against the joining end surface 61a of the ferrule 61 by the bottom edge 24b of the cleaning medium pressing surface 24 of the head component 23 within the upstream end pressing area 61d. Because of this, it is possible to deal extensively with any increase in position shift (i.e., the discrepancy Δd) that is caused, for example, by over-tilting of the cleaning tool during a manual operation by an operator or by vibration or the like, this contributes to securing a consistently excellent cleaning performance.

While any position shift of the head component 23 towards the bottom end of the joining end surface 61a relative to the ferrule 61, and any position shift towards the top end thereof can, as far as possible, each be dealt with extensively, and the pressing position where the cleaning medium 2 is pressed against the joining end surface 61a of the ferrule 61 by the bottom edge 24b of the cleaning medium pressing surface 24 of the head component 23 can be maintained within the upstream end pressing area 61d, it is preferable for the reference shift amount to be approximately half the dimension in the up and down direction (i.e., the thickness direction of the ferrule 61) of the upstream end pressing area 61d, and for the pressing position where the cleaning medium 2 is pressed against the joining end surface 61a of the ferrule 61 by the bottom edge 24b of the cleaning medium pressing surface 24 of the head component 23 to be centered in an intermediate portion between the bottom end of the joining end surface 61a of the ferrule 61 and the center position 66.

The present invention has been described above based on several exemplary embodiments thereof. However, the present invention is not limited solely to these exemplary embodiments and various modifications may be made thereto insofar as they do not depart from the scope of the present invention.

Figure 34:
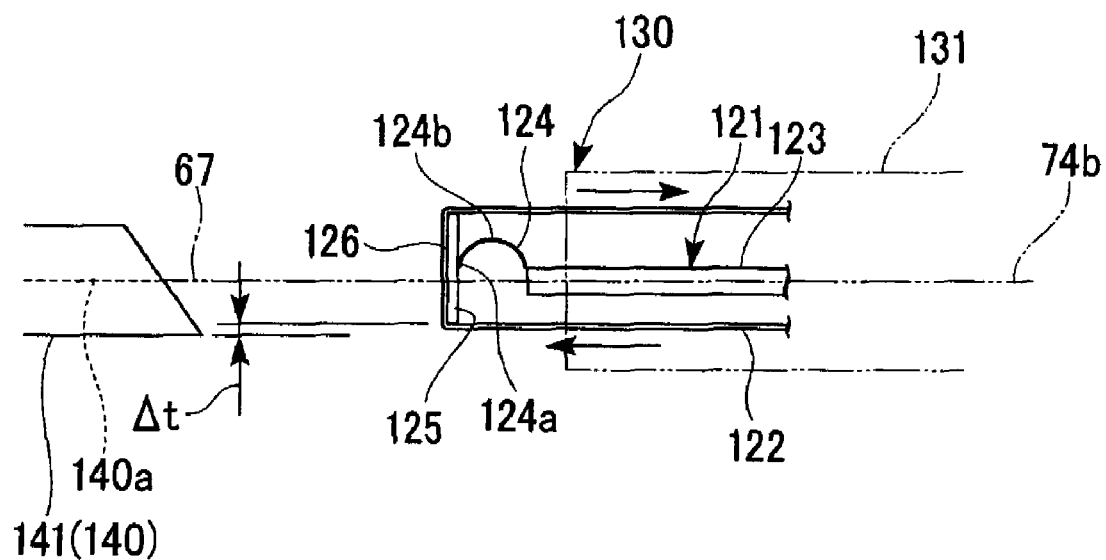
FIG. 34 is a view showing another aspect of the head unit according to the present invention.

(1) The structure in which the reference shift amount is secured, and this reference shift amount functions as a shift absorption width in order to maintain the pressing position where a cleaning medium is pressed against a joining end surface of a ferrule by a bottom edge of a tape pressing surface of a head component within an upstream end pressing area in correspondence with the position shift (i.e., the discrepancy Δd) of the head component towards the front end side of the joining end surface relative to the ferrule can also be applied to the insertion portion having the structure illustrated in FIGS. 33A to 33D (see FIG. 34).

Moreover, this structure can also be extensively applied to other optical connector cleaning tools that employ a tape pressing format.

(2) As is shown in FIGS. 6A and 6B, and FIG. 7 and the like, a description is given above concerning the cleaning tool of the above described embodiments in which a tape pressing surface of a head component is tilted in the thickness direction (for example, in the left-right direction in FIGS. 8A and 8B) of an insertion portion due to the elastic deformation of a tilt spring and a compression spring and the like, however, in this cleaning tool, it is also possible in the head component for the tape pressing surface to tilt in the transverse direction (for example, in the left-right direction in FIGS. 8A and 8B) of the insertion portion due to the elastic deformation of a tilt spring and a compression spring and the like.

In this case, it is possible to match the orientation of the head portion of the insertion portion even more closely to the orientation of the joining end surface of the ferrule, and to clean a joining end surface more excellently.

However, in the present invention, a structure in which the head component is able to tilt such that the tape pressing surface only tilts in the thickness direction of the insertion portion (for example, in the left-right direction in FIG. 8) is not excluded.

(3) In the insertion portion, unit insertion portions which are positioned within a connector housing by the insertion into mutually different connector housings are formed at a plurality of locations in the protruding direction, and the insertion portion can be formed such that each unit insertion portion of the insertion portion can be inserted into all of the connector housings that are able to house unit insertion portions whose position in the protruding direction of the insertion portion is located relatively on the rearward side. According to this type of cleaning tool, using the respective unit insertion portions, insertion portions are able to be inserted such that they are positioned relative to mutually different connector housings, and, when dealing with a plurality of different types and sizes of connector housings, using a single cleaning tool, it is possible to clean the joining end surfaces of optical connectors within these connector housings.

(4) It is also possible to structure the insertion portion such that a plurality of types of insertion portions can be switched in a tool main body. As a result, when dealing with a plurality of different types and sizes of connector housings, by only altering the insertion portion and without altering the tool body, it is possible to clean the joining end surfaces of optical connectors within these connector housings.

(5) The drive mechanism that feeds tape forward (i.e., the cleaning medium feeding mechanism) is not limited to manually driven mechanisms and may also be driven by a motor or springs or the like.

Moreover, it is also possible for the driving to be switched between manual driving and powered driving or for a combination of the two to be used.

(6) In the cleaning tool of the above described exemplary embodiments, a description is given of a structure in which a head unit is incorporated inside a cylindrical protruding portion 19 that protrudes from a tool main body, and a cleaning medium that is wound around a head component of the head unit (excluding portions adjacent to a contact portion placed on the tape pressing surface) is housed in the head unit, however, the present invention is not limited to this. Provided that the cleaning medium is prevented from coming into contact with the internal wall of the connector housing when the insertion portion is inserted into the connector housing and becoming contaminated, then the shape and structure of the protruding portion is not particularly limited and does not necessarily have to be sleeve-shaped. For example, the protruding portion may have an elongated plate shape or may be a protruding piece shaped like a channel.

(7) The feed quantity notification mechanism is not limited to the structure described in the embodiments above and it is also possible to employ an optional mechanism that gives notification of the cleaning medium feed quantity by, for example, generating signals such as sounds or the turning on or flashing of a lamp in accordance with the cleaning medium feed quantity.

(8) In the above described embodiments, an insertion portion without a key is described (i.e., an insertion portion in whose distal end portion 19A of the protruding portion 19 there is not provided a key that is inserted into the key groove of an MPO adaptor), however, in the present invention an insertion portion having a key is not excluded.

(9) The tilt spring is not limited to the circular arc plate-shaped tilt spring illustrated in the above described embodiments, however, it is also possible for an S-shaped or wave-shaped tilt spring to be used.

For a tilt spring in which two or more curve apex portions are present, of the two sides on either side of the protruding distal end of the tilt spring, the side of the curve apex portion that is located closest to the head component is called the 'spring apex portion side', while opposite side therefrom is called the 'spring rear side'.

(10) In the above described embodiments, an insertion portion is described in which the head unit 4 is incorporated in the protruding portion 19 such that the longitudinal direction of this head unit 4 is aligned with the protruding direction of the protruding portion 19 from the tool main body 10, more specifically, such that the longitudinal direction of this head unit 4 is aligned with the direction of the center axis of the cylindrical protruding portion 19, however, the present invention is not limited to this and it is also possible to employ a structure in which, for example, the head unit is incorporated in the protruding portion 19 such that the longitudinal direction of the head unit is tilted relative to the center axis of the protruding portion 19. By employing this type of structure, the tape pressing surface of the head component can be tilted to a desired angle relative to the center axis of the protruding portion 19.

In this case as well, taking a direction which is aligned with the center axis of the protruding portion 19 as a reference, the spring rear side of the head component is tilted so as to be relatively further towards the front side (i.e., the front side in the pressing direction of the optical connector towards the end surface of an optical component) compared to the spring apex portion side.

(11) The cleaning tool of the above described embodiments can be used as an optical component cleaning tool used for optical components such as optical fiber arrays, planar lightwave circuits, optical transceivers and the like for cleaning end surfaces of optical components whose end surface of an optical guiding wave path (obtainable in an optical fiber).

Examples of an optical fiber array include those in which optical fibers are held in either one or a plurality of positioning grooves such as V grooves that are formed in parallel in a substrate, and the positioning grooves extend to at least one end of the substrate, and an end surface is formed as a result of the end surfaces of the optical fibers being placed at the one end of the substrate. Various structures are also know in optical components having planar lightwave circuits. According to the optical component cleaning tool of the present invention, even when an end surface of an optical component is placed in a recessed location such as a housing or the like, instead of the joining end surface of an optical connector, the end surface of another optical component, namely, the end surface of an optical fiber or the end surface of a substrate or the like can be cleaned by a cleaning medium that is wound onto a head.

Figure 35:
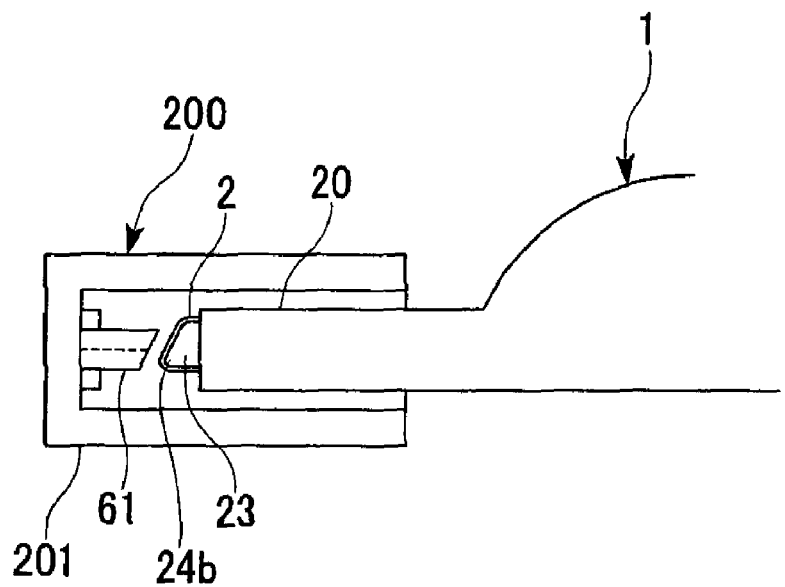
FIG. 35 is a view showing an example in which an optical connector receptacle is employed as a connector positioning housing.
Figure 36:
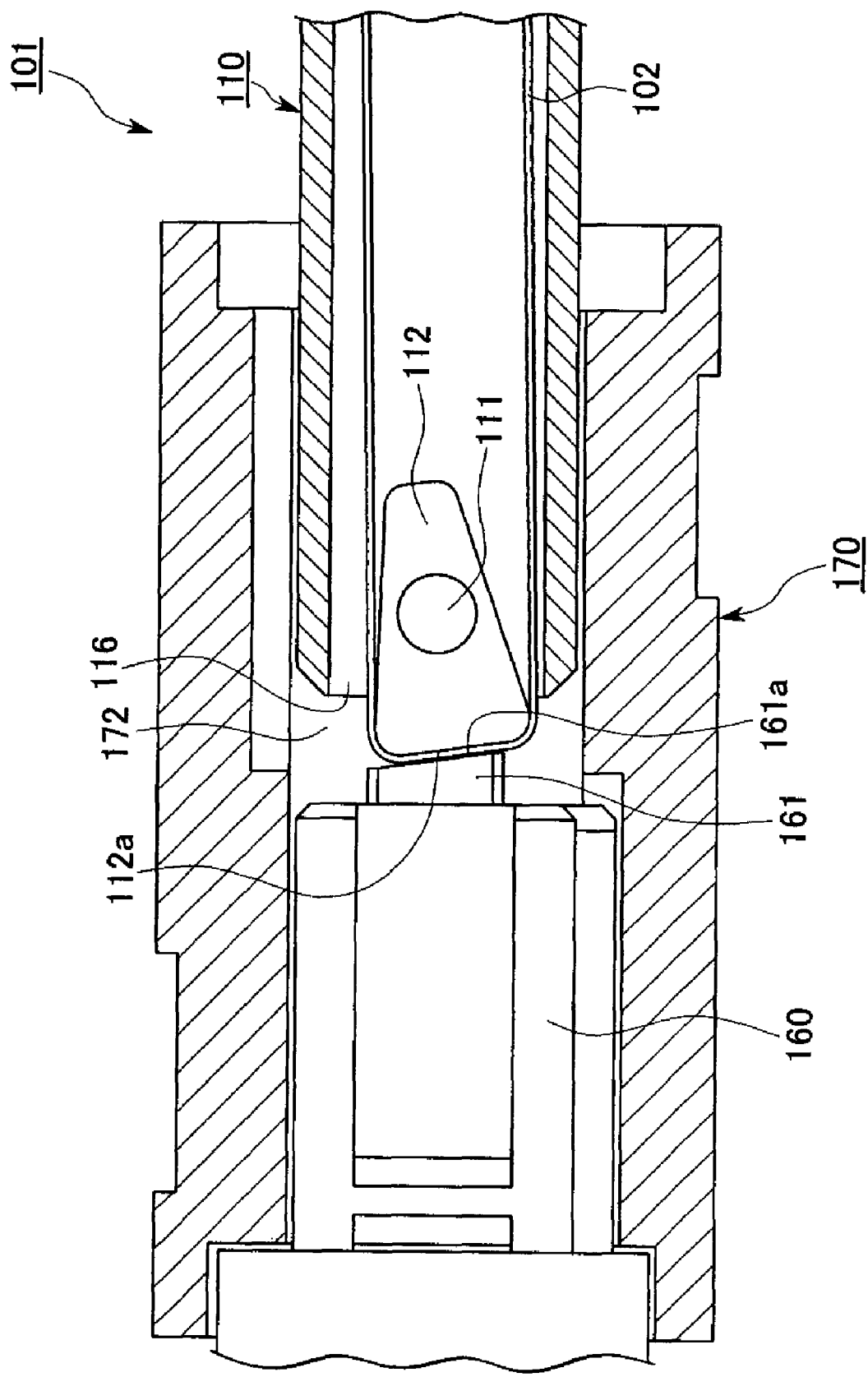
FIG. 36 is a cross-sectional view showing an example of a state in which a conventional cleaner is inserted in a connector positioning housing.

(12) As is shown in FIG. 35, it is also possible to employ a structure in which, instead of an optical connector adaptor, an optical connector receptacle 200 is employed, and this optical connector receptacle 200 itself (specifically, a receptacle housing 201) is made to function as a connector positioning housing. In this case, the ferrule 61 that is incorporated within the receptacle housing 201 functions as the optical connector according to the present invention. By inserting the insertion portion 20 of the cleaning tool 1 into the connector housing hole which is the internal space inside the sleeve-shaped receptacle housing 201, the joining end surface 61a of the ferrule 61 can be cleaned.

The present invention can be used in order to clean a joining end surface prior to, for example, an optical connector or an optical component being optically connected to another optical connector or optical component.

While exemplary embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. An optical connector cleaning tool that wipes clean a joining end surface of an optical connector using a feeding movement of a cleaning medium, comprising:
    a tool main body including a cleaning medium feeding mechanism that feeds out or takes up the cleaning medium; and
    an insertion portion that protrudes from the tool main body and is capable of being inserted into a connector positioning housing that houses the optical connector, wherein said insertion portion includes a cleaning medium pressing mechanism onto which a portion of the cleaning medium that has been pulled out from the tool main body is wound;
    wherein the cleaning medium pressing mechanism has a head component including a cleaning medium pressing surface that secures a contact surface area for the cleaning medium to be in contact with the joining end surface of the optical connector, and has a head supporting portion that supports the head component on a tilt relative to the direction in which the cleaning medium pressing surface is pressing against the optical connector, and
    the head supporting portion includes a supporting portion main body mounted on a protruding portion that protrudes from the tool main body, and a circular arc-shaped or waveform tilt spring that protrudes from a front end of the supporting portion main body in the direction of the pressing against the optical connector, and the head component is supported at a protruding distal end of the tilt spring such that it can be tilted by an elastic deformation of the tilt spring, and
    the head component extends so as to project outwards from the protruding distal end of the tilt spring to a spring apex portion side, which is the side of a curve apex portion that is closest to the head component of the tilt spring, and to a spring rear side, which is the opposite side therefrom, and
    wherein, without elastic deformation of the tilt spring, the cleaning medium pressing surface has a tilted orientation with respect to an insertion direction of the insertion portion, so that an end portion of the cleaning medium pressing surface on the spring apex portion side of the head component tilts away from the insertion direction, and an end portion of the cleaning medium pressing surface on the spring rear side of the head component tilts toward the insertion direction.

2. The tool according to claim 1, wherein a tilt angle of the cleaning medium pressing surface is the same as or greater than a tilt angle of a diagonally polished joining end surface of the optical connector.

3. The tool according to claim 1, wherein the supporting portion main body includes:
    a mounting portion fixed to the protruding portion; and
    compression springs compressed by a pressing force that presses the head component which is provided between the mounting portion and the tilt spring against the joining end surface of the optical connector.

4. The tool according to claim 1, wherein the cleaning medium pressing mechanism is a molded product made from synthetic resin in which the head component and the head supporting portion are formed as a single unit.

5. The tool according to claim 3, wherein the compression springs are formed in a waveform shape, and an elastic bridging portion is constructed between the mounting portion and the tilt spring by the compression springs that are arranged in two parallel rows.

6. The optical connector cleaning tool according to claim 1, wherein the cleaning medium is wound onto the head component such that the spring rear side of the head component is on the upstream side in the flow direction of the cleaning medium compared to the spring apex portion side.

7. The tool according to claim 6, wherein guide grooves that prevent any shift in the transverse direction of the cleaning medium are formed in an end portion of the head component on a spring apex portion side and a spring rear side thereof via the cleaning medium pressing surface, and portions of the cleaning medium on the upstream side and downstream side in the flow direction thereof via the cleaning medium pressing surface are housed in the guide grooves.

8. The tool according to claim 1, wherein the positioning housing is equipped with a connector housing hole that houses an optical connector, and a key groove that is formed in an inner surface of the connector housing hole in a groove shape that extends in the direction of the center axis of the connector housing hole and into which is inserted a key that protrudes from a side portion of the optical connector, and
    the cleaning medium pressing mechanism is incorporated in a distal end of the protruding portion of the tool main body, and the insertion portion, which is constructed such that it can be inserted into the positioning housing, is able to be inserted only into the connector housing hole from among the connector housing hole and the key groove of the positioning housing, and also the insertion portion has a front-rear symmetrical cross-sectional outer configuration that, through front-rear inversion, enables it to be inserted in both a normal and a reverse insertion direction into the connector housing hole in which the key groove side and the opposite side from the key groove side have symmetrical cross-sectional configurations.

9. An optical component cleaning tool that wipes clean an end surface of an optical component using a feeding movement of a cleaning medium comprising:
    a tool main body including a cleaning medium feeding mechanism that feeds out or takes up the cleaning medium; and
    an insertion portion that protrudes from the tool main body and is inserted into a housing that houses the optical component, wherein said insertion portion includes a cleaning medium pressing mechanism onto which a portion of the cleaning medium that has been pulled out from the tool main body is wound, wherein the cleaning medium pressing mechanism has a head component in which is formed a cleaning medium pressing surface that secures a contact surface area for the cleaning medium to be in contact with the end surface of the optical component, and has a head supporting portion that supports the head component on a tilt relative to the direction in which the cleaning medium pressing surface is pressing the optical component, and the head supporting portion includes a supporting portion main body that is mounted on a protruding portion that protrudes from the tool main body, and a circular arc-shaped or waveform tilt spring that protrudes from a front end of the supporting portion main body in the direction of the pressing against the optical component, and the head component is supported at a protruding distal end of the tilt spring such that it can be tilted by an elastic deformation of the tilt spring, and the head component extends so as to project outwards from the protruding distal end of the tilt spring that protrudes from the supporting portion main body to a spring apex portion side, which is the side of a curve apex portion that is closest to the head component of the tilt spring, and to a spring rear side, which is the opposite side therefrom, and wherein, without elastic deformation of the tilt spring, the cleaning medium pressing surface has a tilted orientation with respect to an insertion direction of the insertion portion, so that an end portion of the cleaning medium pressing surface on the spring apex portion side of the head component tilts away from the insertion direction, and an end portion of the cleaning medium pressing surface on the spring rear side of the head component tilts toward the insertion direction.

10. An optical connector cleaning tool that wipes clean an end surface of an optical component using a feeding movement of a cleaning medium, comprising:

a tool main body having a cleaning medium feeding mechanism that feeds out or takes up the cleaning medium; and a protruding portion that protrudes from the tool main body, including a cleaning medium pressing portion and that presses a portion of the cleaning medium that has been pulled out from the tool main body against the end surface of the optical component, wherein the cleaning medium pressing mechanism has a head component having a cleaning medium pressing surface that secures a contact surface area for the cleaning medium to be in contact with the end surface of the optical component, and has a head supporting portion that supports the head component on a tilt relative to the direction in which the cleaning medium pressing surface is pressing the optical component, and the head supporting portion includes a supporting portion main body that is mounted on the protruding portion that protrudes from the tool main body, and a circular arc-shaped or waveform tilt spring that protrudes from a front end of the supporting portion main body in the direction of the pressing against the optical component, and the head component is supported at a protruding distal end that protrudes from the supporting portion main body of the tilt spring such that it can be tilted by an elastic deformation of the tilt spring, and the head component extends so as to project outwards from the protruding distal end that protrudes from the supporting portion main body of the tilt spring to a spring apex portion side, which is the side of a curve apex portion that is closest to the head component of the tilt spring, and to a spring rear side, which is the opposite side therefrom, and wherein, without elastic deformation of the tilt spring, the cleaning medium pressing surface has a tilted orientation with respect to an insertion direction of the insertion portion, so that an end portion of the cleaning medium pressing surface on the spring apex portion side of the head component tilts away from the insertion direction, and an end portion of the cleaning medium pressing surface on the spring rear side of the head component tilts toward the insertion direction.

11. An optical connector cleaning tool that wipes clean joining end surfaces of optical connectors using a feeding movement of a cleaning medium, comprising:

a tool main body including a cleaning medium feeding mechanism that feeds out or takes up the cleaning medium; and an insertion portion, having a head component with a cleaning medium pressing surface, that protrudes from the tool main body, wherein the cleaning medium is wound onto the head component, the head component being tiltably supported at a distal end of the insertion portion by a spring portion, the head component comprising an upstream side end portion and a downstream side end portion in a flow direction of the cleaning medium which is perpendicular to an insertion direction of the insertion portion, wherein, when the insertion portion is inserted into the connector housing hole of an optical connector adaptor or an optical connector receptacle, the upstream side end portion connects to a portion of the joining end surface of the optical connector which is offset from a corner portion of the joining end surface toward a center position of the optical connector.

12. The tool according to claim 11, wherein the head component of the insertion portion is part of a cleaning medium pressing mechanism that also includes a head supporting portion that is mounted on a protruding portion which protrudes from the tool main body and that supports the head component, and the head supporting portion of the cleaning medium pressing mechanism includes a supporting portion main body that is mounted on the protruding portion, and a circular arc-shaped or waveform tilt spring that protrudes from a front end of the supporting portion main body in the direction of the pressing against the optical connectors and that functions as the spring portion, and the head component is supported at a protruding distal end that protrudes from the supporting portion main body of the tilt spring such that it can be tilted by an elastic deformation of the tilt spring.

13. The tool according to claim 12, wherein the head component extends so as to project outwards from a protruding distal end that protrudes from the supporting portion main body of the tilt spring to a spring apex portion side, which is the side of a curve apex portion that is closest to the head component of the tilt spring, and to a spring rear side, which is the opposite side therefrom, and the cleaning medium pressing surface tilts gradually forwards in the direction of the pressing against the optical components as it moves from an end portion on the spring apex portion side of the head component towards an end portion on the spring rear side thereof.

14. The tool according to claim 13, wherein a tilt angle of the cleaning medium pressing surface is the same as or greater than a tilt angle of a diagonally polished joining end surface of the optical connector.

15. The tool according to claim 11, wherein the optical connector adaptor or the optical connector receptacle includes the connector housing hole into which the optical connector can be removably inserted, and a key groove that is formed in an inner surface of the connector housing hole in a groove shape that extends in a direction of a center axis of the connector housing hole and into which is inserted a key that protrudes from a side portion of the optical connector.

16. The tool according to claim 15, wherein the insertion portion can be inserted only into the connector housing hole from among the connector housing hole and the key groove of the positioning housing, and also the insertion portion has a front-rear symmetrical cross-sectional outer configuration that, through front-rear inversion, enables it to be inserted in both a normal and a reverse insertion direction into the connector housing hole in which the key groove side and the opposite side from the key groove side have symmetrical cross-sectional configurations.

17. The tool according to claim 12, wherein the supporting portion main body includes a mounting portion that is fixed to the protruding portion, and compression springs that are compressed by a pressing force that presses the head component which is provided between the mounting portion and the tilt spring against the joining end surface of an optical connector.

18. The tool according to claim 17, wherein the compression springs are formed in a waveform shape, and an elastic bridging portion is constructed between the mounting portion and the tilt spring by the compression springs that are arranged in two parallel rows.

19. The tool according to claim 12, wherein the cleaning medium pressing mechanism is a molded product made from synthetic resin in which the head component and the head supporting portion are formed as a single unit.

20. The tool according to claim 13, wherein the cleaning medium is wound onto the head component such that the spring rear side of the head component is on an upstream side in a flow direction of the cleaning medium compared to the spring apex portion side.

21. The tool according to claim 20, wherein guide grooves that prevent any shift in the transverse direction of the cleaning medium are formed in an end portion of the head component on a spring apex portion side and a spring rear side thereof via the cleaning medium pressing surface, and portions of the cleaning medium on the upstream side and downstream side in the flow direction thereof via the cleaning medium pressing surface are housed in the guide grooves.

22. An optical connector cleaning tool that wipes clean joining end surfaces of optical connectors using a feeding movement of a cleaning medium, comprising:

a tool main body including a cleaning medium feeding mechanism that feeds out or takes up the cleaning medium;

an insertion portion having a cleaning medium pressing surface formed on a head component that protrudes from the tool main body and, when inserted into a connector housing hole of an optical connector adaptor or an optical connector receptacle, presses the cleaning medium that has been wound onto the cleaning medium pressing surface of the head component against the joining end surfaces of the optical connectors, and the head component is provided at the distal end of the insertion portion and is supported such that it can be tilted by a spring portion;

the head component comprising an upstream side end portion and a downstream side end portion in a flow direction of the cleaning medium which is perpendicular to an insertion direction of the insertion portion; and when the insertion portion is inserted into the connector housing hole, the upstream side end portion and the downstream side end portion are separated on two sides of a center axis of a portion of the connector housing hole where the insertion portion is housed, and a center position of the cleaning medium pressing surface of the head component is offset from a center axis of the connector housing hole, and the distance from the upstream side end portion to the center axis of the connector housing hole is smaller than the distance from the downstream side end portion to the center axis of the connector housing hole.

23. A cleaning tool for an optical connector, comprising:

a main body portion for housing a cleaning medium feeding mechanism;

an insertion portion, including a protruding portion and head unit, that protrudes from the main body portion for insertion into a housing for cleaning an end surface of the optical connector;

compression springs and a tilt spring disposed on said head unit for supporting a head component, wherein said head component tilts according to an elastic deformation of the tilt spring; and a cleaning medium disposed on said head component for cleaning the end surface of the optical connector, wherein said head component has a cleaning medium pressing surface that secures a contact surface area of the cleaning medium against the end surface of the optical connector; and the head component further comprises a rear surface which is perpendicular to a front-rear direction of the head unit and is inclined relative to the cleaning medium pressing surface.

* * * * *